(12) United States Patent
Zhao et al.

(10) Patent No.: US 11,395,342 B2
(45) Date of Patent: Jul. 19, 2022

(54) RANDOM ACCESS SEQUENCE GENERATION METHOD, DEVICE, AND SYSTEM

(71) Applicant: HUAWEI TECHNOLOGIES CO., LTD., Guangdong (CN)

(72) Inventors: Yue Zhao, Beijing (CN); Zhiheng Guo, Beijing (CN); Qiang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/688,493

(22) Filed: Nov. 19, 2019

(65) Prior Publication Data

US 2020/0092919 A1    Mar. 19, 2020

Related U.S. Application Data

(63) Continuation of application No. 15/928,496, filed on Mar. 22, 2018, now Pat. No. 10,499,437, which is a
(Continued)

(51) Int. Cl.
*H04W 74/08* (2009.01)
*H04L 27/26* (2006.01)
(Continued)

(52) U.S. Cl.
CPC ....... *H04W 74/0833* (2013.01); *H04L 5/0021* (2013.01); *H04L 5/0053* (2013.01);
(Continued)

(58) Field of Classification Search
CPC ............. H04L 27/2692; H04L 27/2655; H04L 27/2688; H04L 5/0021; H04L 5/0053;
(Continued)

(56) References Cited

U.S. PATENT DOCUMENTS 7,792,212 B2 * 9/2010 Lee .............. H04L 1/0023
375/295
10,499,437 B2 * 12/2019 Zhao ............. H04L 5/0053
(Continued)

FOREIGN PATENT DOCUMENTS

CN       101039141 A    9/2007
CN       101686555 A    3/2010
(Continued)

OTHER PUBLICATIONS

3GPP TSG-RAN WG4 Meeting #76 R4-15xxXx(R4-154364),"A New Cyclic Shift Restriction Set for Very High Speed Dells",Alcatel Lucent,Aug. 24-28, 2015,total 7 pages.
(Continued)

*Primary Examiner* — Mansour Oveissi

(57) ABSTRACT

Embodiments of the present application provide a random access sequence generation method, and an apparatus. The method includes: generating, by a base station, notification signaling, where the notification signaling includes indication information, the indication information is used to instruct user equipment UE to select a shift sequence number from a range of 0 to $(n_{shift}^{RA} n_{group}^{RA} + \bar{n}_{shift}^{RA} + \overline{\overline{n}}_{shift}^{RA} + \overline{\overline{\overline{n}}}_{shift}^{RA} - 1)$, the shift sequence number is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\overline{\overline{n}}_{shift}^{RA}$ is a quantity of UE candidate sequence shifts in first remaining sequence shifts, and $\overline{\overline{\overline{n}}}_{shift}^{RA}$ is a quantity of UE candidate sequence shifts in second remaining sequence shifts; and sending, by the base station, the notification signaling to the UE, so that the UE generates a random access sequence according to the indication information.

25 Claims, 8 Drawing Sheets

---

A base station generates notification signaling, where the notification signaling includes indication information, the indication information is used to instruct user equipment UE to select a shift sequence number from a range of 0 to $(n_{shift}^{RA} n_{group}^{RA} + \bar{n}_{shift}^{RA} + \overline{\overline{n}}_{shift}^{RA} + \overline{\overline{\overline{n}}}_{shift}^{RA} - 1)$, the shift sequence number is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\overline{\overline{n}}_{shift}^{RA}$ is a quantity of UE candidate sequence shifts in first remaining sequence shifts, and $\overline{\overline{\overline{n}}}_{shift}^{RA}$ is a quantity of UE candidate sequence shifts in second remaining sequence shifts ~101

The base station sends the notification signaling to the UE, so that the UE generates a random access sequence according to the indication information ~102

Related U.S. Application Data continuation of application No. PCT/CN2015/090838, filed on Sep. 25, 2015.

(51) Int. Cl.
*H04L 5/00* (2006.01)
*H04W 74/00* (2009.01)

(52) U.S. Cl.
CPC ...... *H04L 27/2613* (2013.01); *H04L 27/2655* (2013.01); *H04L 27/2688* (2013.01); *H04L 27/2692* (2013.01); *H04W 74/006* (2013.01)

(58) Field of Classification Search
CPC ............ H04L 27/2613; H04W 74/006; H04W 74/0833
See application file for complete search history.

(56) References Cited

U.S. PATENT DOCUMENTS

| | | | |
|---|---|---|---|
| 10,524,292 B2* | 12/2019 | Wu | H04W 74/08 |
| 2008/0251528 A1 | 10/2008 | Babikian et al. | |
| 2009/0046629 A1 | 2/2009 | Jiang et al. | |
| 2009/0073944 A1* | 3/2009 | Jiang | H04J 11/00 370/338 |
| 2016/0345365 A1 | 11/2016 | Vujcic et al. | |
| 2017/0086228 A1 | 3/2017 | Wu et al. | |
| 2018/0152906 A1* | 5/2018 | Kim | H04W 24/08 |

FOREIGN PATENT DOCUMENTS

| | | |
|---|---|---|
| CN | 101873714 A | 10/2010 |
| CN | 102271416 A | 12/2011 |
| CN | 102387599 A | 3/2012 |
| CN | 103384231 A | 11/2013 |
| CN | 103384378 A | 11/2013 |
| CN | 103384407 A | 11/2013 |
| CN | 104604320 A | 5/2015 |
| EP | 2142448 A1 | 1/2010 |
| EP | 2456155 A1 | 5/2012 |
| EP | 3142448 A1 | 3/2017 |
| JP | 2010516076 A | 5/2010 |
| JP | 2018530239 A | 10/2018 |
| RU | 2429567 C2 | 9/2011 |
| WO | 2014067107 A1 | 5/2014 |
| WO | 2014119898 A1 | 8/2014 |
| WO | 2015184977 A1 | 12/2015 |

OTHER PUBLICATIONS

3GPP TS 36.211 V12.6.0 (Jun. 2015);3rd Generation Partnership Project;Technical Specification Group Radio Access Network;Evolved Universal Terrestrial Radio Access (E-UTRA);Physical channels and modulation(Release 12),total 136 pages.

Huawei, HiSilicon:"PRACH enhancement in high speed scenario", 3GPP TSG RAN WG1 Meeting #84bis, R1-162619, Busan, Korea, Apr. 11-15, 2016. total 7 pages. XP051080307.

R1-1612301 Ericsson:Introduction of performance enhancements for high speed scenario [online], 3GPP TSG-RAN Meeting #87, Reno, NV, USA, Nov. 14-18, 2016. total 7 pages.

3GPP TS 36.211 V14.1.0 (Dec. 2016),3rd Generation Partnership Project;Technical Specification Group Radio Access Network;Evolved Universal Terrestrial Radio Access (E-UTRA);Physical channels and modulation(Release 14),total 175 pages.

* cited by examiner

RANDOM ACCESS SEQUENCE GENERATION METHOD, DEVICE, AND SYSTEM

CROSS-REFERENCE TO RELATED APPLICATIONS

This application is a continuation of U.S. patent application Ser. No. 15/928,496, filed on Mar. 22, 2018, which is a continuation of International Application No. PCT/CN2015/090838, filed on Sep. 25, 2015. The afore-mentioned patent applications are hereby incorporated by reference in their entireties.

TECHNICAL FIELD

Embodiments of the present application relate to communications technologies, and in particular, to a random access sequence generation method, a device, and a system.

BACKGROUND

If user equipment (UE) communicates with a base station when the UE moves at a high speed, there is a change between signal frequencies at receive ends of the UE and the base station. The change is referred to as a Doppler frequency shift.

In the conventional art, to avoid a problem that random access sequences of multiple UEs interfere with each other when the Doppler frequency shift is greater than one time a physical random access channel (PRACH) subcarrier spacing and is less than two times the PRACH subcarrier spacing, a targeted design is made. In the conventional art, sequence shifts are grouped, three parameters, that is, a quantity of groups, a quantity of UE candidate sequence shifts in a group, and a quantity of UE candidate sequence shifts in the last length that is insufficient for a group, are determined, and a shift sequence number is selected from an interval that is determined according to the three parameters.

However, in the conventional art, a range from which a shift sequence number is selected is excessively small.

SUMMARY

Embodiments of the present application provide a random access sequence generation method, a device, and a system.

According to a first aspect, an embodiment of the present application provides a random access sequence generation method, including:

generating, by a base station, notification signaling, where the notification signaling includes indication information, the indication information is used to instruct user equipment UE to select a shift sequence number from a range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the shift sequence number is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts; and sending, by the base station, the notification signaling to the UE, so that the UE generates a random access sequence according to the indication information.

With reference to the first aspect, in a first possible implementation of the first aspect, after the sending, by the base station, the notification signaling to the UE, the method further includes:

selecting, by the base station, a shift sequence number from the range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$;

obtaining, by the base station, a cyclic shift value according to the shift sequence number; and generating, by the base station, a detection sequence according to the cyclic shift value, and detecting, by using the detection sequence, the random access sequence sent by the UE, where the random access sequence is generated by the UE according to the indication information.

With reference to the first possible implementation of the first aspect, in a second possible implementation of the first aspect, the obtaining, by the base station, a cyclic shift value according to the shift sequence number includes:

obtaining, by the base station, the cyclic shift value $C_v$ according to the shift sequence number v by using the following formula (1), formula (2), or formula (3):

$$C_v = d_{offset} + d_{start} \lfloor v/n_{shift}^{RA} \rfloor + (v \bmod n_{shift}^{RA}) N_{CS} \quad (1);$$

$$C_v = d_{offset} + \bar{d}_{start} + (v - n_{shift}^{RA} n_{group}^{RA} + \bar{n}_{shift}^{RA}) N_{CS} \quad (2);$$

$$C_v = d_{offset} + \bar{\bar{d}}_{start} + (v - n_{shift}^{RA} n_{group}^{RA} + \bar{n}_{shift}^{RA} + \bar{\bar{n}}_{shift}^{RA}) N_{CS} \quad (3), \text{where}$$

$d_{offset}$ is a shift offset, $d_{start}$ is a cyclic shift distance between neighboring groups, $n_{shift}^{RA}$ is a quantity of UE candidate sequence shifts in a group, $N_{CS}$ is a quantity of cyclic shifts that are occupied by a user, $\bar{d}_{start}$ is a cyclic shift value of a first UE candidate sequence shift in the first remaining sequence shifts, and $\bar{\bar{d}}_{start}$ is a cyclic shift value of a first UE candidate sequence shift in the second remaining sequence shifts.

With reference to the second possible implementation of the first aspect, in a third possible implementation of the first aspect, in the case of $v \leq (n_{shift}^{RA} n_{group}^{RA} + \bar{n}_{shift}^{RA} - 1)$, the base station obtains the cyclic shift value $C_v$ by using formula (1);

in the case of $(n_{shift}^{RA} n_{group}^{RA} + \bar{n}_{shift}^{RA} - 1) < v \leq (n_{shift}^{RA} n_{group}^{RA} + \bar{n}_{shift}^{RA} + \bar{\bar{n}}_{shift}^{RA} - 1)$, the base station obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \leq (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the base station obtains the cyclic shift value $C_v$ by using formula (3).

With reference to the second or the third possible implementation of the first aspect, in a fourth possible implementation of the first aspect, $n_{shift}^{RA}$, $d_{start}$, $n_{group}^{RA}$, $\bar{n}_{shift}^{RA}$, $\bar{\bar{n}}_{shift}^{RA}$, $\bar{d}_{start}$, and $\bar{\bar{d}}_{start}$ satisfy formulas (4) to (11), where formulas (4) to (11) are respectively:

$$n_{shift}^{RA} = \left\lfloor \frac{4d_u - N_{ZC}}{N_{CS}} \right\rfloor; \quad (4)$$

$$d_{start} = 4d_u - N_{ZC} + n_{shift}^{RA} \cdot N_{CS}; \quad (5)$$

$$n_{group}^{RA} = \left\lfloor \frac{d_u}{d_{start}} \right\rfloor; \quad (6)$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right); \quad (7)$$

$$\bar{\bar{n}}_{shift}^{RA} = \lfloor \min(d_u - n_{group}^{RA} \cdot d_{start}, 4d_u - N_{ZC} - \bar{n}_{shift}^{RA} N_{CS})/N_{CS} \rfloor; \quad (8)$$

-continued $$\bar{\bar{d}}_{start} = N_{ZC} - 3d_u + n_{group}^{RA} \cdot d_{start} + \bar{n}_{shift}^{RA} N_{CS}; \quad (9)$$

$$\bar{\bar{n}}_{shift}^{RA} = \lfloor((1 - \min(1, \bar{n}_{shift}^{RA}))(d_u - n_{group}^{RA} \cdot d_{start}) + \min(1, \bar{n}_{shift}^{RA}(4d_u - N_{ZC} - \bar{n}_{shift}^{RA} N_{CS}))/N_{CS}\rfloor - \bar{n}_{shift}^{RA}; \quad (10)$$

$$\bar{\bar{d}}_{start} = N_{ZC} - 2d_u + n_{group}^{RA} \cdot d_{start} + \bar{n}_{shift}^{RA} N_{CS}, \quad (11)$$

where $d_u$ is a cyclic shift corresponding to the random access sequence when a Doppler frequency shift is one time a PRACH subcarrier spacing.

With reference to the second or the third possible implementation of the first aspect, in a fifth possible implementation of the first aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (12) to (19), where formulas (12) to (19) are respectively:

$$n_{shift}^{RA} = \left\lfloor \frac{N_{ZC} - 3d_u}{N_{CS}} \right\rfloor; \quad (12)$$

$$d_{start} = N_{ZC} - 3d_u + n_{shift}^{RA} \cdot N_{CS}; \quad (13)$$

$$n_{group}^{RA} = \left\lfloor \frac{d_u}{d_{start}} \right\rfloor; \quad (14)$$

$$\bar{n}_{shift}^{RA} = \max\left(\left\lfloor \frac{4d_u - N_{ZC} - n_{group}^{RA} \cdot d_{start}}{N_{CS}} \right\rfloor, 0\right); \quad (15)$$

$$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS})/N_{CS} \rfloor; \quad (16)$$

$$\bar{\bar{d}}_{start} = d_u + n_{group}^{RA} \cdot d_{start} + \bar{n}_{shift}^{RA} N_{CS}; \quad (17)$$

$$\bar{\bar{\bar{n}}}_{shift}^{RA} = 0; \quad (18)$$

$$\bar{\bar{\bar{d}}}_{start} = 0, \quad (19)$$

where $d_u$ is a cyclic shift corresponding to the random access sequence when a Doppler frequency shift is one time a PRACH subcarrier spacing.

With reference to the second or the third possible implementation of the first aspect, in a sixth possible implementation of the first aspect, shift, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (20) to (27), where formulas (20) to (27) are respectively:

$$n_{shift}^{RA} = \left\lfloor \frac{3d_u - N_{ZC}}{N_{CS}} \right\rfloor; \quad (20)$$

$$d_{start} = 3d_u - N_{ZC} + n_{shift}^{RA} \cdot N_{CS}; \quad (21)$$

$$n_{group}^{RA} = \left\lfloor \frac{d_u}{d_{start}} \right\rfloor; \quad (22)$$

$$\bar{n}_{shift}^{RA} = \max\left(\left\lfloor \frac{N_{ZC} - 2d_u - n_{group}^{RA} \cdot d_{start}}{N_{CS}} \right\rfloor, 0\right); \quad (23)$$

$$\bar{\bar{n}}_{shift}^{RA} = 0; \quad (24)$$

$$\bar{d}_{start} = 0; \quad (25)$$

$$\bar{\bar{\bar{n}}}_{shift}^{RA} = 0; \quad (26)$$

$$\bar{\bar{\bar{d}}}_{start} = 0, \quad (27)$$

where $d_u$ is a cyclic shift corresponding to the random access sequence when a Doppler frequency shift is one time a PRACH subcarrier spacing.

With reference to the second or the third possible implementation of the first aspect, in a seventh possible implementation of the first aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (28) to (35), where formulas (28) to (35) are respectively:

$$n_{shift}^{RA} = \left\lfloor \frac{N_{ZC} - 2d_u}{N_{CS}} \right\rfloor; \quad (28)$$

$$d_{start} = 2(N_{ZC} - 2d_u) + n_{shift}^{RA} \cdot N_{CS}; \quad (29)$$

$$n_{group}^{RA} = \left\lfloor \frac{N_{ZC} - d_u}{d_{start}} \right\rfloor; \quad (30)$$

$$\bar{n}_{shift}^{RA} = \max\left(\left\lfloor \frac{3d_u - N_{ZC} - n_{group}^{RA} \cdot d_{start}}{N_{CS}} \right\rfloor, 0\right); \quad (31)$$

$$\bar{\bar{n}}_{shift}^{RA} = 0; \quad (32)$$

$$\bar{d}_{start} = 0; \quad (33)$$

$$\bar{\bar{\bar{n}}}_{shift}^{RA} = 0; \quad (34)$$

$$\bar{\bar{\bar{d}}}_{start} = 0, \quad (35)$$

where $d_u$ is a cyclic shift corresponding to the random access sequence when a Doppler frequency shift is one time a PRACH subcarrier spacing.

With reference to any one of the fourth to the seventh possible implementations of the first aspect, in an eighth possible implementation of the first aspect, in the case of $$\frac{N_{ZC} + N_{CS}}{4} \le d_u < \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv_{start}$ satisfy formulas (4) to (11), in the case of $$\frac{2}{7} N_{ZC} \le d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (12) to (19); or in the case of $$\frac{N_{ZC} + N_{CS}}{4} \le d_u \le \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (4) to (11), in the case of $$\frac{2}{7}N_{ZC} < d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}_{start}$ satisfy formulas (12) to (19);
in the case of $$\frac{N_{ZC} + N_{CS}}{3} \leq d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}$ satisfy formulas (20) to (27), in the case of $$\frac{2N_{ZC}}{5} \leq d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}$ satisfy formulas (28) to (35); or in the case of $$\frac{N_{ZC} + N_{CS}}{3} \leq d_u \leq \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}_{start}$ satisfy formulas (20) to (27), in the case of $$\frac{2N_{ZC}}{5} < d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}_{start}$ satisfy formulas (28) to (35).

According to a second aspect, an embodiment of the present application provides a random access sequence generation method, including:

receiving, by user equipment UE, notification signaling from a base station, where the notification signaling includes indication information, the indication information is used to instruct the UE to select a shift sequence number from a range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the shift sequence number is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts;

selecting, by the UE, a shift sequence number from the range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$ according to the notification signaling;

obtaining, by the UE, a cyclic shift value according to the shift sequence number; and generating, by the UE, a random access sequence according to the cyclic shift value.

With reference to the second aspect, in a first possible implementation of the second aspect, the obtaining, by the UE, a cyclic shift value according to the shift sequence number includes:

obtaining, by the UE, the cyclic shift value $C_v$ according to the shift sequence number v by using the following formula (1), formula (2), or formula (3):

$$C_v = d_{offset} + d_{start} \lfloor v/n_{shift}^{RA} \rfloor + (v \bmod n_{shift}^{RA}) N_{CS} \quad (1);$$

$$C_v = d_{offset} + \bar{d}_{start} + (v - n_{shift}^{RA} n_{group}^{RA} + \bar{n}_{shift}^{RA}) N_{CS} \quad (2);$$

$$C_v = d_{offset} + \bar{\bar{\equiv}}_{start} + (v - n_{shift}^{RA} n_{group}^{RA} + \bar{n}_{shift}^{RA} + \bar{\bar{n}}_{shift}^{RA}) N_{CS} \quad (3),$$

where $d_{offset}$ is a shift offset, $d_{start}$ is a cyclic shift distance between neighboring groups, $n_{shift}^{RA}$ is a quantity of UE candidate sequence shifts in a group, $N_{CS}$ is a quantity of cyclic shifts that are occupied by a user, $\bar{d}_{start}$ is a cyclic shift value of a first UE candidate sequence shift in the first remaining sequence shifts, and $\bar{\bar{\equiv}}$ is a cyclic shift value of a first UE candidate sequence shift in the second remaining sequence shifts.

With reference to the first possible implementation of the second aspect, in a second possible implementation of the second aspect, in the case of $v \leq (n_{shift}^{RA} n_{group}^{RA} + \bar{n}_{shift}^{RA} - 1)$, the UE obtains the cyclic shift value $C_v$ by using formula (1);

in the case of $(n_{shift}^{RA} n_{group}^{RA} + \bar{n}_{shift}^{RA} - 1) < v \leq (n_{shift}^{RA} n_{group}^{RA} + \bar{n}_{shift}^{RA} + \bar{\bar{n}}_{shift}^{RA} - 1)$, the UE obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \leq (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the UE obtains the cyclic shift value $C_v$ by using formula (3).

With reference to the first or the second possible implementation of the second aspect, in a third possible implementation of the second aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}$ satisfy formulas (4) to (11), where formulas (4) to (11) are respectively:

$$n_{shift}^{RA} = \left\lfloor \frac{4d_u - N_{ZC}}{N_{CS}} \right\rfloor; \quad (4)$$

$$d_{start} = 4d_u - N_{ZC} + n_{shift}^{RA} \cdot N_{CS}; \quad (5)$$

$$n_{group}^{RA} = \left\lfloor \frac{d_u}{d_{start}} \right\rfloor; \quad (6)$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right); \quad (7)$$

$$\bar{\bar{n}}_{shift}^{RA} = \lfloor \min(d_u - n_{group}^{RA} \cdot d_{start}, 4d_u - N_{ZC} - \bar{n}_{shift}^{RA} N_{CS})/N_{CS} \rfloor; \quad (8)$$

$$\bar{d}_{start} = N_{ZC} - 3d_u + n_{group}^{RA} \cdot d_{start} + \bar{n}_{shift}^{RA} N_{CS}; \quad (9)$$

$$\bar{\bar{\bar{n}}}_{shift}^{RA} = \lfloor ((1 - \min(1, \bar{n}_{shift}^{RA}))(d_u - n_{group}^{RA} \cdot d_{start}) + \min(1, \bar{n}_{shift}^{RA})(4d_u - N_{ZC} - \bar{n}_{shift}^{RA} N_{CS}))/N_{CS} \rfloor - \bar{\bar{n}}_{shift}^{RA}; \quad (10)$$

$$\bar{\bar{\equiv}}_{start} = N_{ZC} - 2d_u + n_{group}^{Ra} \cdot d_{start} + \bar{\bar{n}}_{shift}^{RA} N_{CS}, \quad (11)$$

where $d_u$ is a cyclic shift corresponding to the random access sequence when a Doppler frequency shift is one time a PRACH subcarrier spacing.

With reference to the first or the second possible implementation of the second aspect, in a fourth possible implementation of the second aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}$ satisfy formulas (12) to (19), where formulas (12) to (19) are respectively:

$$n_{shift}^{RA} = \left\lfloor \frac{N_{ZC} - 3d_u}{N_{CS}} \right\rfloor; \tag{12}$$

$$d_{start} = N_{ZC} - 3d_u + n_{shift}^{RA} \cdot N_{CS}; \tag{13}$$

$$n_{group}^{RA} = \left\lfloor \frac{d_u}{d_{start}} \right\rfloor; \tag{14}$$

$$\bar{n}_{shift}^{RA} = \max\left(\left\lfloor \frac{4d_u - N_{ZC} - n_{group}^{RA} \cdot d_{start}}{N_{CS}} \right\rfloor, 0\right); \tag{15}$$

$$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS})/N_{CS} \rfloor; \tag{16}$$

$$\bar{d}_{start} = d_u + n_{group}^{RA} \cdot d_{start} + \bar{n}_{shift}^{RA} N_{CS}; \tag{17}$$

$$\bar{\bar{n}}_{shift}^{RA} = 0; \tag{18}$$

$$\bar{\bar{d}}_{start} = 0, \tag{19}$$

where $d_u$ is a cyclic shift corresponding to the random access sequence when a Doppler frequency shift is one time a PRACH subcarrier spacing.

With reference to the first or the second possible implementation of the second aspect, in a fifth possible implementation of the second aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), where formulas (20) to (27) are respectively:

$$n_{shift}^{RA} = \left\lfloor \frac{3d_u - N_{ZC}}{N_{CS}} \right\rfloor; \tag{20}$$

$$d_{start} = 3d_u - N_{ZC} + n_{shift}^{RA} \cdot N_{CS}; \tag{21}$$

$$n_{group}^{RA} = \left\lfloor \frac{d_u}{d_{start}} \right\rfloor; \tag{22}$$

$$\bar{n}_{shift}^{RA} = \max\left(\left\lfloor \frac{N_{ZC} - 2d_u - n_{group}^{RA} \cdot d_{start}}{N_{CS}} \right\rfloor, 0\right); \tag{23}$$

$$\bar{\bar{n}}_{shift}^{RA} = 0; \tag{24}$$

$$\bar{d}_{start} = 0; \tag{25}$$

$$\bar{\bar{n}}_{shift}^{RA} = 0; \tag{26}$$

$$\bar{\bar{d}}_{start} = 0, \tag{27}$$

where $d_u$ is a cyclic shift corresponding to the random access sequence when a Doppler frequency shift is one time a PRACH subcarrier spacing.

With reference to the first or the second possible implementation of the second aspect, in a sixth possible implementation of the second aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35), where formulas (28) to (35) are respectively:

$$n_{shift}^{RA} = \left\lfloor \frac{N_{ZC} - 2d_u}{N_{CS}} \right\rfloor; \tag{28}$$

$$d_{start} = 2(N_{ZC} - 2d_u) + n_{shift}^{RA} \cdot N_{CS}; \tag{29}$$

$$n_{group}^{RA} = \left\lfloor \frac{N_{ZC} - d_u}{d_{start}} \right\rfloor; \tag{30}$$

$$\bar{n}_{shift}^{RA} = \max\left(\left\lfloor \frac{3d_u - N_{ZC} - n_{group}^{RA} \cdot d_{start}}{N_{CS}} \right\rfloor, 0\right); \tag{31}$$

$$\bar{\bar{n}}_{shift}^{RA} = 0; \tag{32}$$

$$\bar{d}_{start} = 0; \tag{33}$$

$$\bar{\bar{\bar{n}}}_{shift}^{RA} = 0; \tag{34}$$

$$\bar{\bar{d}}_{start} = 0, \tag{35}$$

where $d_u$ is a cyclic shift corresponding to the random access sequence when a Doppler frequency shift is one time a PRACH subcarrier spacing.

With reference to any one of the third to the sixth possible implementations of the second aspect, in a seventh possible implementation of the second aspect, in the case of $$\frac{N_{ZC} + N_{CS}}{4} \leq d_u < \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11), in the case of $$\frac{2}{7}N_{ZC} \leq d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19); or in the case of $$\frac{N_{ZC} + N_{CS}}{4} \leq d_u \leq \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7}N_{ZC} < d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (12) to (19);

in the case of $$\frac{N_{ZC} + N_{CS}}{3} \leq d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ start satisfy formulas (20) to (27), in the case of $$\frac{2N_{ZC}}{5} \leq d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}$ satisfy formulas (28) to (35); or in the case of $$\frac{N_{ZC} + N_{CS}}{3} \leq d_u \leq \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}_{start}$ satisfy formulas (20) to (27), in the case of $$\frac{2N_{ZC}}{5} < d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}_{start}$ satisfy formulas (28) to (35).

With reference to any one of the second aspect, or the first to the seventh possible implementations of the second aspect, in an eighth possible implementation of the second aspect, the generating, by the UE, a random access sequence according to the cyclic shift value includes:

generating, by the UE, the random access sequence $x_{u,C_v}(n)$ according to the cyclic shift value $C_v$ by using the following formula (36):

$$x_{u,C_v}(n) = x_u((n+C_v) \bmod N_{ZC}) \quad (36), \text{ where}$$

$N_{ZC}$ is a sequence length, and a ZC sequence whose root is u is defined as:

$$x_u(n) = e^{-j\frac{\pi u n(n+1)}{N_{ZC}}},$$

$0 \leq n \leq N_{ZC} - 1$.

According to a third aspect, an embodiment of the present application provides a random access sequence generation method, including:

selecting, by a base station, a shift sequence number v from a range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, where v is an integer, $n_{shift}^{RA}$ is a quantity of user equipment UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts; and obtaining, by the base station, a cyclic shift value $C_v$ according to the shift sequence number v by using the following formula (1), formula (2), or formula (3):

$$C_v = d_{offset} + d_{start}\lfloor v/n_{shift}^{RA}\rfloor + (v \bmod n_{shift}^{RA})N_{CS} \quad (1)$$

$$C_v = d_{offset} + \bar{d}_{start} + (v - n_{shift}^{RA} n_{group}^{RA} + \bar{n}_{shift}^{RA})N_{CS} \quad (2)$$

$$C_v = d_{offset} + \bar{\bar{\equiv}}_{start} + (v - n_{shift}^{RA} n_{group}^{RA} + \bar{n}_{shift}^{RA} + \bar{\bar{n}}_{shift}^{RA})N_{CS} \quad (3), \text{ where}$$

$d_{offset}$ is a shift offset, $d_{start}$ is a cyclic shift distance between neighboring groups, $n_{shift}^{RA}$ is a quantity of UE candidate sequence shifts in a group, $N_{CS}$ is a quantity of cyclic shifts that are occupied by a user, $\bar{d}_{start}$ is a cyclic shift value of a first UE candidate sequence shift in the first remaining sequence shifts, and $\bar{\bar{\equiv}}$ is a cyclic shift value of a first UE candidate sequence shift in the second remaining sequence shifts, where $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}_{start}$ satisfy formulas (4) to (11); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}$ satisfy formulas (12) to (19); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}$ satisfy formulas (20) to (27); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}$ satisfy formulas (28) to (35), where $$n_{shift}^{RA} = \left\lfloor \frac{4d_u - N_{ZC}}{N_{CS}} \right\rfloor; \quad (4)$$

$$d_{start} = 4d_u - N_{ZC} + n_{shift}^{RA} \cdot N_{CS}; \quad (5)$$

$$n_{group}^{RA} = \left\lfloor \frac{d_u}{d_{start}} \right\rfloor; \quad (6)$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right); \quad (7)$$

$$\bar{\bar{n}}_{shift}^{RA} = \lfloor \min(d_u - n_{group}^{RA} \cdot d_{start}, 4d_u - N_{ZC} - \bar{n}_{shift}^{RA} N_{CS})/N_{CS} \rfloor; \quad (8)$$

$$\bar{d}_{start} = N_{ZC} - 3d_u + n_{group}^{RA} \cdot d_{start} + \bar{n}_{shift}^{RA} N_{CS}; \quad (9)$$

$$\bar{\bar{\bar{n}}}_{shift}^{RA} = \lfloor((1 - \min(1, \bar{n}_{shift}^{RA}))(d_u - n_{group}^{RA} \cdot d_{start}) + \min(1, \bar{n}_{shift}^{RA})(4d_u - N_{ZC} - \bar{n}_{shift}^{RA} N_{CS}))/N_{CS} \rfloor - \bar{\bar{n}}_{shift}^{RA}; \quad (10)$$

$$\bar{\bar{\equiv}}_{start} = N_{ZC} - 2d_u + n_{group}^{Ra} \cdot d_{start} + \bar{\bar{n}}_{shift}^{RA} N_{CS}; \quad (11)$$

$$n_{shift}^{RA} = \left\lfloor \frac{N_{ZC} - 3d_u}{N_{CS}} \right\rfloor; \quad (12)$$

$$d_{start} = N_{ZC} - 3d_u + n_{shift}^{RA} \cdot N_{CS}; \quad (13)$$

$$n_{group}^{RA} = \left\lfloor \frac{d_u}{d_{start}} \right\rfloor; \quad (14)$$

$$\bar{n}_{shift}^{RA} = \max\left(\left\lfloor \frac{4d_u - N_{ZC} - n_{group}^{RA} \cdot d_{start}}{N_{CS}} \right\rfloor, 0\right); \quad (15)$$

$$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS})/N_{CS} \rfloor; \quad (16)$$

$$\bar{d}_{start} = d_u + n_{group}^{RA} \cdot d_{start} + \bar{n}_{shift}^{RA} N_{CS}; \quad (17)$$

$$\bar{\bar{\bar{n}}}_{shift}^{RA} = 0; \quad (18)$$

$$\bar{\bar{\equiv}}_{start} = 0; \quad (19)$$

$$n_{shift}^{RA} = \left\lfloor \frac{3d_u - N_{ZC}}{N_{CS}} \right\rfloor; \quad (20)$$

$$d_{start} = 3d_u - N_{ZC} + n_{shift}^{RA} \cdot N_{CS}; \quad (21)$$

$$n_{group}^{RA} = \left\lfloor \frac{d_u}{d_{start}} \right\rfloor; \quad (22)$$

$$\bar{n}_{shift}^{RA} = \max\left(\left\lfloor \frac{N_{ZC} - 2d_u - n_{group}^{RA} \cdot d_{start}}{N_{CS}} \right\rfloor, 0\right); \quad (23)$$

$$\bar{\bar{n}}_{shift}^{RA} = 0; \quad (24)$$

$$\bar{d}_{start} = 0; \quad (25)$$

$$\bar{\bar{\bar{n}}}_{shift}^{RA} = 0; \quad (26)$$

-continued $$\overline{\overline{d}}_{start} = 0; \tag{27}$$

$$n_{shift}^{RA} = \left\lfloor \frac{N_{ZC} - 2d_u}{N_{CS}} \right\rfloor; \tag{28}$$

$$d_{start} = 2(N_{ZC} - 2d_u) + n_{shift}^{RA} \cdot N_{CS}; \tag{29}$$

$$n_{group}^{RA} = \left\lfloor \frac{N_{ZC} - d_u}{d_{start}} \right\rfloor; \tag{30}$$

$$\overline{n}_{shift}^{RA} = \max\left(\left\lfloor \frac{3d_u - N_{ZC} - n_{group}^{RA} \cdot d_{start}}{N_{CS}} \right\rfloor, 0\right); \tag{31}$$

$$\overline{\overline{n}}_{shift}^{RA} = 0; \tag{32}$$

$$\overline{d}_{start} = 0; \tag{33}$$

$$\overline{\overline{n}}_{shift}^{RA} = 0; \tag{34}$$

$$\overline{\overline{d}}_{start} = 0, \tag{35}$$

where $N_{ZC}$ is a sequence length, and $d_u$ is a cyclic shift corresponding to the random access sequence when a Doppler frequency shift is one time a PRACH subcarrier spacing.

With reference to the third aspect, in a first possible implementation of the third aspect, in the case of $v \leq (n_{shift}^{RA} n_{group}^{RA} + \overline{n}_{shift}^{RA} - 1)$, the base station obtains the cyclic shift value $C_v$ by using formula (1); in the case of $(n_{shift}^{RA} n_{group}^{RA} + \overline{n}_{shift}^{RA} - 1) < v \leq (n_{shift}^{RA} n_{group}^{RA} + \overline{n}_{shift}^{RA} + \overline{\overline{n}}_{shift}^{RA} - 1)$, the base station obtains the cyclic shift value $C_v$ by using formula (2); in the case of $(n_{shift}^{RA} n_{group}^{RA} + \overline{n}_{shift}^{RA} + \overline{\overline{n}}_{shift}^{RA} - 1) < v \leq (n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$, the base station obtains the cyclic shift value $C_v$ by using formula (3).

With reference to the third aspect or the first possible implementation of the third aspect, in a second possible implementation of the third aspect, in the case of $$\frac{N_{ZC} + N_{CS}}{4} \leq d_u < \frac{2}{7} N_{ZC},$$

$n_{shift}^{RA}, d_{start}, n_{group}^{RA}, \overline{n}_{shift}^{RA}, \overline{\overline{n}}_{shift}^{RA}, \overline{\overline{\overline{n}}}, \overline{d}_{start}$, and $\equiv$ satisfy formulas (4) to (11), in the case of $$\frac{2}{7} N_{ZC} \leq d_u \leq \frac{N_{ZC} - N_{CS}}{3},$$

$n_{shift}^{RA}, d_{start}, n_{group}^{RA}, \overline{n}_{shift}^{RA}, \overline{\overline{n}}_{shift}^{RA}, \overline{\overline{\overline{n}}}, \overline{d}_{start}$, and $\equiv$ start satisfy formulas (12) to (19); or in the case of $$\frac{N_{ZC} + N_{CS}}{4} \leq d_u \leq \frac{2}{7} N_{ZC},$$

$n_{shift}^{RA}, d_{start}, n_{group}^{RA}, \overline{n}_{shift}^{RA}, \overline{\overline{n}}_{shift}^{RA}, \overline{\overline{\overline{n}}}, \overline{d}_{start}$, and $\equiv$ satisfy formulas (4) to (11), in the case of $$\frac{2}{7} N_{ZC} < d_u \leq \frac{N_{ZC} - N_{CS}}{3}.$$

$n_{shift}^{RA}, d_{start}, n_{group}^{RA}, \overline{n}_{shift}^{RA}, \overline{\overline{n}}_{shift}^{RA}, \overline{\overline{\overline{n}}}, \overline{d}_{start}$, and $\equiv$ satisfy formulas (12) to (19); in the case of $$\frac{N_{ZC} + N_{CS}}{3} \leq d_u < \frac{2 N_{ZC}}{5},$$

$n_{shift}^{RA}, d_{start}, n_{group}^{RA}, \overline{n}_{shift}^{RA}, \overline{\overline{n}}_{shift}^{RA}, \overline{\overline{\overline{n}}}, \overline{d}_{start}$, and $\equiv$ start satisfy formulas (20) to (27), in the case of $$\frac{2 N_{ZC}}{5} \leq d_u \leq \frac{N_{ZC} - N_{CS}}{2},$$

$n_{shift}^{RA}, d_{start}, n_{group}^{RA}, \overline{n}_{shift}^{RA}, \overline{\overline{n}}_{shift}^{RA}, \overline{\overline{\overline{n}}}, \overline{d}_{start}$, and $\equiv$ satisfy formulas (28) to (35); or in the case of $$\frac{N_{ZC} + N_{CS}}{3} \leq d_u \leq \frac{2 N_{ZC}}{5},$$

$n_{shift}^{RA}, d_{start}, n_{group}^{RA}, \overline{n}_{shift}^{RA}, \overline{\overline{n}}_{shift}^{RA}, \overline{\overline{\overline{n}}}, \overline{d}_{start}$, and $\equiv$ start satisfy formulas (20) to (27), in the case of $$\frac{2 N_{ZC}}{5} < d_u \leq \frac{N_{ZC} - N_{CS}}{2},$$

$n_{shift}^{RA}, d_{start}, n_{group}^{RA}, \overline{n}_{shift}^{RA}, \overline{\overline{n}}_{shift}^{RA}, \overline{\overline{\overline{n}}}, \overline{d}_{start}$, and $\equiv$ start satisfy formulas (28) to (35).

According to a fourth aspect, an embodiment of the present application provides a random access sequence generation method, including:

selecting, by user equipment UE, a shift sequence number v from a range of 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$, where v is an integer, $n_{shift}^{RA}$ is a quantity of UE candidate sequence shifts in a group, $n_{group}^{RA}$ is a quantity of groups, $\overline{n}_{shift}^{RA}$ is a quantity of UE candidate sequence shifts in the last length that is insufficient for a group, $\overline{\overline{n}}_{shift}^{RA}$ is a quantity of UE candidate sequence shifts in first remaining sequence shifts, and $\overline{\overline{\overline{n}}}_{shift}^{RA}$ is a quantity of UE candidate sequence shifts in second remaining sequence shifts;

obtaining, by the UE, a cyclic shift value $C_v$ according to the shift sequence number v by using the following formula (1), formula (2), or formula (3):

$$C_v = d_{offset} + d_{start} \lfloor v/n_{shift}^{RA} \rfloor + (v \bmod n_{shift}^{RA}) N_{CS} \tag{1}$$

$$C_v = d_{offset} + \overline{d}_{start} + (v - n_{shift}^{RA} n_{group}^{RA} + \overline{n}_{shift}^{RA}) N_{CS} \tag{2}$$

$$C_v = d_{offset} + \overline{\overline{d}}_{start} + (v - n_{shift}^{RA} n_{group}^{RA} + \overline{n}_{shift}^{RA} + \overline{\overline{n}}_{shift}^{RA}) N_{CS} \tag{3}, \text{ where}$$

$d_{offset}$ is a shift offset, $d_{start}$ is a cyclic shift distance between neighboring groups, $n_{shift}^{RA}$ is a quantity of UE candidate sequence shifts in a group, $N_{CS}$ is a quantity of cyclic shifts that are occupied by a user, $\overline{d}_{start}$ is a cyclic shift value of a first UE candidate sequence shift in the first remaining sequence shifts, and $\equiv$ is a cyclic shift value of a first UE candidate sequence shift in the second remaining sequence shifts; and generating, by the UE, a random access sequence $x_{u,C_v}(n)$ according to the cyclic shift value $C_v$ by using the following formula (36):

$$x_{u,C_v}(n) = x_u((n + C_v) \bmod N_{ZC}) \tag{36}, \text{ where}$$

$N_{ZC}$ is a sequence length, and a ZC sequence whose root is u is defined as:

$$x_u(n) = e^{-j\frac{\pi u n(n+1)}{N_{ZC}}},$$

$0 \le n \le N_{ZC}-1$, where $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\bar{\bar{\bar{=}}}_{start}$ satisfy formulas (4) to (11); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (12) to (19); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (20) to (27); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (28) to (35), where $n_{shift}^{RA} = \lfloor 4d_u - N_{ZC}/N_{CS} \rfloor$ (4);

$d_{start} = 4d_u - N_{ZC} + n_{shift}^{RA} \cdot N_{CS}$ (5);

$n_{group}^{RA} = \lfloor d_u/d_{start} \rfloor$ (6);

$\bar{n}_{shift}^{RA} = \max(\lfloor N_{ZC} - 3d_u - n_{group}^{RA} \cdot d_{start}/N_{CS} \rfloor, 0)$ (7);

$\bar{\bar{n}}_{shift}^{RA} = \lfloor \min(d_u - n_{group}^{RA} \cdot d_{start}, 4d_u - N_{ZC} - \bar{n}_{shift}^{RA} N_{CS})/N_{CS} \rfloor;$ (8)

$\bar{\bar{d}}_{start} = N_{ZC} - 3d_u + n_{group}^{RA} \cdot d_{start} + \bar{n}_{shift}^{RA} N_{CS};$ (9)

$\bar{\bar{\bar{n}}}_{shift}^{RA} = \lfloor ((1 - \min(1, \bar{n}_{shift}^{RA}))(d_u - n_{group}^{RA} \cdot d_{start}) + \min(1, \bar{n}_{shift}^{RA})(4d_u - N_{ZC} - \bar{n}_{shift}^{RA} N_{CS}))/N_{CS} \rfloor - \bar{\bar{n}}_{shift}^{RA};$ (10)

$\bar{\bar{\bar{d}}}_{start} = N_{ZC} - 2d_u + n_{group}^{Ra} \cdot d_{start} + \bar{\bar{n}}_{shift}^{RA} N_{CS};$ (11)

$n_{shift}^{RA} = \lfloor \frac{N_{ZC} - 3d_u}{N_{CS}} \rfloor;$ (12)

$d_{start} = N_{ZC} - 3d_u + n_{shift}^{RA} \cdot N_{CS};$ (13)

$n_{group}^{RA} = \lfloor \frac{d_u}{d_{start}} \rfloor;$ (14)

$\bar{n}_{shift}^{RA} = \max\left(\left\lfloor \frac{4d_u - N_{ZC} - n_{group}^{RA} \cdot d_{start}}{N_{CS}} \right\rfloor, 0\right);$ (15)

$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS})/N_{CS} \rfloor;$ (16)

$\bar{\bar{d}}_{start} = d_u + n_{group}^{RA} \cdot d_{start} + \bar{n}_{shift}^{RA} N_{CS};$ (17)

$\bar{\bar{\bar{n}}}_{shift}^{RA} = 0;$ (18)

$\bar{\bar{\bar{d}}}_{start} = 0;$ (19)

$n_{shift}^{RA} = \lfloor \frac{3d_u - N_{ZC}}{N_{CS}} \rfloor;$ (20)

$d_{start} = 3d_u - N_{ZC} + n_{shift}^{RA} \cdot N_{CS};$ (21)

$n_{group}^{RA} = \lfloor \frac{d_u}{d_{start}} \rfloor;$ (22)

$\bar{n}_{shift}^{RA} = \max\left(\left\lfloor \frac{N_{ZC} - 2d_u - n_{group}^{RA} \cdot d_{start}}{N_{CS}} \right\rfloor, 0\right);$ (23)

$\bar{\bar{n}}_{shift}^{RA} = 0;$ (24)

$\bar{\bar{d}}_{start} = 0;$ (25)

$\bar{\bar{\bar{n}}}_{shift}^{RA} = 0;$ (26)

$\bar{\bar{\bar{d}}}_{start} = 0;$ (27)

$n_{shift}^{RA} = \lfloor \frac{N_{ZC} - 2d_u}{N_{CS}} \rfloor;$ (28)

$d_{start} = 2(N_{ZC} - 2d_u) + n_{shift}^{RA} \cdot N_{CS};$ (29)

$n_{group}^{RA} = \lfloor \frac{N_{ZC} - d_u}{d_{start}} \rfloor;$ (30)

$\bar{n}_{shift}^{RA} = \max\left(\left\lfloor \frac{3d_u - N_{ZC} - n_{group}^{RA} \cdot d_{start}}{N_{CS}} \right\rfloor, 0\right);$ (31)

$\bar{\bar{n}}_{shift}^{RA} = 0;$ (32)

$\bar{\bar{d}}_{start} = 0;$ (33)

$\bar{\bar{\bar{n}}}_{shift}^{RA} = 0;$ (34)

$\bar{\bar{\bar{d}}}_{start} = 0,$ (35)

where $d_u$ is a cyclic shift corresponding to the random access sequence when a Doppler frequency shift is one time a PRACH subcarrier spacing.

With reference to the fourth aspect, in a first possible implementation of the fourth aspect, in the case of $v \le (n_{shift}^{RA} n_{group}^{RA} + \bar{n}_{shift}^{RA} - 1)$, the UE obtains the cyclic shift value $C_v$ by using formula (1);

in the case of $(n_{shift}^{RA} n_{group}^{RA} + \bar{n}_{shift}^{RA} - 1) < v \le (n_{shift}^{RA} n_{group}^{RA} + \bar{n}_{shift}^{RA} + \bar{\bar{n}}_{shift}^{RA} - 1)$, the UE obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \le (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the UE obtains the cyclic shift value $C_v$ by using formula (3).

With reference to the fourth aspect or the first possible implementation of the fourth aspect, in a second possible implementation of the fourth aspect, in the case of $$\frac{N_{ZC} + N_{CS}}{4} \le d_u < \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv_{start}$ satisfy formulas (4) to (11), in the case of $$\frac{2}{7} N_{ZC} \le d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (12) to (19); or in the case of $$\frac{N_{ZC} + N_{CS}}{4} \le d_u \le \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (4) to (11), in the case of $$\frac{2}{7}N_{ZC} < d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\bar{\bar{\equiv}}$ satisfy formulas (12) to (19);
in the case of $$\frac{N_{ZC} + N_{CS}}{3} \leq d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\bar{\bar{\equiv}}$ satisfy formulas (20) to (27), in the case of $$\frac{2N_{ZC}}{5} \leq d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\bar{\bar{\equiv}}$ satisfy formulas (28) to (35); or in the case of $$\frac{N_{ZC} + N_{CS}}{3} \leq d_u \leq \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\bar{\bar{\equiv}}_{start}$ satisfy formulas (20) to (27), in the case of $$\frac{2N_{ZC}}{5} < d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\bar{\bar{\equiv}}_{start}$ satisfy formulas (28) to (35).

According to a fifth aspect, an embodiment of the present application provides a base station, including:
a generation module, configured to generate notification signaling, where the notification signaling includes indication information, the indication information is used to instruct user equipment UE to select a shift sequence number from a range of 0 to $(n_{shift}^{RA}n_{group}^{RA}+\bar{n}_{shift}^{RA}+\bar{\bar{n}}_{shift}^{RA}+\bar{\bar{\bar{n}}}_{shift}^{RA}-1)$, the shift sequence number is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts; and
a sending module, configured to send the notification signaling to the UE, so that the UE generates a random access sequence according to the indication information.

With reference to the fifth aspect, in a first possible implementation of the fifth aspect, the base station further includes:
a shift sequence number determining module, configured to select a shift sequence number from the range of 0 to $(n_{shift}^{RA}n_{group}^{RA}+\bar{n}_{shift}^{RA}+\bar{\bar{n}}_{shift}^{RA}+\bar{\bar{\bar{n}}}_{shift}^{RA}-1)$;
a cyclic shift value determining module, configured to obtain a cyclic shift value according to the shift sequence number; and
a random access sequence detection module, configured to: generate a detection sequence according to the cyclic shift value, and detect, by using the detection sequence, the random access sequence sent by the UE, where the random access sequence is generated by the UE according to the indication information.

With reference to the first possible implementation of the fifth aspect, in a second possible implementation of the fifth aspect, the cyclic shift value determining module is specifically configured to:
obtain the cyclic shift value $C_v$ according to the shift sequence number v by using the following formula (1), formula (2), or formula (3):

$$C_v = d_{offset} + d_{start}\lfloor v/n_{shift}^{RA}\rfloor + (v \bmod n_{shift}^{RA})N_{CS} \quad (1);$$

$$C_v = d_{offset} + \bar{d}_{start} + (v - n_{shift}^{RA}n_{group}^{RA} + \bar{n}_{shift}^{RA})N_{CS} \quad (2);$$

$$C_v = d_{offset} + \bar{\bar{d}}_{start} + (v - n_{shift}^{RA}n_{group}^{RA} + \bar{n}_{shift}^{RA} + \bar{\bar{n}}_{shift}^{RA})N_{CS} \quad (3),$$ where $d_{offset}$ is a shift offset, $d_{start}$ is a cyclic shift distance between neighboring groups, $n_{shift}^{RA}$ is a quantity of UE candidate sequence shifts in a group, $N_{CS}$ is a quantity of cyclic shifts that are occupied by a user, $\bar{d}_{start}$ is a cyclic shift value of a first UE candidate sequence shift in the first remaining sequence shifts, and $\bar{\bar{\equiv}}$ is a cyclic shift value of a first UE candidate sequence shift in the second remaining sequence shifts.

With reference to the second possible implementation of the first aspect, in a third possible implementation of the first aspect, in the case of $v \leq (n_{shift}^{RA}n_{group}^{RA} + \bar{n}_{shift}^{RA} - 1)$, the cyclic shift value determining module obtains the cyclic shift value $C_v$ by using formula (1);
in the case of $(n_{shift}^{RA}n_{group}^{RA} + \bar{n}_{shift}^{RA} - 1) < v \leq (n_{shift}^{RA}n_{group}^{RA} + \bar{n}_{shift}^{RA} + \bar{\bar{n}}_{shift}^{RA} - 1)$, the cyclic shift value determining module obtains the cyclic shift value $C_v$ by using formula (2);
in the case of $(n_{shift}^{RA}n_{group}^{RA} + \bar{n}_{shift}^{RA} + \bar{\bar{n}}_{shift}^{RA} - 1) < v \leq (n_{shift}^{RA}n_{group}^{RA} + \bar{n}_{shift}^{RA} + \bar{\bar{n}}_{shift}^{RA} + \bar{\bar{\bar{n}}}_{shift}^{RA} - 1)$, the cyclic shift value determining module obtains the cyclic shift value $C_v$ by using formula (3).

With reference to the second or the third possible implementation of the fifth aspect, in a fourth possible implementation of the fifth aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\bar{\bar{\equiv}}$ satisfy formulas (4) to (11), where
formulas (4) to (11) are respectively:

$$n_{shift}^{RA} = \left\lfloor \frac{4d_u - N_{ZC}}{N_{CS}} \right\rfloor; \quad (4)$$

$$d_{start} = 4d_u - N_{ZC} + n_{shift}^{RA} \cdot N_{CS}; \quad (5)$$

$$n_{group}^{RA} = \left\lfloor \frac{d_u}{d_{start}} \right\rfloor; \quad (6)$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right); \quad (7)$$

$$\bar{\bar{n}}_{shift}^{RA} = \lfloor \min(d_u - n_{group}^{RA} \cdot d_{start}, 4d_u - N_{ZC} - \bar{n}_{shift}^{RA}N_{CS})/N_{CS}\rfloor; \quad (8)$$

$$\bar{d}_{start} = N_{ZC} - 3d_u + n_{group}^{RA} \cdot d_{start} + \bar{n}_{shift}^{RA}N_{CS}; \quad (9)$$

$$\bar{\bar{n}}_{shift}^{RA} = \lfloor((1 - \min(1, \bar{n}_{shift}^{RA}))(d_u - n_{group}^{RA} \cdot d_{start}) + \min(1, \bar{n}_{shift}^{RA})(4d_u - N_{ZC} - \bar{n}_{shift}^{RA}N_{CS}))/N_{CS}\rfloor - \bar{n}_{shift}^{RA}; \quad (10)$$

$$\bar{\bar{d}}_{start} = N_{ZC} - 2d_u + n_{group}^{Ra} \cdot d_{start} + \bar{n}_{shift}^{RA}N_{CS}, \quad (11)$$

where $d_u$ is a cyclic shift corresponding to the random access sequence when a Doppler frequency shift is one time a PRACH subcarrier spacing.

With reference to the second or the third possible implementation of the fifth aspect, in a fifth possible implementation of the fifth aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (12) to (19), where formulas (12) to (19) are respectively:

$$n_{shift}^{RA} = \left\lfloor \frac{N_{ZC} - 3d_u}{N_{CS}} \right\rfloor; \quad (12)$$

$$d_{start} = N_{ZC} - 3d_u + n_{shift}^{RA} \cdot N_{CS}; \quad (13)$$

$$n_{group}^{RA} = \left\lfloor \frac{d_u}{d_{start}} \right\rfloor; \quad (14)$$

$$\bar{n}_{shift}^{RA} = \max\left(\left\lfloor \frac{4d_u - N_{ZC} - n_{group}^{RA} \cdot d_{start}}{N_{CS}} \right\rfloor, 0\right); \quad (15)$$

$$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS})/N_{CS} \rfloor; \quad (16)$$

$$\bar{d}_{start} = d_u + n_{group}^{RA} \cdot d_{start} + \bar{n}_{shift}^{RA} N_{CS}; \quad (17)$$

$$\bar{\bar{n}}_{shift}^{RA} = 0; \quad (18)$$

$$\bar{\bar{d}}_{start} = 0, \quad (19)$$

where $d_u$ is a cyclic shift corresponding to the random access sequence when a Doppler frequency shift is one time a PRACH subcarrier spacing.

With reference to the second or the third possible implementation of the fifth aspect, in a sixth possible implementation of the fifth aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (20) to (27), where formulas (20) to (27) are respectively:

$$n_{shift}^{RA} = \left\lfloor \frac{3d_u - N_{ZC}}{N_{CS}} \right\rfloor; \quad (20)$$

$$d_{start} = 3d_u - N_{ZC} + n_{shift}^{RA} \cdot N_{CS}; \quad (21)$$

$$n_{group}^{RA} = \left\lfloor \frac{d_u}{d_{start}} \right\rfloor; \quad (22)$$

$$\bar{n}_{shift}^{RA} = \max\left(\left\lfloor \frac{N_{ZC} - 2d_u - n_{group}^{RA} \cdot d_{start}}{N_{CS}} \right\rfloor, 0\right); \quad (23)$$

$$\bar{\bar{n}}_{shift}^{RA} = 0; \quad (24)$$

$$\bar{d}_{start} = 0; \quad (25)$$

$$\bar{\bar{n}}_{shift}^{RA} = 0; \quad (26)$$

$$\bar{\bar{d}}_{start} = 0, \quad (27)$$

where $d_u$ is a cyclic shift corresponding to the random access sequence when a Doppler frequency shift is one time a PRACH subcarrier spacing.

With reference to the second or the third possible implementation of the fifth aspect, in a seventh possible implementation of the fifth aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (28) to (35), where formulas (28) to (35) are respectively:

$$n_{shift}^{RA} = \left\lfloor \frac{N_{ZC} - 2d_u}{N_{CS}} \right\rfloor; \quad (28)$$

$$d_{start} = 2(N_{ZC} - 2d_u) + n_{shift}^{RA} \cdot N_{CS}; \quad (29)$$

$$n_{group}^{RA} = \left\lfloor \frac{N_{ZC} - d_u}{d_{start}} \right\rfloor; \quad (30)$$

$$\bar{n}_{shift}^{RA} = \max\left(\left\lfloor \frac{3d_u - N_{ZC} - n_{group}^{RA} \cdot d_{start}}{N_{CS}} \right\rfloor, 0\right); \quad (31)$$

$$\bar{\bar{n}}_{shift}^{RA} = 0; \quad (32)$$

$$\bar{\bar{d}}_{start} = 0; \quad (33)$$

$$\bar{\bar{n}}_{shift}^{RA} = 0; \quad (34)$$

$$\bar{\bar{d}}_{start} = 0, \quad (35)$$

where $d_u$ is a cyclic shift corresponding to the random access sequence when a Doppler frequency shift is one time a PRACH subcarrier spacing.

With reference to any one of the fourth to the seventh possible implementations of the fifth aspect, in an eighth possible implementation of the fifth aspect, in the case of $$\frac{N_{ZC} + N_{CS}}{4} \leq d_u < \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv_{start}$ satisfy formulas (4) to (11), in the case of $$\frac{2}{7}N_{ZC} \leq d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (12) to (19); or in the case of $$\frac{N_{ZC} + N_{CS}}{4} \leq d_u \leq \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (4) to (11), in the case of $$\frac{2}{7}N_{ZC} < d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv_{start}$ satisfy formulas (12) to (19);

in the case of $$\frac{N_{ZC} + N_{CS}}{3} \leq d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (20) to (27), in the case of $$\frac{2N_{ZC}}{5} \leq d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35); or in the case of $$\frac{N_{ZC} + N_{CS}}{3} \leq d_u \leq \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (20) to (27), in the case of $$\frac{2N_{ZC}}{5} < d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

According to a sixth aspect, an embodiment of the present application provides user equipment UE, including:

a receiving module, configured to receive notification signaling from a base station, where the notification signaling includes indication information, the indication information is used to instruct the UE to select a shift sequence number from a range of 0 to ($n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1$), the shift sequence number is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts;

a shift sequence number determining module, configured to select a shift sequence number from the range of 0 to ($n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1$) according to the notification signaling;

a cyclic shift value determining module, configured to obtain a cyclic shift value according to the shift sequence number; and a random access sequence generation module, configured to generate a random access sequence according to the cyclic shift value.

With reference to the sixth aspect, in a first possible implementation of the sixth aspect, the cyclic shift value determining module is specifically configured to:

obtain the cyclic shift value $C_v$ according to the shift sequence number v by using the following formula (1), formula (2), or formula (3):

$$C_v = d_{offset} + d_{start} \lfloor v/n_{shift}^{RA} \rfloor + (v \bmod n_{shift}^{RA}) N_{CS} \quad (1);$$

$$C_v = d_{offset} + \bar{d}_{start} + (v - n_{shift}^{RA} n_{group}^{RA} + \bar{n}_{shift}^{RA}) N_{CS} \quad (2);$$

$$C_v = d_{offset} + \bar{\bar{d}}_{start} + (v - n_{shift}^{RA} n_{group}^{RA} + \bar{n}_{shift}^{RA} + \bar{\bar{n}}_{shift}^{RA}) N_{CS} \quad (3),$$

where $d_{offset}$ is a shift offset, $d_{start}$ is a cyclic shift distance between neighboring groups, $n_{shift}^{RA}$ is a quantity of UE candidate sequence shifts in a group, $N_{CS}$ is a quantity of cyclic shifts that are occupied by a user, $\bar{d}_{start}$ is a cyclic shift value of a first UE candidate sequence shift in the first remaining sequence shifts, and $\equiv$ is a cyclic shift value of a first UE candidate sequence shift in the second remaining sequence shifts.

With reference to the first possible implementation of the sixth aspect, in a second possible implementation of the sixth aspect, in the case of $v \leq (n_{shift}^{RA} n_{group}^{RA} + \bar{n}_{shift}^{RA} - 1)$, the cyclic shift value determining module obtains the cyclic shift value $C_v$ by using formula (1);

in the case of $(n_{shift}^{RA} n_{group}^{RA} + \bar{n}_{shift}^{RA} - 1) < v \leq (n_{shift}^{RA} n_{group}^{RA} + \bar{n}_{shift}^{RA} + \bar{\bar{n}}_{shift}^{RA} - 1)$, the cyclic shift value determining module obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \leq (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the cyclic shift value determining module obtains the cyclic shift value $C_v$ by using formula (3).

With reference to the first or the second possible implementation of the sixth aspect, in a third possible implementation of the sixth aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), where formulas (4) to (11) are respectively:

$$n_{shift}^{RA} = \left\lfloor \frac{4d_u - N_{ZC}}{N_{CS}} \right\rfloor; \quad (4)$$

$$d_{start} = 4d_u - N_{ZC} + n_{shift}^{RA} \cdot N_{CS}; \quad (5)$$

$$n_{group}^{RA} = \left\lfloor \frac{d_u}{d_{start}} \right\rfloor; \quad (6)$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right); \quad (7)$$

$$\bar{\bar{n}}_{shift}^{RA} = \lfloor \min(d_u - n_{group}^{RA} \cdot d_{start}, 4d_u - N_{ZC} - \bar{n}_{shift}^{RA} N_{CS})/N_{CS} \rfloor; \quad (8)$$

$$\bar{d}_{start} = N_{ZC} - 3d_u + n_{group}^{RA} \cdot d_{start} + \bar{n}_{shift}^{RA} N_{CS}; \quad (9)$$

$$\bar{\bar{\bar{n}}}_{shift}^{RA} = \lfloor ((1 - \min(1, \bar{n}_{shift}^{RA}))(d_u - n_{group}^{RA} \cdot d_{start}) + \min(1, \bar{n}_{shift}^{RA})(4d_u - N_{ZC} - \bar{n}_{shift}^{RA} N_{CS}))/N_{CS} \rfloor - \bar{\bar{n}}_{shift}^{RA}; \quad (10)$$

$$\bar{\bar{d}}_{start} = N_{ZC} - 2d_u + n_{group}^{Ra} \cdot d_{start} + \bar{\bar{n}}_{shift}^{RA} N_{CS}, \quad (11)$$

where $d_u$ is a cyclic shift corresponding to the random access sequence when a Doppler frequency shift is one time a PRACH subcarrier spacing.

With reference to the first or the second possible implementation of the sixth aspect, in a fourth possible implementation of the sixth aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19), where formulas (12) to (19) are respectively:

$$n_{shift}^{RA} = \left\lfloor \frac{N_{ZC} - 3d_u}{N_{CS}} \right\rfloor; \quad (12)$$

$$d_{start} = N_{ZC} - 3d_u + n_{shift}^{RA} \cdot N_{CS}; \quad (13)$$

$$n_{group}^{RA} = \left\lfloor \frac{d_u}{d_{start}} \right\rfloor; \quad (14)$$

$$\bar{n}_{shift}^{RA} = \max\left(\left\lfloor \frac{4d_u - N_{ZC} - n_{group}^{RA} \cdot d_{start}}{N_{CS}} \right\rfloor, 0\right); \quad (15)$$

$$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS})/N_{CS} \rfloor; \quad (16)$$

$$\bar{d}_{start} = d_u + n_{group}^{RA} \cdot d_{start} + \bar{n}_{shift}^{RA} N_{CS}; \quad (17)$$

-continued $$\bar{\bar{n}}_{shift}^{RA} = 0; \quad (18)$$

$$\bar{\bar{d}}_{start} = 0, \quad (19)$$

where $d_u$ is a cyclic shift corresponding to the random access sequence when a Doppler frequency shift is one time a PRACH subcarrier spacing.

With reference to the first or the second possible implementation of the sixth aspect, in a fifth possible implementation of the sixth aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (20) to (27), where formulas (20) to (27) are respectively:

$$n_{shift}^{RA} = \left\lfloor \frac{3d_u - N_{ZC}}{N_{CS}} \right\rfloor; \quad (20)$$

$$d_{start} = 3d_u - N_{ZC} + n_{shift}^{RA} \cdot N_{CS}; \quad (21)$$

$$n_{group}^{RA} = \left\lfloor \frac{d_u}{d_{start}} \right\rfloor; \quad (22)$$

$$\bar{n}_{shift}^{RA} = \max\left(\left\lfloor \frac{N_{ZC} - 2d_u - n_{group}^{RA} \cdot d_{start}}{N_{CS}} \right\rfloor, 0\right); \quad (23)$$

$$\bar{\bar{n}}_{shift}^{RA} = 0; \quad (24)$$

$$\bar{d}_{start} = 0; \quad (25)$$

$$\bar{\bar{n}}_{shift}^{RA} = 0; \quad (26)$$

$$\bar{\bar{d}}_{start} = 0, \quad (27)$$

where $d_u$ is a cyclic shift corresponding to the random access sequence when a Doppler frequency shift is one time a PRACH subcarrier spacing.

With reference to the first or the second possible implementation of the sixth aspect, in a sixth possible implementation of the sixth aspect, $n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (28) to (35), where formulas (28) to (35) are respectively:

$$n_{shift}^{RA} = \left\lfloor \frac{N_{ZC} - 2d_u}{N_{CS}} \right\rfloor; \quad (28)$$

$$d_{start} = 2(N_{ZC} - 2d_u) + n_{shift}^{RA} \cdot N_{CS}; \quad (29)$$

$$n_{group}^{RA} = \left\lfloor \frac{N_{ZC} - d_u}{d_{start}} \right\rfloor; \quad (30)$$

$$\bar{n}_{shift}^{RA} = \max\left(\left\lfloor \frac{3d_u - N_{ZC} - n_{group}^{RA} \cdot d_{start}}{N_{CS}} \right\rfloor, 0\right); \quad (31)$$

$$\bar{\bar{n}}_{shift}^{RA} = 0; \quad (32)$$

$$\bar{d}_{start} = 0; \quad (33)$$

$$\bar{\bar{n}}_{shift}^{RA} = 0; \quad (34)$$

$$\bar{\bar{d}}_{start} = 0, \quad (35)$$

where $d_u$ is a cyclic shift corresponding to the random access sequence when a Doppler frequency shift is one time a PRACH subcarrier spacing.

With reference to any one of the third to the sixth possible implementations of the sixth aspect, in a seventh possible implementation of the sixth aspect, in the case of $$\frac{N_{ZC} + N_{CS}}{4} \le d_u < \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv_{start}$ satisfy formulas (4) to (11), in the case of $$\frac{2}{7}N_{ZC} \le d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (12) to (19); or in the case of $$\frac{N_{ZC} + N_{CS}}{4} \le d_u \le \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (4) to (11), in the case of $$\frac{2}{7}N_{ZC} < d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv_{start}$ satisfy formulas (12) to (19);

in the case of $$\frac{N_{ZC} + N_{CS}}{3} \le d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (20) to (27), in the case of $$\frac{2N_{ZC}}{5} \le d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (28) to (35); or in the case of $$\frac{N_{ZC} + N_{CS}}{3} \le d_u \le \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv_{start}$ satisfy formulas (20) to (27), in the case of $$\frac{2N_{ZC}}{5} < d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{\bar{d}}_{start}$, and $\equiv$ satisfy formulas (28) to (35).

With reference to any one of the sixth aspect, or the first to the seventh possible implementations of the sixth aspect, in an eighth possible implementation of the sixth aspect, the random access sequence generation module is specifically configured to:

generate the random access sequence $x_{u,C_v}(n)$ according to the cyclic shift value $C_v$ by using the following formula (36):

$$x_{u,C_v}(n) = x_u((n+C_v) \bmod N_{ZC}) \qquad (36),\ \text{where}$$

$N_{ZC}$ is a sequence length, and a ZC sequence whose root is u is defined as:

$$x_u(n)e^{-j\frac{\pi u n(n+1)}{N_{ZC}}},$$

$0 \le n \le N_{ZC}-1$.

According to a seventh aspect, an embodiment of the present application provides a base station, including:

a shift sequence number determining module, configured to select a shift sequence number v from a range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, where v is an integer, $n_{shift}^{RA}$ is a quantity of user equipment UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts; and a cyclic shift value determining module, configured to obtain a cyclic shift value $C_v$ according to the shift sequence number v by using the following formula (1), formula (2), or formula (3):

$$C_v = d_{offset} + d_{start} \lfloor v/n_{shift}^{RA} \rfloor + (v \bmod n_{shift}^{RA}) N_{CS} \qquad (1);$$

$$C_v = d_{offset} + \bar{d}_{start} + (v - n_{shift}^{RA} n_{group}^{RA} + \bar{n}_{shift}^{RA}) N_{CS} \qquad (2);$$

$$C_v = d_{offset} + \bar{\bar{d}}_{start} + (v - n_{shift}^{RA} n_{group}^{RA} + \bar{n}_{shift}^{RA} + \bar{\bar{n}}_{shift}^{RA}) N_{CS} \qquad (3),\ \text{where}$$

$d_{offset}$ is a shift offset, $d_{start}$ is a cyclic shift distance between neighboring groups, $n_{shift}^{RA}$ is a quantity of UE candidate sequence shifts in a group, $N_{CS}$ is a quantity of cyclic shifts that are occupied by a user, $\bar{d}_{start}$ is a cyclic shift value of a first UE candidate sequence shift in the first remaining sequence shifts, and $\bar{\bar{\equiv}}$ is a cyclic shift value of a first UE candidate sequence shift in the second remaining sequence shifts, where $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}_{start}$ satisfy formulas (4) to (11); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}$ satisfy formulas (12) to (19); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}$ satisfy formulas (20) to (27); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\bar{\bar{\equiv}}$ satisfy formulas (28) to (35), where $$n_{shift}^{RA} = \left\lfloor \frac{4d_u - N_{ZC}}{N_{CS}} \right\rfloor; \qquad (4)$$

$$d_{start} = 4d_u - N_{ZC} + n_{shift}^{RA} \cdot N_{CS}; \qquad (5)$$

$$n_{group}^{RA} = \left\lfloor \frac{d_u}{d_{start}} \right\rfloor; \qquad (6)$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right); \qquad (7)$$

$$\bar{\bar{n}}_{shift}^{RA} = \lfloor \min(d_u - n_{group}^{RA} \cdot d_{start}, 4d_u - N_{ZC} - \bar{n}_{shift}^{RA} N_{CS})/N_{CS} \rfloor; \qquad (8)$$

$$\bar{d}_{start} = N_{ZC} - 3d_u + n_{group}^{RA} \cdot d_{start} + \bar{n}_{shift}^{RA} N_{CS}; \qquad (9)$$

$$\bar{\bar{\bar{n}}}_{shift}^{RA} = \lfloor ((1 - \min(1, \bar{n}_{shift}^{RA}))(d_u - n_{group}^{RA} \cdot d_{start}) + \min(1, \bar{n}_{shift}^{RA})(4d_u - N_{ZC} - \bar{n}_{shift}^{RA} N_{CS}))/N_{CS} \rfloor - \bar{\bar{n}}_{shift}^{RA}; \qquad (10)$$

$$\bar{\bar{d}}_{start} = N_{ZC} - 2d_u + n_{group}^{Ra} \cdot d_{start} + \bar{\bar{n}}_{shift}^{RA} N_{CS}; \qquad (11)$$

$$n_{shift}^{RA} = \left\lfloor \frac{N_{ZC} - 3d_u}{N_{CS}} \right\rfloor; \qquad (12)$$

$$d_{start} = N_{ZC} - 3d_u + n_{shift}^{RA} \cdot N_{CS}; \qquad (13)$$

$$n_{group}^{RA} = \left\lfloor \frac{d_u}{d_{start}} \right\rfloor; \qquad (14)$$

$$\bar{n}_{shift}^{RA} = \max\left(\left\lfloor \frac{4d_u - N_{ZC} - n_{group}^{RA} \cdot d_{start}}{N_{CS}} \right\rfloor, 0\right); \qquad (15)$$

$$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS})/N_{CS} \rfloor; \qquad (16)$$

$$\bar{d}_{start} = d_u + n_{group}^{RA} \cdot d_{start} + \bar{n}_{shift}^{RA} N_{CS}; \qquad (17)$$

$$\bar{\bar{\bar{n}}}_{shift}^{RA} = 0; \qquad (18)$$

$$\bar{\bar{d}}_{start} = 0; \qquad (19)$$

$$n_{shift}^{RA} = \left\lfloor \frac{3d_u - N_{ZC}}{N_{CS}} \right\rfloor; \qquad (20)$$

$$d_{start} = 3d_u - N_{ZC} + n_{shift}^{RA} \cdot N_{CS}; \qquad (21)$$

$$n_{group}^{RA} = \left\lfloor \frac{d_u}{d_{start}} \right\rfloor; \qquad (22)$$

$$\bar{n}_{shift}^{RA} = \max\left(\left\lfloor \frac{N_{ZC} - 2d_u - n_{group}^{RA} \cdot d_{start}}{N_{CS}} \right\rfloor, 0\right); \qquad (23)$$

$$\bar{\bar{n}}_{shift}^{RA} = 0; \qquad (24)$$

$$\bar{d}_{start} = 0; \qquad (25)$$

$$\bar{\bar{\bar{n}}}_{shift}^{RA} = 0; \qquad (26)$$

$$\bar{\bar{d}}_{start} = 0; \qquad (27)$$

$$n_{shift}^{RA} = \left\lfloor \frac{N_{ZC} - 2d_u}{N_{CS}} \right\rfloor; \qquad (28)$$

$$d_{start} = 2(N_{ZC} - 2d_u) + n_{shift}^{RA} \cdot N_{CS}; \qquad (29)$$

$$n_{group}^{RA} = \left\lfloor \frac{N_{ZC} - d_u}{d_{start}} \right\rfloor; \qquad (30)$$

$$\bar{n}_{shift}^{RA} = \max\left(\left\lfloor \frac{3d_u - N_{ZC} - n_{group}^{RA} \cdot d_{start}}{N_{CS}} \right\rfloor, 0\right); \qquad (31)$$

$$\bar{\bar{n}}_{shift}^{RA} = 0; \qquad (32)$$

$$\bar{d}_{start} = 0; \qquad (33)$$

$$\bar{\bar{\bar{n}}}_{shift}^{RA} = 0; \qquad (34)$$

$$\bar{\bar{d}}_{start} = 0, \qquad (35)$$

$N_{ZC}$ is a sequence length, and $d_u$ is a cyclic shift corresponding to the random access sequence when a Doppler frequency shift is one time a PRACH subcarrier spacing.

With reference to the seventh aspect, in a first possible implementation of the seventh aspect, in the case of $v \leq (n_{shift}^{RA} n_{group}^{RA} + \bar{n}_{shift}^{RA} - 1)$, the cyclic shift value determining module obtains the cyclic shift value $C_v$ by using formula (1);

in the case of $(n_{shift}^{RA} n_{group}^{RA} + \bar{n}_{shift}^{RA} - 1) < v \leq (n_{shift}^{RA} n_{group}^{RA} + \bar{n}_{shift}^{RA} + \bar{\bar{n}}_{shift}^{RA} - 1)$, the cyclic shift value determining module obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \leq (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the cyclic shift value determining module obtains the cyclic shift value $C_v$ by using formula (3).

With reference to the seventh aspect or the first possible implementation of the seventh aspect, in a second possible implementation of the seventh aspect, in the case of $$\frac{N_{ZC} + N_C}{4} \leq d_u < \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11), in the case of $$\frac{2}{7} N_{ZC} \leq d_u \leq \frac{N_{ZC} - N_C}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (12) to (19); or in the case of $$\frac{N_{ZC} + N_{CS}}{4} \leq d_u \leq \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11), in the case of $$\frac{2}{7} N_{ZC} < d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (12) to (19);

in the case of $$\frac{N_{ZC} + N_{CS}}{3} \leq d_u < \frac{2 N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (20) to (27), in the case of $$\frac{2 N_{ZC}}{5} \leq d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (28) to (35); or in the case of $$\frac{N_{ZC} + N_{CS}}{3} \leq d_u \leq \frac{2 N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (20) to (27), in the case of $$\frac{2 N_{ZC}}{5} < d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (28) to (35).

According to an eighth aspect, an embodiment of the present application provides user equipment UE, including:

a shift sequence number determining module, configured to select a shift sequence number $v$ from a range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, where $v$ is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts;

a cyclic shift value determining module, configured to obtain a cyclic shift value $C_v$ according to the shift sequence number $v$ by using the following formula (1), formula (2), or formula (3):

$$C_v = d_{offset} + d_{start} \lfloor v / n_{shift}^{RA} \rfloor + (v \bmod n_{shift}^{RA}) N_{CS} \quad (1);$$

$$C_v = d_{offset} + \bar{d}_{start} + (v - n_{shift}^{RA} n_{group}^{RA} + \bar{n}_{shift}^{RA}) N_{CS} \quad (2);$$

$$C_v = d_{offset} + \equiv_{start} + (v - n_{shift}^{RA} n_{group}^{RA} + \bar{n}_{shift}^{RA} + \bar{\bar{n}}_{shift}^{RA}) N_{CS} \quad (3), \text{ where}$$

$d_{offset}$ is a shift offset, $d_{start}$ is a cyclic shift distance between neighboring groups, $n_{shift}^{RA}$ is a quantity of UE candidate sequence shifts in a group, $N_{CS}$ is a quantity of cyclic shifts that are occupied by a user, $\bar{d}_{start}$ is a cyclic shift value of a first UE candidate sequence shift in the first remaining sequence shifts, and $\equiv$ is a cyclic shift value of a first UE candidate sequence shift in the second remaining sequence shifts; and a random access sequence generation module, configured to generate a random access sequence $x_{u,C_v}(n)$ according to the cyclic shift value $C_v$ by using the following formula (36):

$$x_{u,C_v}(n) = x_u((n + C_v) \bmod N_{ZC}) \quad (36), \text{ where}$$

$N_{ZC}$ is a sequence length, and a ZC sequence whose root is u is defined as:

$$x_u(n) = e^{-j \frac{\pi u n (n+1)}{N_{ZC}}},$$

$0 \leq n \leq N_{ZC} - 1$, where
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35), where $$n_{shift}^{RA} = \left\lfloor \frac{4d_u - N_{ZC}}{N_{CS}} \right\rfloor; \tag{4}$$

$$d_{start} = 4d_u - N_{ZC} + n_{shift}^{RA} \cdot N_{CS}; \tag{5}$$

$$n_{group}^{RA} = \left\lfloor \frac{d_u}{d_{start}} \right\rfloor; \tag{6}$$

$$\overline{n}_{shift}^{RA} = \max\left( \left\lfloor \frac{N_{ZC} - 3d_u - n_{group}^{RA} \cdot d_{start}}{N_{CS}} \right\rfloor, 0 \right); \tag{7}$$

$$\overline{n}_{shift}^{RA} = \lfloor \min(d_u - n_{group}^{RA} \cdot d_{start}, 4d_u - N_{ZC} - \overline{n}_{shift}^{RA} N_{CS})/N_{CS} \rfloor; \tag{8}$$

$$\overline{d}_{start} = N_{ZC} - 3d_u + n_{group}^{RA} \cdot d_{start} + \overline{n}_{shift}^{RA} N_{CS}; \tag{9}$$

$$\overline{\overline{n}}_{shift}^{RA} = \lfloor ((1 - \min(1, \overline{n}_{shift}^{RA}))(d_u - n_{group}^{RA} \cdot d_{start}) + \min(1, \overline{n}_{shift}^{RA}(4d_u - N_{ZC} - \overline{n}_{shift}^{RA} N_{CS}))/N_{CS} \rfloor - \overline{n}_{shift}^{RA}; \tag{10}$$

$$\overline{\overline{d}}_{start} = N_{ZC} - 2d_u + n_{group}^{RA} \cdot d_{start} + \overline{n}_{shift}^{RA} N_{CS}; \tag{11}$$

$$n_{shift}^{RA} = \left\lfloor \frac{N_{ZC} - 3d_u}{N_{CS}} \right\rfloor; \tag{12}$$

$$d_{start} = N_{ZC} - 3d_u + n_{shift}^{RA} \cdot N_{CS}; \tag{13}$$

$$n_{group}^{RA} = \left\lfloor \frac{d_u}{d_{start}} \right\rfloor; \tag{14}$$

$$\overline{n}_{shift}^{RA} = \max\left( \left\lfloor \frac{4d_u - N_{ZC} - n_{group}^{RA} \cdot d_{start}}{N_{CS}} \right\rfloor, 0 \right); \tag{15}$$

$$\overline{n}_{shift}^{RA} = \lfloor \min(d_u - n_{group}^{RA} \cdot d_{start}, N_{ZC} - 3d_u - \overline{n}_{shift}^{RA} N_{CS})/N_{CS} \rfloor; \tag{16}$$

$$\overline{d}_{start} = d_u + n_{group}^{RA} \cdot d_{start} + \overline{n}_{shift}^{RA} N_{CS}; \tag{17}$$

$$\overline{\overline{n}}_{shift}^{RA} = 0; \tag{18}$$

$$\overline{\overline{d}}_{start} = 0; \tag{19}$$

$$n_{shift}^{RA} = \left\lfloor \frac{3d_u - N_{ZC}}{N_{CS}} \right\rfloor; \tag{20}$$

$$d_{start} = 3d_u - N_{ZC} + n_{shift}^{RA} \cdot N_{CS}; \tag{21}$$

$$n_{group}^{RA} = \left\lfloor \frac{d_u}{d_{start}} \right\rfloor; \tag{22}$$

$$\overline{n}_{shift}^{RA} = \max\left( \left\lfloor \frac{N_{ZC} - 2d_u - n_{group}^{RA} \cdot d_{start}}{N_{CS}} \right\rfloor, 0 \right); \tag{23}$$

$$\overline{n}_{shift}^{RA} = 0; \tag{24}$$

$$\overline{d}_{start} = 0; \tag{25}$$

$$\overline{\overline{n}}_{shift}^{RA} = 0; \tag{26}$$

$$\overline{\overline{d}}_{start} = 0; \tag{27}$$

$$n_{shift}^{RA} = \left\lfloor \frac{N_{ZC} - 2d_u}{N_{CS}} \right\rfloor; \tag{28}$$

$$d_{start} = 2(N_{ZC} - 2d_u) + n_{shift}^{RA} \cdot N_{CS}; \tag{29}$$

$$n_{group}^{RA} = \left\lfloor \frac{N_{ZC} - d_u}{d_{start}} \right\rfloor; \tag{30}$$

$$\overline{n}_{shift}^{RA} = \max\left( \left\lfloor \frac{3d_u - N_{ZC} - n_{group}^{RA} \cdot d_{start}}{N_{CS}} \right\rfloor, 0 \right); \tag{31}$$

-continued $$\overline{n}_{shift}^{RA} = 0; \tag{32}$$

$$\overline{d}_{start} = 0; \tag{33}$$

$$\overline{\overline{n}}_{shift}^{RA} = 0; \tag{34}$$

$$\overline{\overline{d}}_{start} = 0, \tag{35}$$

where $d_u$ is a cyclic shift corresponding to the random access sequence when a Doppler frequency shift is one time a PRACH subcarrier spacing.

With reference to the eighth aspect, in a first possible implementation of the eighth aspect, in the case of $v \leq (n_{shift}^{RA} n_{group}^{RA} + \overline{n}_{shift}^{RA} - 1)$, the cyclic shift value determining module obtains the cyclic shift value $C_v$ by using formula (1); in the case of $(n_{shift}^{RA} n_{group}^{RA} + \overline{n}_{shift}^{RA} - 1) < v \leq (n_{shift}^{RA} n_{group}^{RA} + \overline{n}_{shift}^{RA} + \overline{n}_{shift}^{RA} - 1)$, the cyclic shift value determining module obtains the cyclic shift value $C_v$ by using formula (2); in the case of $(n_{shift}^{RA} n_{group}^{RA} + \overline{n}_{shift}^{RA} + \overline{n}_{shift}^{RA} - 1) < v \leq (n_{shift}^{RA} n_{group}^{RA} + \overline{n}_{shift}^{RA} + \overline{n}_{shift}^{RA} + \overline{\overline{n}}_{shift}^{RA} - 1)$, the cyclic shift value determining module obtains the cyclic shift value $C_v$ by using formula (3).

With reference to the eighth aspect or the first possible implementation of the eighth aspect, in a second possible implementation of the eighth aspect, in the case of $$\frac{N_{ZC} + N_{CS}}{4} \leq d_u < \frac{2}{7} N_{ZC},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{n}}$, $\overline{d}_{start}$, and $\overline{\overline{d}}_{start}$ satisfy formulas (4) to (11), in the case of $$\frac{2}{7} N_{ZC} \leq d_u \leq \frac{N_{ZC} - N_{CS}}{3},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{n}}$, $\overline{d}_{start}$, and $\overline{\overline{d}}_{start}$ satisfy formulas (12) to (19); or in the case of $$\frac{N_{ZC} + N_{CS}}{4} \leq d_u \leq \frac{2}{7} N_{ZC},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{n}}$, $\overline{d}_{start}$, and $\overline{\overline{d}}_{start}$ satisfy formulas (4) to (11), in the case of $$\frac{2}{7} N_{ZC} < d_u \leq \frac{N_{ZC} - N_{CS}}{3},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{n}}$, $\overline{d}_{start}$, and $\overline{\overline{d}}_{start}$ satisfy formulas (12) to (19);

in the case of $$\frac{N_{ZC} + N_{CS}}{3} \leq d_u < \frac{2 N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} \le d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35); or in the case of $$\frac{N_{ZC} + N_{CS}}{3} \le d_u \le \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (20) to (27), in the case of $$\frac{2N_{ZC}}{5} < d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (28) to (35).

According to a ninth aspect, an embodiment of the present application provides a random access sequence generation system, including: the base station described in any one of the fifth aspect, or the first to the eighth possible implementations of the fifth aspect, and the user equipment UE described in any one of the sixth aspect, or the first to the eighth possible implementations of the sixth aspect.

According to a tenth aspect, an embodiment of the present application provides a random access sequence generation system, including: the base station described in any one of the seventh aspect, or the first to the second possible implementations of the seventh aspect, and the user equipment UE described in any one of the eighth aspect, or the first to the second possible implementations of the eighth aspect.

According to the random access sequence generation method, the device, and the system in the embodiments of the present application, the random access sequence generation method includes: generating, by the base station, the notification signaling, where the notification signaling includes the indication information, the indication information is used to instruct the user equipment UE to select the shift sequence number from the range of 0 to ($n_{shift}^{RA}$ $n_{group}^{RA} + \bar{n}_{shift}^{RA} + \bar{\bar{n}}_{shift}^{RA} + \bar{\bar{\bar{n}}}_{shift}^{RA} - 1$), the shift sequence number is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is the quantity of UE candidate sequence shifts in the second remaining sequence shifts; and sending, by the base station, the notification signaling to the UE, so that the UE generates the random access sequence according to the indication information.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

Figure 1:
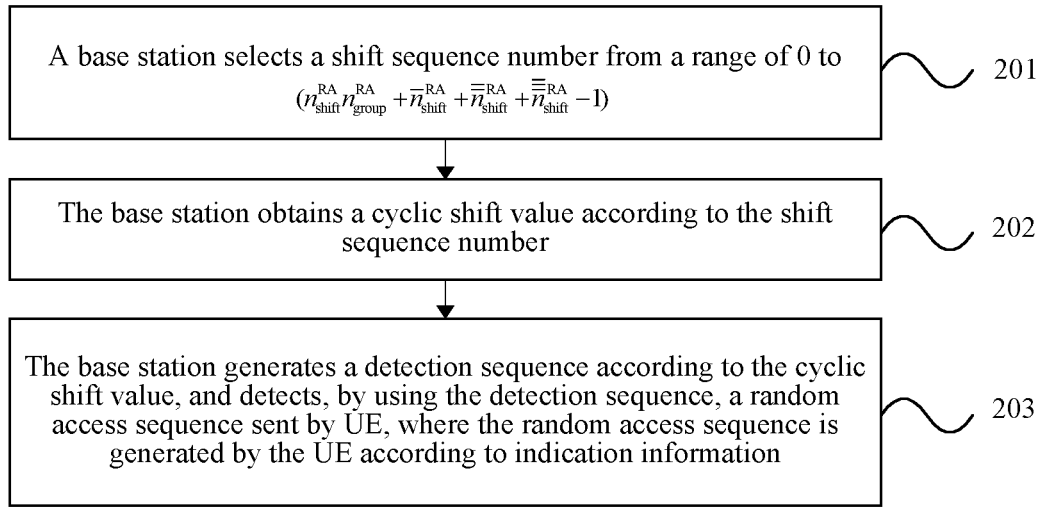
FIG. 1 is a flowchart of Embodiment 1 of a random access sequence generation method according to the present application.

FIG. 1 is a flowchart of Embodiment 1 of a random access sequence generation method according to the present application. As shown in FIG. 1, the method in this embodiment may include:

Step 101: A base station generates notification signaling, where the notification signaling includes indication information, the indication information is used to instruct user equipment UE to select a shift sequence number from a range of 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$, the shift sequence number is an integer, $n_{shift}^{RA}$ is a quantity of UE candidate sequence shifts in a group, $n_{group}^{RA}$ is a quantity of groups, $\overline{n}_{shift}^{RA}$ is a quantity of UE candidate sequence shifts in the last length that is insufficient for a group, $\overline{\overline{n}}_{shift}^{RA}$ is a quantity of UE candidate sequence shifts in first remaining sequence shifts, and $\overline{\overline{\overline{n}}}_{shift}^{RA}$ is a quantity of UE candidate sequence shifts in second remaining sequence shifts.

It should be noted that, a "group" in the present application is a sequence shift group; $n_{group}^{RA}$ indicates a quantity of groups obtained after sequence shifts are grouped; $n_{shift}^{RA}$ indicates a quantity of UEs that can be distinguished in a sequence shift group after sequence shifts are grouped; $\overline{n}_{shift}^{RA}$ indicates a quantity of UEs that are further distinguished in a sequence shift in a remaining length that is insufficient for a group after sequence shifts are grouped; $\overline{\overline{n}}_{shift}^{RA}$ and $\overline{\overline{\overline{n}}}_{shift}^{RA}$ indicate quantities of UEs that can be distinguished in remaining discrete sequence shifts of all sequence shifts other than sequence shifts that are definitely occupied by $n_{shift}^{RA}$, $n_{group}^{RA}$, and $\overline{n}_{shift}^{RA}$.

Step 102: The base station sends the notification signaling to the UE, so that the UE generates a random access sequence according to the indication information.

In the conventional art, the UE selects a shift sequence number from the range of 0 to $(n_{shift}^{RA} n_{group}^{RA} + \overline{n}_{shift}^{RA} - 1)$. In the present application, the base station instructs, by using the notification signaling, the UE to select a shift sequence number from the range of 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$.

In the conventional art, shift sequences are grouped to determine three parameters: a quantity ($n_{group}^{RA}$) of groups, a quantity ($n_{shift}^{RA}$) of UE candidate sequence shifts in a group, and a quantity ($\overline{n}_{shift}^{RA}$) of UE candidate sequence shifts in the last length that is insufficient for a group; and a shift sequence number is selected from an interval that is determined according to the three parameters. As can be learned, in the conventional art, during determining of a range from which a shift sequence number is selected, a quantity of UEs that can be distinguished is considered from only a perspective of a group, and other remaining discrete shift sequences obtained after grouping are not considered. In the present application, after a quantity of UEs that can be distinguished is considered from a perspective of a group, quantities of UEs that can be further distinguished in other remaining discrete shift sequences obtained after grouping, that is, a quantity ($\overline{\overline{n}}_{shift}^{RA}$) of UE candidate sequence shifts in first remaining sequence shifts and a quantity ($\overline{\overline{\overline{n}}}$) of UE candidate sequence shifts in second remaining sequence shifts, are further considered; and the UE is instructed, by using the notification signaling, to select a shift sequence number from the range of 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$, thereby expanding a range from which a shift sequence number is selected.

Figure 2:
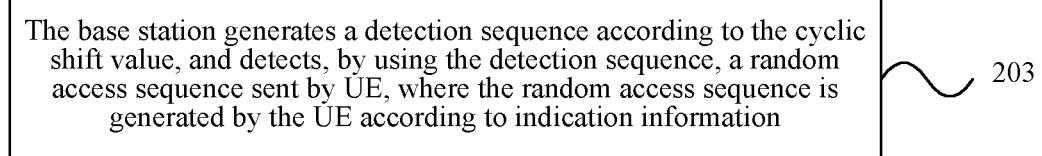
FIG. 2 is a flowchart of Embodiment 2 of a random access sequence generation method according to the present application.

FIG. 2 is a flowchart of Embodiment 2 of a random access sequence generation method according to the present application. As shown in FIG. 2, optionally, after step 102, the method may further include:

Step 201: The base station selects a shift sequence number from the range of 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$.

Optionally, because the base station cannot learn a shift sequence number that is used by the UE when the UE sends the random access sequence, when the base station detects the random access sequence sent by the UE, the base station sequentially chooses to traverse each shift sequence number in the range of 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$. Alternatively, the base station sequentially chooses to traverse each shift sequence number in a range of 0 to X. X is an integer less than $(n_{shift}^{RA} n_{group}^{RA} + \overline{n}_{shift}^{RA} + \overline{\overline{\overline{n}}}_{shift}^{RA} - 1)$.

Step 202: The base station obtains a cyclic shift value according to the shift sequence number.

Optionally, the base station obtains the cyclic shift value $C_v$ of the UE according to the shift sequence number v by using the following formula (1), formula (2), or formula (3):

$$C_v = d_{offset} + d_{start} \lfloor v/n_{shift}^{RA} \rfloor + (v \bmod n_{shift}^{RA}) N_{CS} \quad (1);$$

$$C_v = d_{offset} + \overline{d}_{start} + (v - n_{shift}^{RA} n_{group}^{RA} + \overline{n}_{shift}^{RA}) N_{CS} \quad (2);$$

$$C_v = d_{offset} + \overline{\overline{d}}_{start} + (v - n_{shift}^{RA} n_{group}^{RA} + \overline{n}_{shift}^{RA} + \overline{\overline{n}}_{shift}^{RA}) N_{CS} \quad (3), \text{ where}$$

$d_{offset}$ is a shift offset, $d_{start}$ is a cyclic shift distance between neighboring groups, $n_{shift}^{RA}$ is a quantity of UE candidate sequence shifts in a group, $N_{CS}$ is a quantity of cyclic shifts that are occupied by a user, $\overline{d}_{start}$ is a cyclic shift value of a first UE candidate sequence shift in the first remaining sequence shifts, and $\overline{\overline{\equiv}}$ is a cyclic shift value of a first UE candidate sequence shift in the second remaining sequence shifts.

It should be noted that, $d_{offset}$ is an integer (which is usually a constant integer), and $d_{offset}$ used on a base station side and $d_{offset}$ used on a UE side need to be the same. Optionally, that $d_{offset}$ used on the base station side and $d_{offset}$ used on the UE side have a same value may be implemented by means of agreement in advance. For example, $d_{offset} = 0$.

It should be noted that, in the present application, $\lfloor Y \rfloor$ indicates rounded-down of Y. That is, if Y is equal to 2.5, $\lfloor Y \rfloor$ is equal to 2. For example, $\lfloor v/n_{shift}^{RA} \rfloor$ indicates rounded-down of $v/n_{shift}^{RA}$.

It should be noted that, in the present application, mod indicates a modulo operation. For example, 4 mod 2=0, and 5 mod 2=1.

Optionally, in the case of $v \leq (n_{shift}^{RA} n_{group}^{RA} + \overline{n}_{shift}^{RA} - 1)$, the base station obtains the cyclic shift value $C_v$ by using formula (1);

in the case of $(n_{shift}^{RA} n_{group}^{RA} + \overline{n}_{shift}^{RA} - 1) < v \leq (n_{shift}^{RA} n_{group}^{RA} + \overline{n}_{shift}^{RA} + \overline{\overline{n}}_{shift}^{RA} - 1)$, the base station obtains the cyclic shift value $C_v$ by using formula (2); or in the case of $(n_{shift}^{RA} n_{group}^{RA} + \overline{n}_{shift}^{RA} + \overline{\overline{n}}_{shift}^{RA} - 1) < v \leq (n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$, the base station obtains the cyclic shift value $C_v$ by using formula (3).

Step 203: The base station generates a detection sequence according to the cyclic shift value, and detects, by using the detection sequence, the random access sequence sent by the UE, where the random access sequence is generated by the UE according to the indication information.

A ZC sequence $x_u(n)$ whose root is u may be defined as:

$$x_u(n) = e^{-j\frac{\pi u n(n+1)}{N_{ZC}}},$$

$0 \leq n \leq N_{ZC} - 1$, where $N_{ZC}$ is a length of the ZC sequence, and u is the root of the ZC sequence.

Specifically, the base station performs cyclic shift on the ZC sequence $x_u(n)$ whose root is u. If the cyclic shift value is K, a ZC sequence generated according to the cyclic shift value is $x_u((n+K) \bmod N_{ZC})$, where $N_{ZC}$ is a length of the ZC sequence.

Optionally, the base station performs, by using the detection sequence generated according to the cyclic shift value, related detection on the random access sequence sent by the UE. The base station may perform related detection in a time domain, or may perform detection in a frequency domain according to a frequency domain detection manner corresponding to a time domain—related detection manner.

Optionally, in step 202, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv_{start}$ satisfy formulas (4) to (11):

$$n_{shift}^{RA} = \left\lfloor \frac{4d_u - N_{ZC}}{N_{CS}} \right\rfloor; \tag{4}$$

$$d_{start} = 4d_u - N_{ZC} + n_{shift}^{RA} \cdot N_{CS}; \tag{5}$$

$$n_{group}^{RA} = \left\lfloor \frac{d_u}{d_{start}} \right\rfloor; \tag{6}$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right); \tag{7}$$

$$\bar{\bar{n}}_{shift}^{RA} = \lfloor \min(d_u - n_{group}^{RA} \cdot d_{start}, 4d_u - N_{ZC} - \bar{n}_{shift}^{RA} N_{CS})/N_{CS} \rfloor; \tag{8}$$

$$\bar{\bar{d}}_{start} = N_{ZC} - 3d_u + n_{group}^{RA} \cdot d_{start} + \bar{n}_{shift}^{RA} \bar{N}_{CS}; \tag{9}$$

$$\bar{\bar{\bar{n}}}_{shift}^{RA} = \lfloor((1 - \min(1, \bar{n}_{shift}^{RA}))(d_u - n_{group}^{RA} \cdot d_{start}) + \min(1, \bar{n}_{shift}^{RA})(4d_u - N_{ZC} - \bar{n}_{shift}^{RA} N_{CS}))/N_{CS}\rfloor - \bar{\bar{n}}_{shift}^{RA}; \tag{10}$$

$$\bar{\bar{\bar{d}}}_{start} = N_{ZC} - 2d_u + n_{group}^{RA} \cdot d_{start} + \bar{\bar{n}}_{shift}^{RA} N_{CS}. \tag{11}$$

Alternatively, in step 202, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv_{start}$ satisfy formulas (12) to (19):

$$n_{shift}^{RA} = \left\lfloor \frac{N_{ZC} - 3d_u}{N_{CS}} \right\rfloor; \tag{12}$$

$$d_{start} = N_{ZC} - 3d_u + n_{shift}^{RA} \cdot N_{CS}; \tag{13}$$

$$n_{group}^{RA} = \left\lfloor \frac{d_u}{d_{start}} \right\rfloor; \tag{14}$$

$$\bar{n}_{shift}^{RA} = \max\left(\left\lfloor \frac{4d_u - N_{ZC} - n_{group}^{RA} \cdot d_{start}}{N_{CS}} \right\rfloor, 0\right); \tag{15}$$

$$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS})/N_{CS} \rfloor; \tag{16}$$

$$\bar{\bar{d}}_{start} = d_u + n_{group}^{RA} \cdot d_{start} + \bar{n}_{shift}^{RA} N_{CS}; \tag{17}$$

$$\bar{\bar{\bar{n}}}_{shift}^{RA} = 0; \tag{18}$$

$$\bar{\bar{\bar{d}}}_{start} = 0. \tag{19}$$

Alternatively, in step 202, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv_{start}$ satisfy formulas (20) to (27):

$$n_{shift}^{RA} = \left\lfloor \frac{3d_u - N_{ZC}}{N_{CS}} \right\rfloor; \tag{20}$$

$$d_{start} = 3d_u - N_{ZC} + n_{shift}^{RA} \cdot N_{CS}; \tag{21}$$

$$n_{group}^{RA} = \left\lfloor \frac{d_u}{d_{start}} \right\rfloor; \tag{22}$$

$$\bar{n}_{shift}^{RA} = \max\left(\left\lfloor \frac{N_{ZC} - 2d_u - n_{group}^{RA} \cdot d_{start}}{N_{CS}} \right\rfloor, 0\right); \tag{23}$$

$$\bar{\bar{n}}_{shift}^{RA} = 0; \tag{24}$$

$$\bar{\bar{d}}_{start} = 0; \tag{25}$$

$$\bar{\bar{\bar{n}}}_{shift}^{RA} = 0; \tag{26}$$

$$\bar{\bar{\bar{d}}}_{start} = 0. \tag{27}$$

Alternatively, in step 202, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv_{start}$ satisfy formulas (28) to (35):

$$n_{shift}^{RA} = \left\lfloor \frac{NC - 2d_u}{N_{CS}} \right\rfloor; \tag{28}$$

$$d_{start} = 2(N_{ZC} - 2d_u) + n_{shift}^{RA} \cdot N_{CS}; \tag{29}$$

$$n_{group}^{RA} = \left\lfloor \frac{N_{ZC} - d_u}{d_{start}} \right\rfloor; \tag{30}$$

$$\bar{n}_{shift}^{RA} = \max\left(\left\lfloor \frac{3d_u - N_{ZC} - n_{group}^{RA} \cdot d_{start}}{N_{CS}} \right\rfloor, 0\right); \tag{31}$$

$$\bar{\bar{n}}_{shift}^{RA} = 0; \tag{32}$$

$$\bar{\bar{d}}_{start} = 0; \tag{33}$$

$$\bar{\bar{\bar{n}}}_{shift}^{RA} = 0; \tag{34}$$

$$\bar{\bar{\bar{d}}}_{start} = 0, \tag{35}$$

where $d_u$ is a cyclic shift corresponding to the random access sequence when a Doppler frequency shift is one time a PRACH subcarrier spacing.

Optionally, in the case of $$\frac{N_{ZC} + N_{CS}}{4} \le d_u < \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (4) to (11), in the case of $$\frac{2}{7}N_{ZC} \le d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (12) to (19).

Alternatively, in the case of $$\frac{N_{ZC} + N_{CS}}{4} \le d_u \le \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (4) to (11), in the case of $$\frac{2}{7}N_{ZC} < d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (12) to (19).

Optionally, in the case of $$\frac{N_{ZC} + N_{CS}}{3} \le d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (20) to (27), in the case of $$\frac{2N_{ZC}}{5} \le d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (28) to (35).

Alternatively, in the case of $$\frac{N_{ZC} + N_{CS}}{3} \le d_u \le \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (20) to (27), in the case of $$\frac{2N_{ZC}}{5} < d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ satisfy formulas (28) to (35).

It should be noted that, in the present application, max indicates obtaining a maximum value. For example, max (0,1)=1, and max (4,5)=5. min indicates obtaining a minimum value. For example, min (0,1)=0, and min (4,5)=4.

It should be noted that, any $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv$ that satisfy formulas (4) to (11), formulas (12) to (19), formulas (20) to (27), or formulas (28) to (35) fall within the protection scope of the present application.

In this embodiment, the base station selects the shift sequence number from the range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$; the base station obtains the cyclic shift value according to the shift sequence number; and the base station generates the detection sequence according to the cyclic shift value, and detects, by using the detection sequence, the random access sequence sent by the UE, where the random access sequence is generated by the UE according to the indication information. This resolves a problem that random access sequences of multiple UEs interfere with each other when a Doppler frequency shift is greater than one time a PRACH subcarrier spacing and is less than two times the PRACH subcarrier spacing, avoids interference between random access sequences of multiple UEs, and enables the base station to decode the random access sequence more accurately.

The following describes a reason why the problem that random access sequences of multiple UEs interfere with each other when a Doppler frequency shift is greater than one time a PRACH subcarrier spacing and is less than two times the PRACH subcarrier spacing in this embodiment can be avoided in the case of $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{\bar{d}}_{start}$, and $\equiv_{start}$ satisfy formulas (4) to (11), formulas (12) to (19), formulas (20) to (27), or formulas (28) to (35).

Assuming that a signal sent by the UE is $r(t)e^{j2\pi ft}$, $r(t)$ is a baseband signal, and $e^{j2\pi ft}$ is a carrier, a signal obtained after a Doppler frequency shift $m\Delta f$ is $r(t)e^{j2\pi(f+m\Delta f)t}$, where m is a positive integer, and $\Delta f$ is one time a PRACH subcarrier spacing.

According to a property of inverse fast Fourier transform (IFFT), a reciprocal of a frequency domain spacing is equal to a time domain period, and this is equivalent to $$\Delta f = \frac{1}{N\Delta t},$$

where $\Delta f$ is a subcarrier spacing, $\Delta t$ is a time domain sampling interval, and N is a value of discrete Fourier transform (DFT) or inverse discrete Fourier transform (IDFT).

$t=n\Delta t$ is set, and in this case, $r(t)e^{j2\pi(f+m\Delta f)t} = (r(t)e^{j2\pi(mn)/N})e^{j2\pi ft}$. $(r(t)e^{j2\pi(mn)/N})$ is an equivalent baseband signal.

Property 1:

The UE sends the random access sequence to the base station. If there is a Doppler frequency shift $\pm m\Delta f$ between receive ends of the UE and the base station, a random access sequence received on the receive end of the base station is a shift sequence of the random access sequence sent by the UE, and there is a fixed phase shift between the two sequences.

Proof: For example, the Doppler frequency shift is $-m\Delta f$. A baseband sampling signal of a time domain $t=n\Delta t$ is marked as $r(n)$. For the equivalent baseband signal $(r(t)e^{-j2\pi(mn)/N})$, $N=N_{ZC}$ is set. In this case, a baseband sampling signal of the equivalent baseband signal of a ZC sequence is $$r(n) = W^{\frac{un(n+1)}{2}} W^{mn},$$

where $$r(n) = W^{\frac{un(n+1)}{2}} W^{mn};$$

and $$r(n) = W^{\frac{un(n+1)}{2}} W^{mn} \qquad (37)$$
$$= W^{\frac{u[n(n+1)+2m(1/u)n]}{2}}$$
$$= W^{\frac{u[n^2+n+2m(1/u)n]}{2}}$$
$$= W^{\frac{u[n(n+m(1/u)+1)+m(1/u)(n+m(1/u)+1)-m(1/u)(m(1/u)+1)]}{2}}$$
$$= W^{\frac{u[(n+m(1/u))(n+m(1/u)+1)-m(1/u)(m(1/u)+1)]}{2}}$$
$$= W^{\frac{u(n+m(1/u))(n+m(1/u)+1)}{2}} W^{\frac{-um(1/u)(m(1/u)+1)}{2}}$$
$$= x_u(n+m(1/u))W^{\frac{-um(1/u)(m(1/u)+1)}{2}},$$

$x_u(n)$ indicates a ZC sequence whose root is u, that is, $$x_u(n) = e^{-j\frac{\pi u n(n+1)}{N_{ZC}}};$$

and $x_u(n+m(1/u))$ indicates a shift sequence of the ZC sequence whose root is u, that is, right cyclic shift is performed on the ZC sequence whose root is u by $m(1/u)$ bits.

In formula (37), $$\frac{1}{u}$$

is defined as a minimum non-negative integer that satisfies $((1/u) \times u) \bmod N_{ZC} = 1$.

As can be learned from formula (37):

$$\frac{1}{u}$$

is a cyclic shift corresponding to the random access sequence when the Doppler frequency shift is one time a PRACH subcarrier spacing, that is, a length that is of a cyclic shift between the random access sequence received by the base station and the random access sequence sent by the UE and that exists when the Doppler frequency shift is one time a PRACH subcarrier spacing.

For example, if the random access sequence sent by the UE is $x_u(n)$, when the Doppler frequency shift is one time a PRACH subcarrier spacing, the random access sequence received by the base station is $$x_u\left(\left(n+\frac{1}{u}\right) \bmod N_{ZC}\right) \text{ or } x_u\left(\left(n-\frac{1}{u}\right) \bmod N_{ZC}\right).$$

As can be learned from formula (15): if there is a Doppler frequency shift $-m\Delta f$ between receive ends of the UE and the base station, in a time domain, the random access sequence received by the base station is a shift sequence of the random access sequence sent by the UE, and there is a fixed phase offset $$W^{-\frac{um(1/u)(m(1/u)+1)}{2}}$$

(unrelated to n) between the two sequences. Similarly, for a Doppler frequency shift $+m\Delta f$, the random access sequence received by the base station in a time domain is also a shift sequence of the random access sequence sent by the UE. Details are not described herein again.

Property 2: When the Doppler frequency shift is relatively large, and the Doppler frequency shift $f_{off}$ is less than one time a PRACH subcarrier spacing $\Delta f$, related peak values may appear in three positions of sequence shifts $$\frac{1}{u}, 0, \text{ and } -\frac{1}{u}$$

when sequences are correlated.

That is, for the ZC sequence $x_u(n)$ whose root is u, when the Doppler frequency shift $f_{off}$ is less than one time a PRACH subcarrier spacing $\Delta f$, and the random access sequence sent by the UE is $x_u(n)$, there is a peak value when the receive end of the base station uses a sequence $x_u(n)$, $$x_u\left(\left(n+\frac{1}{u}\right) \bmod N_{ZC}\right), \text{ or } x_u\left(\left(n-\frac{1}{u}\right) \bmod N_{ZC}\right)$$

to correlate with the random access sequence sent by the UE.

It should be noted that, property 2 is determined through an experiment.

As can be learned from property 1 and property 2:

1) When a Doppler frequency shift is $f_{off} = \Delta f + x$, and $0 < x < \Delta f$, during receiving by the base station, peak values are generated in three positions of shifts $$-\frac{1}{u}, -2\frac{1}{u},$$

and 0.

That is, for the ZC sequence $x_u(n)$ whose root is u, when a Doppler frequency shift is $f_{off} = \Delta f + x$ ($0 < x < \Delta f$), and the random access sequence sent by the UE is $x_u(n)$, there is a peak value when the receive end of the base station uses a sequence $x_u(n)$, $$x_u\left(\left(n+\frac{1}{u}\right) \bmod N_{ZC}\right), \text{ or } x_u\left(\left(n-\frac{1}{u}\right) \bmod N_{ZC}\right)$$

to correlate with the random access sequence sent by the UE.

2) When the Doppler frequency shift is $f_{off} = \Delta f + x$, and $0 < x < \Delta f$, during receiving by the base station, peak values are generated in three positions of shifts $$-\frac{1}{u}, -2\frac{1}{u},$$

and 0.

That is, for the ZC sequence $x_u(n)$ whose root is u, when the Doppler frequency shift is $f_{off} = \Delta f + x$ ($0 < x < \Delta f$), and the random access sequence sent by the UE is $x_u(n)$, there is a peak value when the receive end of the base station uses a sequence $x_u(n)$, $$x_u\left(\left(n-\frac{1}{u}\right) \bmod N_{ZC}\right), \text{ or } x_u\left(\left(n-2\frac{1}{u}\right) \bmod N_{ZC}\right)$$

to correlate with the random access sequence sent by the UE.

Therefore, when the Doppler frequency shift is greater than one time a PRACH subcarrier spacing $\Delta f$ and is less than two times the PRACH subcarrier spacing, during receiving by the base station, peak values may be generated in five positions of shifts $$-\frac{1}{u}, -2\frac{1}{u}, 0, \frac{1}{u}, \text{ and } 2\frac{1}{u}.$$

That is, for the ZC sequence $x_u(n)$ whose root is u, when the Doppler frequency shift is greater than one time a PRACH subcarrier spacing $\Delta f$ and is less than two times the PRACH subcarrier spacing, and the random access sequence sent by the UE is $x_u(n)$, there may be a peak value when the receive end of the base station uses a sequence $$x_u\left(\left(n-2\frac{1}{u}\right) \mod N_{ZC}\right), x_u\left(\left(n-\frac{1}{u}\right) \mod N_{ZC}\right),$$

$$x_u(n), x_u\left(\left(n+\frac{1}{u}\right) \mod N_{ZC}\right), \text{ or } x_u\left(\left(n+2\frac{1}{u}\right) \mod N_{ZC}\right)$$

to correlate with the random access sequence sent by the UE.

In this embodiment, $n_{shift}^{RA}$, $d_{start}$, $n_{group}^{RA}$, $\bar{n}_{shift}^{RA}$, $\bar{n}_{shift}^{RA}$, $\bar{\bar{n}}$, $\bar{d}_{start}$, and $\bar{\bar{d}}_{start}$ satisfy formulas (4) to (11), formulas (12) to (19), formulas (20) to (27), or formulas (28) to (35), to prevent the receive end of the base station from allocating, to another user, a sequence corresponding to five peak value points generated when the Doppler frequency shift is greater than one time a PRACH subcarrier spacing and is less than two times the PRACH subcarrier spacing, and thereby avoid interference between users that is caused by the Doppler frequency shift.

When $$\frac{1}{u} \geq \frac{N_{ZC}}{2},$$

a sequence obtained when left cyclic shift is performed on the ZC sequence by $$\frac{1}{u}$$

is the same as a sequence obtained when right cyclic shift is performed on the ZC sequence by $$N_{ZC} - \frac{1}{u}.$$

Therefore, in the present application, $$d_u = \begin{cases} p & 0 \leq p < N_{ZC}/2 \\ N_{ZC} - p & \text{another value} \end{cases},$$

where $$p = \frac{1}{u}.$$

As can be learned, $d_u$ is a cyclic shift corresponding to the random access sequence when the Doppler frequency shift is one time a PRACH subcarrier spacing.

Figure 3:
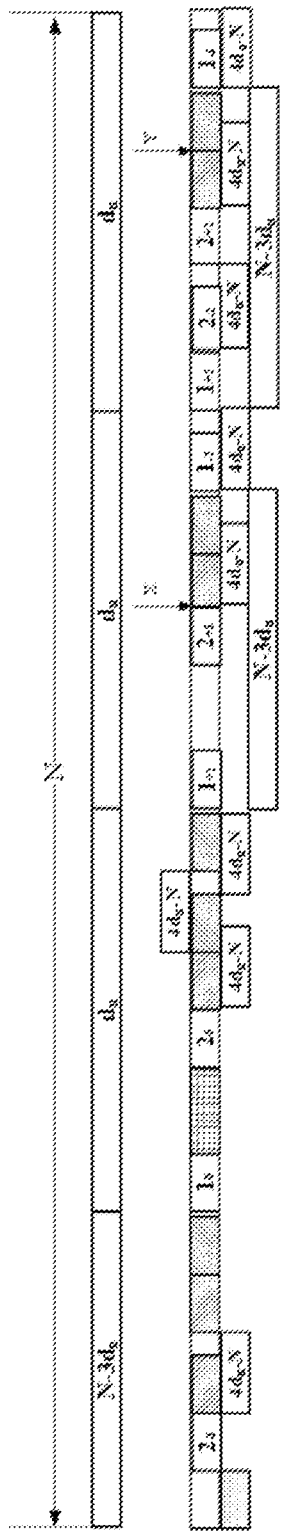
FIG. 3 is a schematic diagram of scenario 1 according to an embodiment of the present application.

FIG. 3 is a schematic diagram of scenario 1 according to an embodiment of the present application. In the figure, $N=N_{ZC}$, and satisfies $$\frac{N_{ZC}+N_{CS}}{4} \leq d_u < \frac{2}{7}N_{ZC}\left(\text{or } \frac{N_{ZC}+N_{CS}}{4} \leq d_u \leq \frac{2}{7}N_{ZC}\right).$$

As shown in FIG. 3, sequence shifts that are occupied by $1_0$, $1_{+1}$, $1_{+2}$, $1_{-1}$, and $1_{+2}$ are used as a first group, and sequence shifts that are occupied by $2_0$, $2_{+1}$, $2_{+2}$, $2_{-1}$, and $2_{+2}$ are used as a second group. A quantity of UE candidate sequence shifts in a group is $$n_{shift}^{RA} = \left\lfloor \frac{4d_u - N_{ZC}}{N_{CS}} \right\rfloor,$$

where $N_{CS}$ indicates a quantity of cyclic shifts that are occupied by a user. For example, a sequence length is $N_{ZC}$, and a user occupies $N_{CS}$ shifts. When the Doppler frequency shift is not considered, a maximum of $\lfloor N_{ZC}/N_{CS} \rfloor$ users are simultaneously supported to simultaneously send the random access sequence.

$n_{shift}^{RA}$ also indicates a quantity of users that can be distinguished in a group. From a perspective of a system, $n_{shift}^{RA}$ users can be distinguished in a group. From a perspective of a UE side, one UE may select a maximum of $n_{shift}^{RA}$ sequence shifts in a group.

It should be noted that, for the ZC sequence whose sequence length is $N_{ZC}$, when the Doppler frequency shift is not considered and $N_{CS}=0$, the ZC sequence may have $N_{ZC}$ candidate sequence shifts, which respectively correspond to cyclic shift values 0 to $N_{ZC}-1$. For example, if the ZC sequence whose root is u is marked as $x_u(n)$, when the cyclic shift value is 0, a generated sequence thereof is $x_u(n)$. When the cyclic shift value is 1, a generated sequence thereof is $x_u(n+1)$. When the Doppler frequency shift is not considered and $N_{CS}$ is greater than 0, there may be $\lfloor N_{ZC}/N_{CS} \rfloor$ candidate sequence shifts, which respectively correspond to cyclic shift values $Y*N_{CS}$, where Y is an integer greater than or equal to 0 and less than $\lfloor N_{ZC}/N_{CS} \rfloor -1$.

When the Doppler frequency shift is greater than one time a PRACH subcarrier spacing and is less than two times the PRACH subcarrier spacing, first user equipment generates a random access sequence according to a first cyclic shift value and sends the random access sequence to the base station. When the base station detects, by using a sequence corresponding to five cyclic shift values, the random access sequence sent by the first user equipment, there may be a peak value, and differences between the cyclic shift values and the first cyclic shift value are respectively 0, $d_u$, $-d_u$, $2d_u$, and $-2d_u$. Therefore, to avoid interference between the first user equipment and another user equipment, none of candidate sequence shifts corresponding to the five cyclic shift values can be allocated to the another user equipment. In addition, for the base station side, this is equivalent to that the candidate sequence shifts corresponding to the five cyclic shift values are all allocated to the first user equipment. That is, as shown in FIG. 3, sequence shifts (that is, sequence shifts that are occupied by $1_0$, $1_{+1}$, $1_{+2}$, $1_{-1}$, and $1_{+2}$) related to "1" are used as candidate sequence shifts of a same group of UEs, and sequence shifts (that is, sequence shifts that are occupied by $2_0$, $2_{+1}$, $2_{+2}$, $2_{-1}$, and $2_{+2}$) related to "2" are used as candidate sequence shifts of a same group of UEs.

In addition, because the differences between the five cyclic shift values and the first cyclic shift value are respectively 0, $d_u$, $-d_u$, $2d_u$, and $-2d_u$, it can also be learned that, for first UE in a first group of UEs, an initial sequence shift of sequence shifts that are occupied by $1_0$ is a cyclic shift value of the first UE in the first group of UEs. For first UE in a second group of UEs, an initial sequence shift of sequence shifts that are occupied by $2_0$ is a cyclic shift value of the first UE in the second group of UEs.

$d_{start} = 4d_u - N_{ZC} + n_{shift}^{RA} \cdot N_{CS}$ indicates a cyclic shift distance between neighboring groups, as shown by filling patterns of lattice patterns in FIG. 3.

$$n_{group}^{RA} = \left\lfloor \frac{d_u}{d_{start}} \right\rfloor$$

indicates a quantity of groups in a sequence whose sequence length is $N_{ZC}$. As shown in FIG. 3, a quantity of groups is 2 (that is, the first group and the second group).

$$\overline{n}_{shift}^{RA} = \max\left(\left\lfloor \frac{N_{ZC} - 3d_u - n_{group}^{RA} \cdot d_{start}}{N_{CS}} \right\rfloor, 0\right)$$

indicates a quantity of UE candidate sequence shifts in the last length that is insufficient for a group. The quantity of UE candidate sequence shifts in the last length that is insufficient for a group is 0 in FIG. 3.

$\overline{n}_{shift}^{RA} = \lfloor \min(d_u - n_{group}^{RA} \cdot d_{start}, 4d_u - N_{ZC} - \overline{n}_{shift}^{RA} N_{CS})/N_{CS} \rfloor$ indicates a quantity of UE candidate sequence shifts in first remaining sequence shifts, where the first remaining sequence shift is shown by filling patterns of stripes slanting towards left in FIG. 3.

$\overline{\overline{n}} = \lfloor((1 - \min(1, \overline{n}_{shift}^{RA}))(d_u - n_{group}^{RA} \cdot d_{start}) + \min(1, \overline{n}_{shift}^{RA})(4d_u - N_{ZC} + n_{shift}^{RA} \cdot N_{CS}))/N_{CS}\rfloor - \overline{n}_{shift}^{RA}$ indicates a quantity of UE candidate sequence shifts in second remaining sequence shifts, where the second remaining sequence shift is shown by filling patterns of stripes slanting towards right in FIG. 3.

$\overline{d}_{start} = N_{ZC} - 3d_u + n_{group}^{RA} \cdot d_{start} + \overline{n}_{shift}^{RA} N_{CS}$ indicates a cyclic shift value of a first UE candidate sequence shift in the first remaining sequence shifts, and is identified by an arrow X in FIG. 3.

$\overline{\equiv}_{start} = N_{ZC} - 2d_u + n_{group}^{RA} \cdot d_{start} + \overline{n}_{shift}^{RA} N_{CS}$ indicates a cyclic shift value of a first UE candidate sequence shift in the second remaining sequence shifts, and is identified by an arrow Y in FIG. 3.

For example, when $N_{ZC} = 839$, $N_{CS} = 18$, and $d_u = 222$, a corresponding scenario may be shown in FIG. 3.

It should be noted that, filling patterns of round point patterns in FIG. 3 are used to synchronously indicate one of five shift sequences occupied by a group, to more easily describe how to allocate each group.

Figure 4:
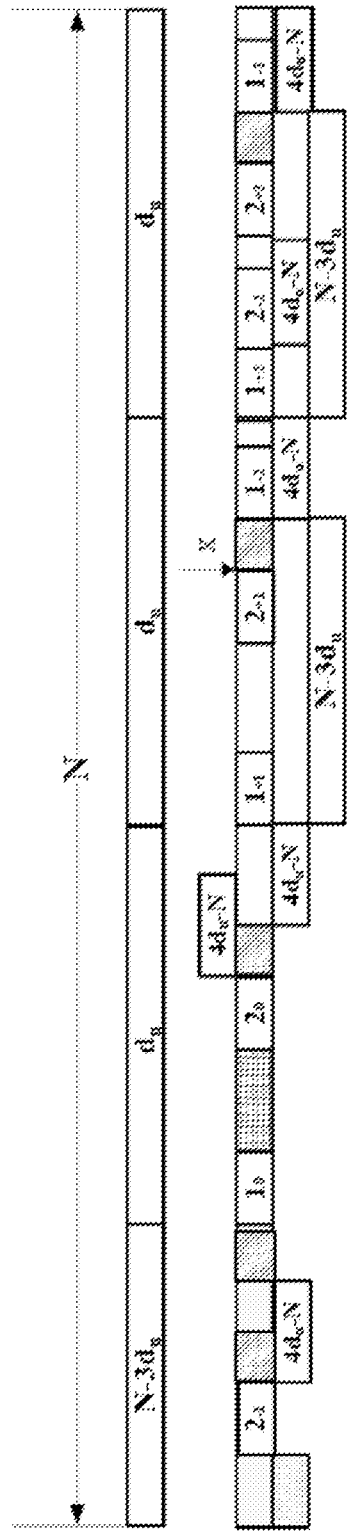
FIG. 4 is a schematic diagram of scenario 2 according to an embodiment of the present application.

FIG. 4 is a schematic diagram of scenario 2 according to an embodiment of the present application. In the figure, $N = N_{ZC}$, and satisfies $$\frac{N_{ZC} + N_{CS}}{4} \leq d_u < \frac{2}{7} N_{ZC} \left( \text{or } \frac{N_{ZC} + N_{CS}}{4} \leq d_u \leq \frac{2}{7} N_{ZC} \right).$$

As shown in FIG. 4, sequence shifts that are occupied by $1_0$, $1_{+1}$, $1_{+2}$, $1_{-1}$, and $1_{+2}$ are used as a first group, and sequence shifts that are occupied by $2_0$, $2_{+1}$, $2_{+2}$, $2_{-1}$, and $2_{+2}$ are used as a second group. A quantity of UE candidate sequence shifts in a group is $$n_{shift}^{RA} = \left\lfloor \frac{N_{ZC} - 3d_u}{N_{CS}} \right\rfloor,$$

where $N_{CS}$ indicates a quantity of cyclic shifts that are occupied by a user.

It should be noted that, in FIG. 4 and FIG. 3, physical meanings of $n_{shift}^{RA}$, $d_{start}$, $n_{group}^{RA}$, $\overline{n}_{shift}^{RA}$, $\overline{\overline{n}}_{shift}^{RA}$, $\overline{\overline{n}}$, $\overline{d}_{start}$, and $\equiv$ and formulas that need to be satisfied are all the same. Details are not described herein again.

$d_{start}$ is shown by filling patterns of lattice patterns in FIG. 4, $\overline{n}_{shift}^{RA}$ is shown by filling patterns of stripes slanting towards left in FIG. 4, and $\overline{d}_{start}$ is identified by an arrow X in FIG. 4.

In FIG. 4, $n_{group}^{RA}$ is 2, $\overline{n}_{shift}^{RA}$ is 0, $\overline{\overline{n}}_{shift}^{RA}$ is 0, and $\equiv$ is 0 (corresponding to that $\overline{\overline{n}}_{shift}^{RA}$ is 0).

For example, when $N_{ZC} = 839$, $N_{CS} = 22$, and $d_u = 221$, this may correspond to the scenario shown in FIG. 4.

It should be noted that, filling patterns of round point patterns in FIG. 4 are used to synchronously indicate one of five shift sequences occupied by one group, to more easily describe how to allocate each group.

Figure 5:
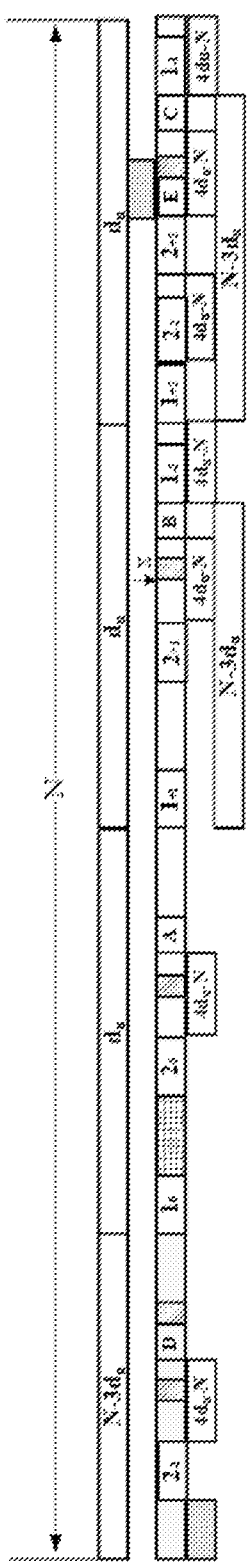
FIG. 5 is a schematic diagram of scenario 3 according to an embodiment of the present application.

FIG. 5 is a schematic diagram of scenario 3 according to an embodiment of the present application. In the figure, $N = N_{ZC}$, and satisfies $$\frac{N_{ZC} + N_{CS}}{4} \leq d_u < \frac{2}{7} N_{ZC} \left( \text{or } \frac{N_{ZC} + N_{CS}}{4} \leq d_u \leq \frac{2}{7} N_{ZC} \right).$$

As shown in FIG. 5, sequence shifts that are occupied by $1_0$, $1_{+1}$, $1_{+2}$, $1_{-1}$, and $1_{+2}$ are used as a first group, and sequence shifts that are occupied by $2_0$, $2_{+1}$, $2_{+2}$, $2_{-1}$, and $2_{+2}$ are used as a second group. A quantity of UE candidate sequence shifts in a group is $$n_{shift}^{RA} = \left\lfloor \frac{3d_u - N_{ZC}}{N_{CS}} \right\rfloor,$$

where $N_{CS}$ indicates a quantity of cyclic shifts that are occupied by a user.

It should be noted that, in FIG. 5 and FIG. 3, physical meanings of $n_{shift}^{RA}$, $d_{start}$, $n_{group}^{RA}$, $\overline{n}_{shift}^{RA}$, $\overline{\overline{n}}_{shift}^{RA}$, $\overline{\overline{n}}$, $\overline{d}_{start}$, and $\equiv$ and formulas that need to be satisfied are all the same. Details are not described herein again.

$d_{start}$ is shown by filling patterns of lattice patterns in FIG. 5, $\overline{n}_{shift}^{RA}$ is shown by filling patterns of stripes slanting towards left in FIG. 5, and $\overline{d}_{start}$ is identified by an arrow X in FIG. 5.

In FIG. 5, $n_{group}^{RA}$ is 2, $\overline{\overline{n}}_{shift}^{RA}$ is 0, and $\equiv$ is 0 (corresponding to that $\overline{\overline{n}}_{shift}^{RA}$ is 0).

In FIG. 5, $\overline{n}_{shift}^{RA}$ may be 1. That is, five candidate sequence shifts corresponding to filling patterns of characters A (which may correspond to 0), B (which may correspond to $+d_u$), C (which may correspond to $+2d_u$), D (which may correspond to $-d_u$), and E (which may correspond to $-2d_u$) are used as a new candidate sequence shift and are allocated to UE.

For example, when $N_{ZC} = 839$, $N_{CS} = 18$, and $d_u = 220$, this may correspond to the scenario shown in FIG. 5.

It should be noted that, filling patterns of round point patterns in FIG. 5 are used to synchronously indicate one of five shift sequences occupied by one group, to more easily describe how to allocate each group.

Figure 6:
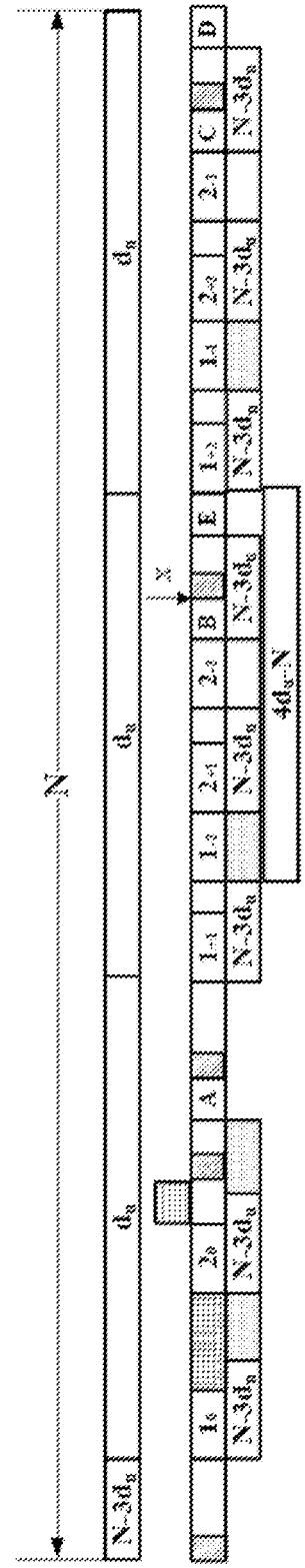
FIG. 6 is a schematic diagram of scenario 4 according to an embodiment of the present application.

FIG. 6 is a schematic diagram of scenario 4 according to an embodiment of the present application. In the figure, $N=N_{ZC}$, and satisfies $$\frac{2}{7}N_{ZC} \leq d_u \leq \frac{N_{ZC}-N_{CS}}{3} \left( \text{or } \frac{2}{7}N_{ZC} < d_u \leq \frac{N_{ZC}-N_{CS}}{3} \right).$$

As shown in FIG. 6, sequence shifts that are occupied by $1_0$, $1_{+1}$, $1_{+2}$, $1_{-1}$, and $1_{+2}$ are used as a first group, and sequence shifts that are occupied by $2_0$, $2_{+1}$, $2_{+2}$, $2_{-1}$, and $2_{+2}$ are used as a second group. A quantity of UE candidate sequence shifts in a group is $$n_{shift}^{RA} = \left\lfloor \frac{N_{ZC}-3d_u}{N_{CS}} \right\rfloor.$$

It should be noted that, in FIG. 6 and FIG. 3, $n_{shift}^{RA}$, $d_{start}$, $n_{group}^{RA}$, and $\bar{n}_{shift}^{RA}$ have save physical meanings, and only formulas that need to be satisfied are different. An analysis process is similar to that of FIG. 3. Details are not described herein again.

$d_{start}=N_{ZC}-3d_u+n_{shift}^{RA}\cdot N_{CS}$ indicates a cyclic shift distance between neighboring groups, and is shown by filling patterns of lattice patterns in FIG. 6.

$$n_{group}^{RA} = \left\lfloor \frac{d_u}{d_{start}} \right\rfloor$$

indicates a quantity of groups in a sequence whose sequence length is $N_{ZC}$. As shown in FIG. 6, a quantity of groups is 2.

$$\bar{n}_{shift}^{RA} = \max\left( \left\lfloor \frac{4d_u - N_{ZC} - n_{group}^{RA}\cdot d_{start}}{N_{CS}} \right\rfloor, 0 \right)$$

indicates a quantity of UE candidate sequence shifts in the last length that is insufficient for a group. As shown in FIG. 6, the quantity of UE candidate sequence shifts in the last length that is insufficient for a group may be 1. That is, five candidate sequence shifts corresponding to filling patterns of characters A, B, C, D, and E are used as a new candidate sequence shift and are allocated to UE.

$\bar{\bar{n}}_{shift}^{RA}=\lfloor \min(d_u-n_{group}^{RA}\cdot d_{start}, N_{ZC}-3d_u-\bar{n}_{shift}^{RA}N_{CS})/N_{CS} \rfloor$ indicates a quantity of UE candidate sequence shifts in first remaining sequence shifts. The first remaining sequence shift is shown by filling patterns of stripes slanting towards left in FIG. 6.

$\bar{\bar{\bar{n}}}_{shift}^{RA}=0$ indicates that a quantity of UE candidate sequence shifts in second remaining sequence shifts is 0.

$\bar{d}_{start}=d_u+n_{group}^{RA}\cdot d_{start}+\bar{n}_{shift}^{RA}N_{CS}$ indicates a cyclic shift value of a first UE candidate sequence shift in the first remaining sequence shifts, and is identified by an arrow X in FIG. 6.

$\bar{\bar{\equiv}}_{start}=0$ (corresponding to $\bar{\bar{\bar{n}}}_{shift}^{RA}=0$).

For example, when $N_{ZC}=839$, $N_{CS}=22$, and $d_u=264$, this may correspond to the scenario shown in FIG. 6.

It should be noted that, filling patterns of round point patterns in FIG. 6 are used to synchronously indicate one of five shift sequences occupied by one group, and filling patterns of vertical line patterns are used to synchronously indicate sequence shifts that are occupied by filling patterns of characters, to more easily describe how to allocate each group.

Figure 7:
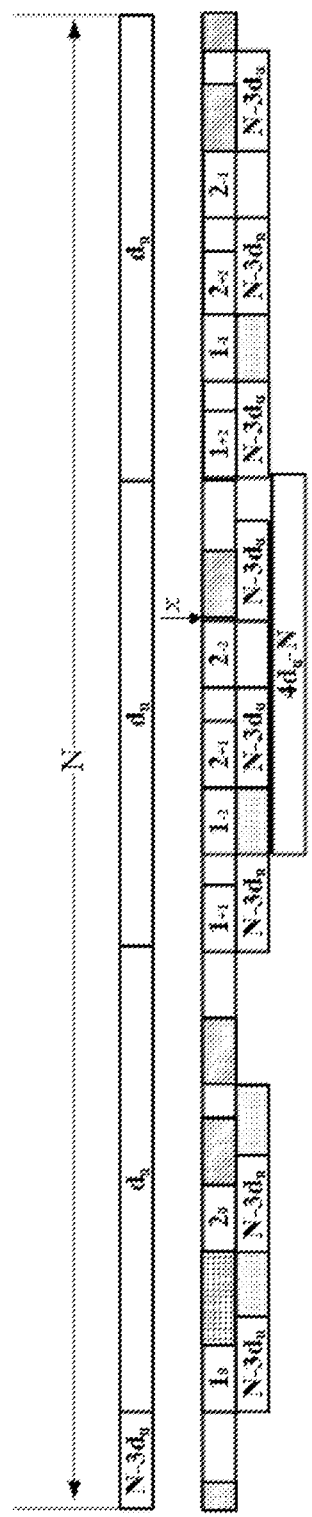
FIG. 7 is a schematic diagram of scenario 5 according to an embodiment of the present application.

FIG. 7 is a schematic diagram of scenario 5 according to an embodiment of the present application. In the figure, $N=N_{ZC}$, and satisfies and satisfies $$\frac{2}{7}N_{ZC} \leq d_u \leq \frac{N_{ZC}-N_{CS}}{3} \left( \text{or } \frac{2}{7}N_{ZC} < d_u \leq \frac{N_{ZC}-N_{CS}}{3} \right).$$

As shown in FIG. 7, sequence shifts that are occupied by $1_0$, $1_{+1}$, $1_{+2}$, $1_{-1}$, and $1_{+2}$ are used as a first group, and sequence shifts that are occupied by $2_0$, $2_{+1}$, $2_{+2}$, $2_{-1}$, and $2_{+2}$ are used as a second group. A quantity of UE candidate sequence shifts in a group is $$n_{shift}^{RA} = \left\lfloor \frac{N_{ZC}-3d_u}{N_{CS}} \right\rfloor,$$

where $N_{CS}$ indicates a quantity of cyclic shifts that are occupied by a user.

It should be noted that, in FIG. 7 and FIG. 6, physical meanings of $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}_{shift}^{RA}$, $\bar{d}_{start}$, and $\equiv$ and formulas that need to be satisfied are all the same. Details are not described herein again.

$d_{start}$ is shown by filling patterns of lattice patterns in FIG. 7, $\bar{n}_{shift}^{RA}$ is shown by filling patterns of stripes slanting towards left in FIG. 7, and $\bar{d}_{start}$ is identified by an arrow X in FIG. 7.

In FIG. 7, $n_{group}^{RA}$ is 2, $\bar{n}_{shift}^{RA}$ is 0, $\bar{\bar{n}}_{shift}^{RA}$ is 0, and $\equiv$ is 0 (corresponding to that $\bar{\bar{\bar{n}}}_{shift}^{RA}$ is 0).

For example, when $N_{ZC}=839$, $N_{CS}=22$, and $d_u=261$, this may correspond to the scenario shown in FIG. 7.

It should be noted that, filling patterns of round point patterns in FIG. 7 are used to synchronously indicate one of five shift sequences occupied by one group, to more easily describe how to allocate each group.

Figure 8:
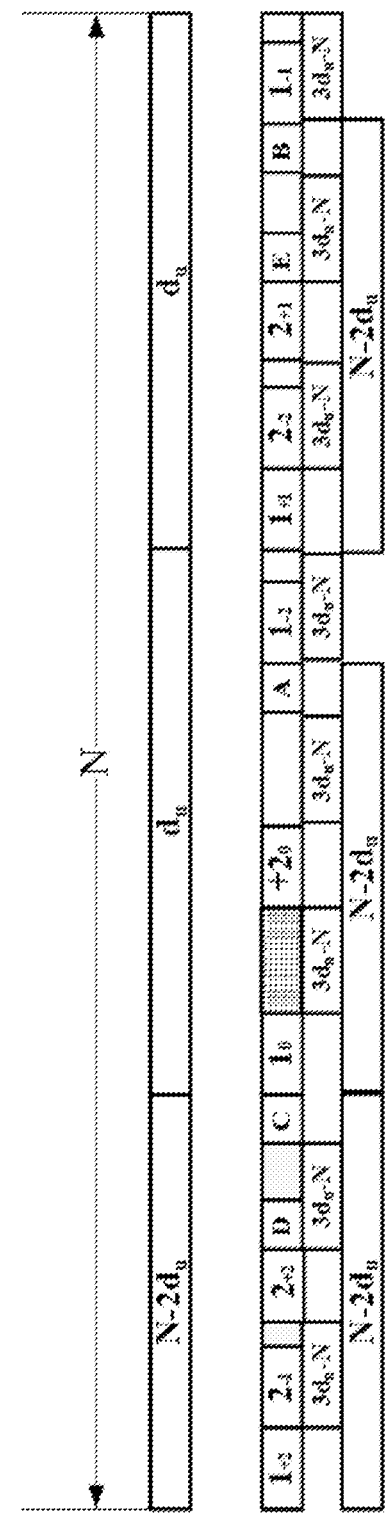
FIG. 8 is a schematic diagram of scenario 6 according to an embodiment of the present application.

FIG. 8 is a schematic diagram of scenario 6 according to an embodiment of the present application. In the figure, $N=N_{ZC}$, and satisfies $$\frac{N_{ZC}+N_{CS}}{3} \leq d_u < \frac{2N_{ZC}}{5} \left( \text{or } \frac{N_{ZC}+N_{CS}}{3} \leq d_u \leq \frac{2N_{ZC}}{5} \right).$$

As shown in FIG. 7, sequence shifts that are occupied by $1_0$, $1_{+1}$, $1_{+2}$, $1_{-1}$, and $1_{+2}$ are used as a first group, and sequence shifts that are occupied by $2_0$, $2_{+1}$, $2_{+2}$, $2_{-1}$, and $2_{+2}$ are used as a second group. A quantity of UE candidate sequence shifts in a group is $$n_{shift}^{RA} = \left\lfloor \frac{3d_u-N_{ZC}}{N_{CS}} \right\rfloor.$$

It should be noted that, in FIG. 8 and FIG. 3, $n_{shift}^{RA}$, $d_{start}$, $n_{group}^{RA}$, and $\bar{n}_{shift}^{RA}$ have save physical meanings, and only formulas that need to be satisfied are different. An analysis process is similar to that of FIG. 3. Details are not described herein again.

$d_{start}=N_{ZC}-3d_u+n_{shift}^{RA}\cdot N_{CS}$ indicates a cyclic shift distance between neighboring groups, and is shown by filling patterns of lattice patterns in FIG. 8.

$$n_{group}^{RA} = \left\lfloor \frac{d_u}{d_{start}} \right\rfloor$$

indicates a quantity of groups in a sequence whose sequence length is $N_{ZC}$. As shown in FIG. 8, a quantity of groups is 2.

$$\overline{n}_{shift}^{RA} = \max\left(\left\lfloor \frac{N_{ZC} - 2d_u - n_{group}^{RA} \cdot d_{start}}{N_{CS}} \right\rfloor, 0\right)$$

indicates a quantity of UE candidate sequence shifts in the last length that is insufficient for a group. As shown in FIG. 8, the quantity of UE candidate sequence shifts in the last length that is insufficient for a group may be 1. That is, five candidate sequence shifts corresponding to filling patterns of characters A, B, C, D, and E are used as a new candidate sequence shift and are allocated to UE.

$\overline{n}_{shift}^{RA} = 0$ indicates that a quantity of UE candidate sequence shifts in first remaining sequence shifts is 0.

$\overline{\overline{n}}_{shift}^{RA} = 0$ indicates that a quantity of UE candidate sequence shifts in second remaining sequence shifts is 0.

$\overline{d}_{start} = 0$ (corresponding to $\overline{n}_{shift}^{RA} = 0$).

$\overline{\overline{=}}_{start} = 0$ (corresponding to $\overline{\overline{n}}_{shift}^{RA} = 0$).

For example, when $N_{ZC}=839$, $N_{CS}=22$, and $d_u=300$, this may correspond to the scenario shown in FIG. 8.

Figure 9:
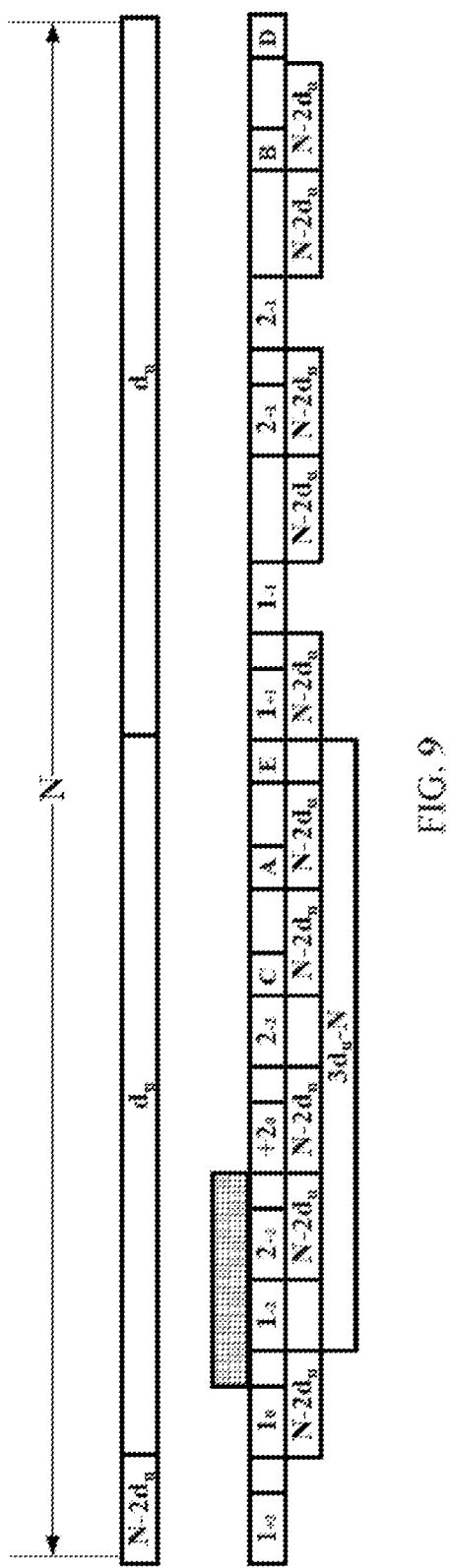
FIG. 9 is a schematic diagram of scenario 7 according to an embodiment of the present application.

FIG. 9 is a schematic diagram of scenario 7 according to an embodiment of the present application. In the figure, $N=N_{ZC}$, and satisfies $$\frac{2N_{ZC}}{5} \leq d_u < \frac{N_{ZC} - N_{CS}}{2} \left(\text{or } \frac{2N_{ZC}}{5} \leq d_u \leq \frac{N_{ZC} - N_{CS}}{2}\right).$$

As shown in FIG. 9, sequence shifts that are occupied by $1_0$, $1_{+1}$, $1_{+2}$, $1_{-1}$, and $1_{+2}$ are used as a first group, and sequence shifts that are occupied by $2_0$, $2_{+1}$, $2_{+2}$, $2_{-1}$, and $2_{+2}$ are used as a second group. A quantity of UE candidate sequence shifts in a group is $$n_{shift}^{RA} = \left\lfloor \frac{N_{ZC} - 2d_u}{N_{CS}} \right\rfloor.$$

It should be noted that, in FIG. 9 and FIG. 3, $n_{shift}^{RA}$, $d_{start}$, $n_{group}^{RA}$, and $\overline{n}_{shift}^{RA}$ have save physical meanings, and only formulas that need to be satisfied are different. An analysis process is similar to that of FIG. 3. Details are not described herein again.

$d_{start} = 2(N_{ZC} - 2d_u) + n_{shift}^{RA} \cdot N_{CS}$ indicates a cyclic shift distance between neighboring groups, and is shown by filling patterns of lattice patterns in FIG. 9.

$$n_{group}^{RA} = \left\lfloor \frac{N_{ZC} - d_u}{d_{start}} \right\rfloor$$

indicates a quantity of groups in a sequence whose sequence length is $N_{ZC}$. As shown in FIG. 9, a quantity of groups is 2.

$$\overline{n}_{shift}^{RA} = \max\left(\left\lfloor \frac{3d_u - N_{ZC} - n_{group}^{RA} \cdot d_{start}}{N_{CS}} \right\rfloor, 0\right)$$

indicates a quantity of UE candidate sequence shifts in the last length that is insufficient for a group. As shown in FIG. 9, the quantity of UE candidate sequence shifts in the last length that is insufficient for a group may be 1. That is, five candidate sequence shifts corresponding to filling patterns of characters A, B, C, D, and E are used as a new candidate sequence shift and are allocated to UE.

$\overline{n}_{shift}^{RA} = 0$ indicates that a quantity of UE candidate sequence shifts in first remaining sequence shifts is 0.

$\overline{\overline{n}}_{shift}^{RA} = 0$ indicates that a quantity of UE candidate sequence shifts in second remaining sequence shifts is 0.

$\overline{d}_{start} = 0$ (corresponding to $\overline{n}_{shift}^{RA} = 0$).

$\overline{\overline{=}}_{start} = 0$ (corresponding to $\overline{\overline{n}}_{shift}^{RA} = 0$).

For example, when $N_{ZC}=839$, $N_{CS}=22$, and $d_u=393$, this may correspond to the scenario shown in FIG. 9.

Figure 10:
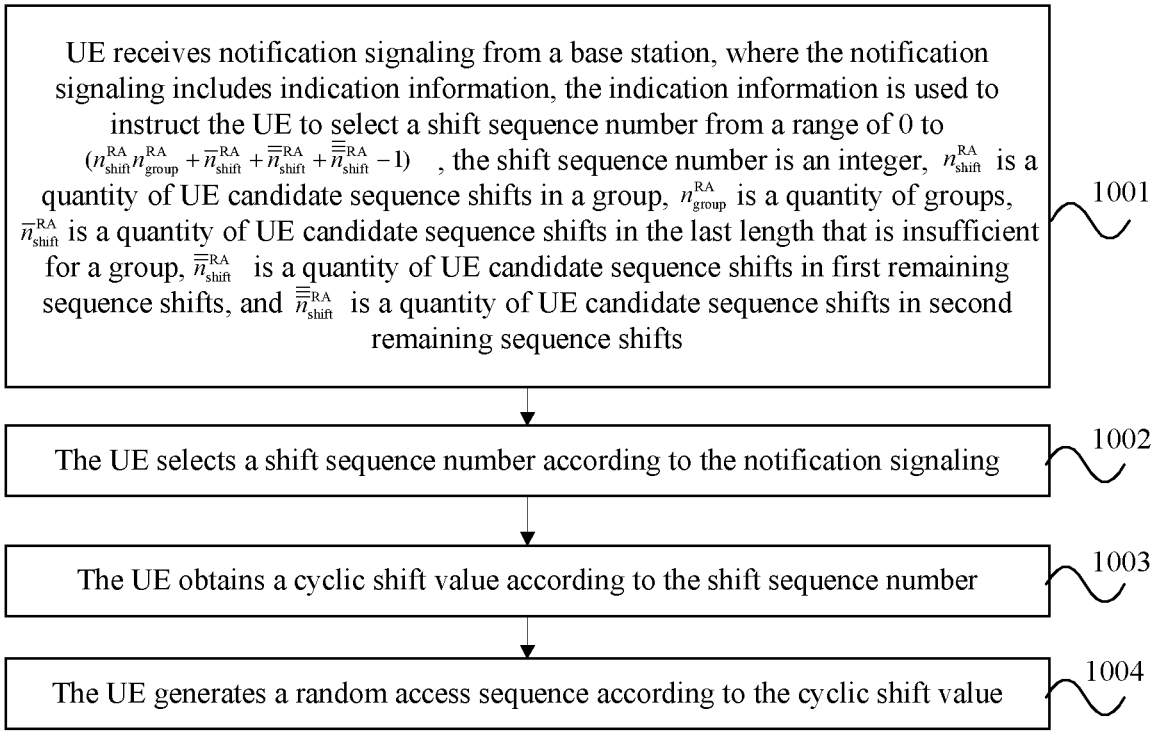
FIG. 10 is a flowchart of Embodiment 3 of a random access sequence generation method according to the present application.

FIG. 10 is a flowchart of Embodiment 3 of a random access sequence generation method according to the present application. As shown in FIG. 10, the method in this embodiment may include:

Step 1001: UE receives notification signaling from a base station, where the notification signaling includes indication information, the indication information is used to instruct the UE to select a shift sequence number from a range of 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$, the shift sequence number is an integer, $n_{shift}^{RA}$ is a quantity of UE candidate sequence shifts in a group, $n_{group}^{RA}$ is a quantity of groups, $\overline{n}_{shift}^{RA}$ is a quantity of UE candidate sequence shifts in the last length that is insufficient for a group, $\overline{\overline{n}}_{shift}^{RA}$ is a quantity of UE candidate sequence shifts in first remaining sequence shifts, and $\overline{\overline{\overline{n}}}_{shift}^{RA}$ is a quantity of UE candidate sequence shifts in second remaining sequence shifts.

Step 1002: The UE selects a shift sequence number according to the notification signaling.

Specifically, the UE selects the shift sequence number from the range of 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$ according to the notification signaling.

Step 1003: The UE obtains a cyclic shift value according to the shift sequence number.

Step 1004: The UE generates a random access sequence according to the cyclic shift value.

In this embodiment, the UE selects the shift sequence number from the range of 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$ according to the notification signaling, so that after a quantity of UEs that can be distinguished is considered from a perspective of a group, quantities of UEs that can be further distinguished in other remaining discrete shift sequences obtained after grouping are further considered, thereby expanding a range from which a shift sequence number is selected.

Embodiment 4 of the random access sequence generation method is as follows:

Optionally, based on Embodiment 3 of the random access sequence generation method in the present application, step 1003 may specifically include:

obtaining, by the UE, the cyclic shift value $C_v$ according to the shift sequence number v by using formula (1), formula (2), or formula (3).

Optionally, in the case of $v \leq (n_{shift}^{RA} n_{group}^{RA} + \overline{n}_{shift}^{RA} - 1)$, the UE obtains the cyclic shift value $C_v$ by using formula (1);

in the case of $(n_{shift}^{RA} n_{group}^{RA} + \bar{n}_{shift}^{RA} - 1) < v \leq (n_{shift}^{RA} n_{group}^{RA} + \bar{n}_{shift}^{RA} + \bar{\bar{n}}_{shift}^{RA} - 1)$, the UE obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \leq (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the UE obtains the cyclic shift value $C_v$ by using formula (3).

Optionally, step 1004 may specifically include:

generating, by the UE, the random access sequence $x_{u,C_v}(n)$ according to the cyclic shift value $C_v$ by using the following formula (36):

$$x_{u,C_v}(n) = x_u((n+C_v) \bmod N_{ZC}) \quad (36),$$

where $N_{ZC}$ is a sequence length, and a ZC sequence whose root is u is defined as:

$$x_u(n) = e^{-j\frac{\pi u n(n+1)}{N_{ZC}}},$$

$0 \leq n \leq N_{ZC} - 1$.

In this embodiment, detailed descriptions of $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ are the same as those in Embodiment 2 of the random access sequence generation method. Details are not described herein again.

Figure 11:
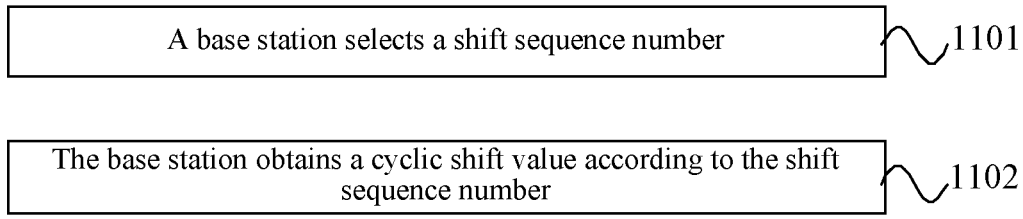
FIG. 11 is a flowchart of Embodiment 5 of a random access sequence generation method according to the present application.

FIG. 11 is a flowchart of Embodiment 5 of a random access sequence generation method according to the present application. As shown in FIG. 11, the method in this embodiment may include:

Step 1101: A base station selects a shift sequence number.

Specifically, the base station selects the shift sequence number v from a range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, where v is an integer, $n_{shift}^{RA}$ is a quantity of user equipment UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts.

Step 1102: The base station obtains a cyclic shift value according to the shift sequence number.

Specifically, the base station obtains the cyclic shift value $C_v$ according to the shift sequence number v by using the following formula (1), formula (2), or formula (3):

$$C_v = d_{offset} + d_{start} \lfloor v/n_{shift}^{RA} \rfloor + (v \bmod n_{shift}^{RA}) N_{CS} \quad (1);$$

$$C_v = d_{offset} + \bar{d}_{start} + (v - n_{shift}^{RA} n_{group}^{RA} + \bar{n}_{shift}^{RA}) N_{CS} \quad (2);$$

$$C_v = d_{offset} + \bar{\bar{\equiv}}_{start} + (v - n_{shift}^{RA} n_{group}^{RA} + \bar{n}_{shift}^{RA} + \bar{\bar{n}}_{shift}^{RA}) N_{CS} \quad (3),$$

where $d_{offset}$ is a shift offset, $d_{start}$ is a cyclic shift distance between neighboring groups, $n_{shift}^{RA}$ is a quantity of UE candidate sequence shifts in a group, $N_{CS}$ is a quantity of cyclic shifts that are occupied by a user, $\bar{d}_{start}$ is a cyclic shift value of a first UE candidate sequence shift in the first remaining sequence shifts, and $\equiv$ is a cyclic shift value of a first UE candidate sequence shift in the second remaining sequence shifts.

In this embodiment, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (20) to (27); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (28) to (35).

It should be noted that, in this embodiment, detailed descriptions of $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ are the same as those in Embodiment 2 of the random access sequence generation method. Details are not described herein again.

Optionally, in the case of $v \leq (n_{shift}^{RA} n_{group}^{RA} + \bar{n}_{shift}^{RA} - 1)$, the base station obtains the cyclic shift value $C_v$ by using formula (1);

in the case of $(n_{shift}^{RA} n_{group}^{RA} + \bar{n}_{shift}^{RA} - 1) < v \leq (n_{shift}^{RA} n_{group}^{RA} + \bar{n}_{shift}^{RA} + \bar{\bar{n}}_{shift}^{RA} - 1)$, the base station obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \leq (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the base station obtains the cyclic shift value $C_v$ by using formula (3).

Optionally, in the case of $$\frac{N_{ZC} + N_{CS}}{4} \leq d_u < \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7} N_{ZC} \leq d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Alternatively, in the case of $$\frac{N_{ZC} + N_{CS}}{4} \leq d_u \leq \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7} N_{ZC} < d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Optionally, in the case of $$\frac{N_{ZC} + N_{CS}}{3} \leq d_u < \frac{2 N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2 N_{ZC}}{5} \leq d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Alternatively, in the case of $$\frac{N_{ZC} + N_{CS}}{3} \leq d_u \leq \frac{2 N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} < d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

In this embodiment, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ that satisfy formulas (4) to (11), formulas (12) to (19), formulas (20) to (27), or formulas (28) to (35) are used, and the shift sequence number is selected from the range of 0 to ($n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1$), thereby expanding a range from which a shift sequence number is selected.

Figure 12:
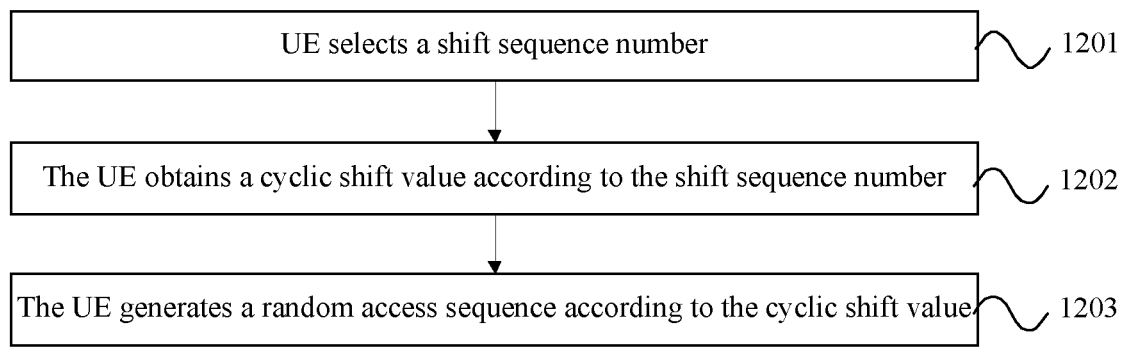
FIG. 12 is a flowchart of Embodiment 6 of a random access sequence generation method according to the present application.

FIG. 12 is a flowchart of Embodiment 6 of a random access sequence generation method according to the present application. As shown in FIG. 12, the method in this embodiment may include:

Step 1201: UE selects a shift sequence number.

Specifically, the UE selects the shift sequence number v from a range of 0 to ($n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1$).

v is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts.

Step 1202: The UE obtains a cyclic shift value according to the shift sequence number.

Specifically, the UE obtains the cyclic shift value $C_v$ according to the shift sequence number v by using the following formula (1), formula (2), or formula (3):

$$C_v = d_{offset} + d_{start} \lfloor v / n_{shift}^{RA} \rfloor + (v \bmod n_{shift}^{RA}) N_{CS} \quad (1)$$

$$C_v = d_{offset} + \bar{d}_{start} + (v - n_{shift}^{RA} n_{group}^{RA} + \bar{n}_{shift}^{RA}) N_{CS} \quad (2)$$

$$C_v = d_{offset} + \equiv_{start} + (v - n_{shift}^{RA} n_{group}^{RA} + \bar{n}_{shift}^{RA} + \bar{\bar{n}}_{shift}^{RA}) N_{CS} \quad (3),$$ where $d_{offset}$ is a shift offset, $d_{start}$ is a cyclic shift distance between neighboring groups, $n_{shift}^{RA}$ is a quantity of UE candidate sequence shifts in a group, $N_{CS}$ is a quantity of cyclic shifts that are occupied by a user, $\bar{d}_{start}$ is a cyclic shift value of a first UE candidate sequence shift in the first remaining sequence shifts, and $\equiv$ is a cyclic shift value of a first UE candidate sequence shift in the second remaining sequence shifts.

Step 1203: The UE generates a random access sequence according to the cyclic shift value.

Specifically, the UE generates the random access sequence $x_{u,C_v}(n)$ according to the cyclic shift value $C_v$ by using the following formula (36):

$$x_{u,C_v}(n) = x_u((n + C_v) \bmod N_{ZC}) \quad (36),$$ where $N_{ZC}$ is a sequence length, and a ZC sequence whose root is u is defined as:

$$x_u(n) = e^{-j\frac{\pi u n(n+1)}{N_{ZC}}},$$

$0 \le n \le N_{ZC} - 1$.

In this embodiment, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (20) to (27); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (28) to (35).

It should be noted that, in this embodiment, detailed descriptions of $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ are the same as those in Embodiment 2 of the random access sequence generation method. Details are not described herein again.

Optionally, in the case of $v \le (n_{shift}^{RA} n_{group}^{RA} + \bar{n}_{shift}^{RA} - 1)$, the base station obtains the cyclic shift value $C_v$ by using formula (1);

in the case of $(n_{shift}^{RA} n_{group}^{RA} + \bar{n}_{shift}^{RA} - 1) < v \le (n_{shift}^{RA} n_{group}^{RA} + \bar{n}_{shift}^{RA} + \bar{\bar{n}}_{shift}^{RA} - 1)$, the base station obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \le (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the base station obtains the cyclic shift value $C_v$ by using formula (3).

Optionally, in the case of $$\frac{N_{ZC} + N_{CS}}{4} \le d_u < \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7} N_{ZC} \le d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Alternatively, in the case of $$\frac{N_{ZC} + N_{CS}}{4} \le d_u \le \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7} N_{ZC} < d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Optionally, in the case of $$\frac{N_{ZC} + N_{CS}}{3} \le d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} \le d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (28) to (35).

Alternatively, in the case of $$\frac{N_{ZC}+N_{CS}}{3} \le d_u \le \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (20) to (27), in the case of $$\frac{2N_{ZC}}{5} < d_u \le \frac{N_{ZC}-N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (28) to (35).

In this embodiment, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ that satisfy formulas (4) to (11), formulas (12) to (19), formulas (20) to (27), or formulas (28) to (35) are used, and the shift sequence number is selected from the range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, thereby expanding a range from which a shift sequence number is selected.

Figure 13:
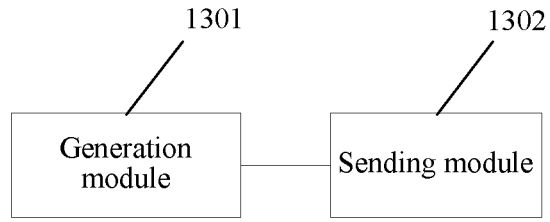
FIG. 13 is a schematic structural diagram of Embodiment 1 of a base station according to the present application.

FIG. 13 is a schematic structural diagram of Embodiment 1 of a base station according to the present application. As shown in FIG. 13, the base station in this embodiment may include: a generation module 1301 and a sending module 1302. The generation module 1301 is configured to generate notification signaling, where the notification signaling includes indication information, the indication information is configured to instruct user equipment UE to select a shift sequence number from a range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the shift sequence number is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts. The sending module 1302 is configured to send the notification signaling to the UE, so that the UE generates a random access sequence according to the indication information.

The base station in this embodiment may be configured to execute the technical solution in the method embodiment shown in FIG. 1. An implementation principle and a technical effect thereof are similar, and details are not described herein again.

Figure 14:
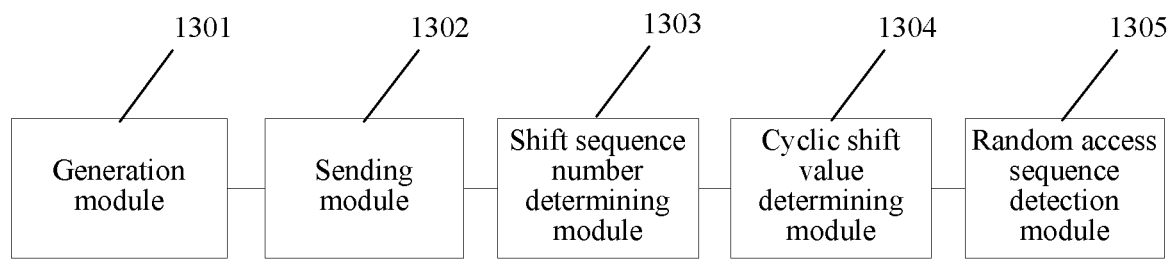
FIG. 14 is a schematic structural diagram of Embodiment 2 of a base station according to the present application.

FIG. 14 is a schematic structural diagram of Embodiment 2 of a base station according to the present application. As shown in FIG. 14, based on the structure of the base station shown in FIG. 13, the base station in this embodiment may further include: a shift sequence number determining module 1303, a cyclic shift value determining module 1304, and a random access sequence detection module 1305. The shift sequence number determining module 1303 is configured to select a shift sequence number from the range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$. The cyclic shift value determining module 1304 is configured to obtain a cyclic shift value according to the shift sequence number. The random access sequence detection module 1305 is configured to: generate a detection sequence according to the cyclic shift value, and detect, by using the detection sequence, a random access sequence sent by the UE, where the random access sequence is generated by the UE according to the indication information.

Optionally, the cyclic shift value determining module 1304 is specifically configured to:
obtain the cyclic shift value $C_v$ according to the shift sequence number v by using formula (1), formula (2), or formula (3).

Optionally, in the case of $v \le (n_{shift}^{RA} n_{group}^{RA} + \bar{n}_{shift}^{RA} - 1)$, the cyclic shift value determining module 1304 obtains the cyclic shift value $C_v$ by using formula (1);
in the case of $(n_{shift}^{RA} n_{group}^{RA} + \bar{n}_{shift}^{RA} - 1) < v \le (n_{shift}^{RA} n_{group}^{RA} + \bar{n}_{shift}^{RA} + \bar{\bar{n}}_{shift}^{RA} - 1)$, the cyclic shift value determining module 1304 obtains the cyclic shift value $C_v$ by using formula (2);
in the case of $(n_{shift}^{RA} n_{group}^{RA} + \bar{n}_{shift}^{RA} + \bar{\bar{n}}_{shift}^{RA} - 1) < v \le (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the cyclic shift value determining module 1304 obtains the cyclic shift value $C_v$ by using formula (3).

Optionally, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (12) to (19); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (20) to (27); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (28) to (35).

Optionally, in the case of $$\frac{N_{ZC}+N_{CS}}{4} \le d_u < \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7}N_{ZC} \le d_u \le \frac{N_{ZC}-N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Alternatively, in the case of $$\frac{N_{ZC}+N_{CS}}{4} \le d_u \le \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7}N_{ZC} < d_u \le \frac{N_{ZC}-N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Optionally, in the case of $$\frac{N_{ZC}+N_{CS}}{3} \le d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} \le d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Alternatively, in the case of $$\frac{N_{ZC} + N_{CS}}{3} \le d_u \le \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} < d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

The base station in this embodiment may be configured to execute the technical solution in the method embodiment shown in FIG. 2. An implementation principle and a technical effect thereof are similar, and details are not described herein again.

Figure 15:
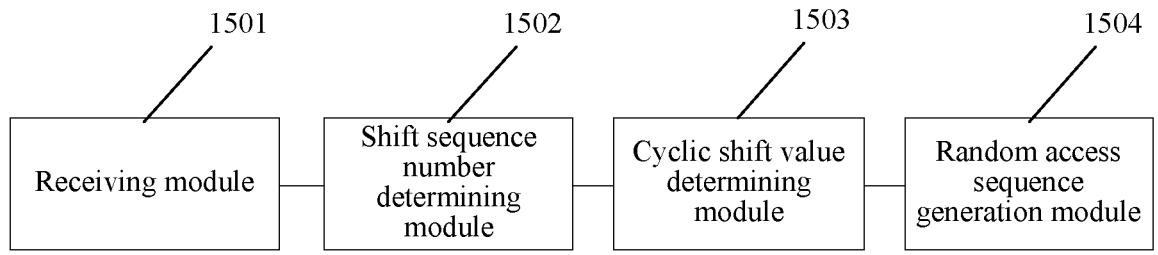
FIG. 15 is a schematic structural diagram of Embodiment 1 of user equipment according to the present application.

FIG. 15 is a schematic structural diagram of Embodiment 1 of user equipment according to the present application. As shown in FIG. 15, the user equipment in this embodiment may include:

a receiving module 1501, a shift sequence number determining module 1502, a cyclic shift value determining module 1503, and a random access sequence generation module 1504. The receiving module 1501 is configured to receive notification signaling from a base station, where the notification signaling includes indication information, the indication information is used to instruct the UE to select a shift sequence number from a range of 0 to $(n_{shift}^{RA}n_{group}^{RA} + \bar{n}_{shift}^{RA} + \bar{\bar{n}}_{shift}^{RA} + \bar{\bar{\bar{n}}}_{shift}^{RA} - 1)$, the shift sequence number is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts. The shift sequence number determining module 1502 is configured to select a shift sequence number from the range of 0 to $(n_{shift}^{RA}n_{group}^{RA} + \bar{n}_{shift}^{RA} + \bar{\bar{n}}_{shift}^{RA} + \bar{\bar{\bar{n}}}_{shift}^{RA} - 1)$ according to the notification signaling.

The cyclic shift value determining module 1503 is configured to obtain a cyclic shift value according to the shift sequence number. The random access sequence generation module 1504 is configured to generate a random access sequence according to the cyclic shift value.

The UE in this embodiment may be configured to execute the technical solution in the method embodiment shown in FIG. 10. An implementation principle and a technical effect thereof are similar, and details are not described herein again.

Embodiment 2 of the user equipment is as follows:

Optionally, based on Embodiment 1 of the user equipment of the present application, the cyclic shift value determining module 1503 is specifically configured to:

obtain the cyclic shift value $C_v$ according to the shift sequence number $v$ by using formula (1), formula (2), or formula (3).

Optionally, in the case of $v \le (n_{shift}^{RA}n_{group}^{RA} + \bar{n}_{shift}^{RA} - 1)$, the cyclic shift value determining module 1503 obtains the cyclic shift value $C_v$ by using formula (1);

in the case of $(n_{shift}^{RA}n_{group}^{RA} + \bar{n}_{shift}^{RA} - 1) < v \le (n_{shift}^{RA}n_{group}^{RA} + \bar{n}_{shift}^{RA} + \bar{\bar{n}}_{shift}^{RA} - 1)$, the cyclic shift value determining module 1503 obtains the cyclic shift value $C_v$ by using formula (2);

in the case of $(n_{shift}^{RA}n_{group}^{RA} + \bar{n}_{shift}^{RA} + \bar{\bar{n}}_{shift}^{RA} - 1) < v \le (n_{shift}^{RA}n_{group}^{RA} + \bar{n}_{shift}^{RA} + \bar{\bar{n}}_{shift}^{RA} + \bar{\bar{\bar{n}}}_{shift}^{RA} - 1)$, the cyclic shift value determining module 1503 obtains the cyclic shift value $C_v$ by using formula (3).

Optionally, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (12) to (19); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (20) to (27); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (28) to (35).

Optionally, in the case of $$\frac{N_{ZC} + N_{CS}}{4} \le d_u < \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7}N_{ZC} \le d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Alternatively, in the case of $$\frac{N_{ZC} + N_{CS}}{4} \le d_u \le \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7}N_{ZC} < d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Optionally, in the case of $$\frac{N_{ZC} + N_{CS}}{3} \le d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} \le d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Alternatively, in the case of $$\frac{N_{ZC} + N_{CS}}{3} \leq d_u \leq \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} < d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Optionally, the random access sequence generation module 1504 is specifically configured to:

generate the random access sequence $x_{u,C_v}(n)$ according to the cyclic shift value $C_v$ by using the following formula (36):

$$x_{u,C_v}(n) = x_u((n+C_v) \bmod N_{ZC}) \qquad (36),\text{ where}$$

$N_{ZC}$ is a sequence length, and a ZC sequence whose root is u is defined as:

$$x_u(n) = e^{-j\frac{\pi u n(n+1)}{N_{ZC}}},$$

$0 \leq n \leq N_{ZC}-1$.

The UE in this embodiment may be configured to execute the technical solution in Embodiment 4 of the random access sequence generation method. An implementation principle and a technical effect thereof are similar, and details are not described herein again.

The present application further provides a random access sequence generation system, including the base station in Embodiment 1 or Embodiment 2 of the base station, and the user equipment in Embodiment 1 or Embodiment 2 of the user equipment.

Figure 16:
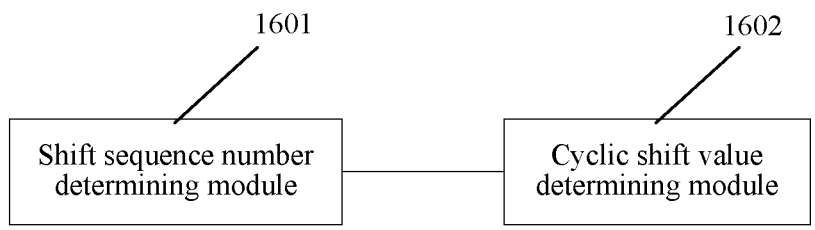
FIG. 16 is a schematic structural diagram of Embodiment 3 of a base station according to the present application.

FIG. 16 is a schematic structural diagram of Embodiment 3 of a base station according to the present application. As shown in FIG. 16, the base station in this embodiment may include a shift sequence number determining module 1601 and a cyclic shift value determining module 1602. The shift sequence number determining module 1601 is configured to select a shift sequence number v from a range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, where v is an integer, $n_{shift}^{RA}$ is a quantity of user equipment UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts.

The cyclic shift value determining module 1602 is configured to obtain the cyclic shift value $C_v$ according to the shift sequence number v by using formula (1), formula (2), or formula (3).

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Optionally, in the case of $v \leq (n_{shift}^{RA} n_{group}^{RA} + \bar{n}_{shift}^{RA} - 1)$, the cyclic shift value determining module 1602 obtains the cyclic shift value $C_v$ by using formula (1);

in the case of $(n_{shift}^{RA} n_{group}^{RA} + \bar{n}_{shift}^{RA} - 1) < v \leq (n_{shift}^{RA} n_{group}^{RA} + \bar{n}_{shift}^{RA} + \bar{\bar{n}}_{shift}^{RA} - 1)$, the cyclic shift value determining module 1602 obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \leq (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the cyclic shift value determining module 1602 obtains the cyclic shift value $C_v$ by using formula (3).

Optionally, in the case of $$\frac{N_{ZC} + N_{CS}}{4} \leq d_u < \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7}N_{ZC} \leq d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Alternatively, in the case of $$\frac{N_{ZC} + N_{CS}}{4} \leq d_u \leq \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7}N_{ZC} < d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Optionally, in the case of $$\frac{N_{ZC} + N_{CS}}{3} \leq d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} \leq d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Alternatively, in the case of $$\frac{N_{ZC} + N_{CS}}{3} \leq d_u \leq \frac{2N_{ZC}}{5},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (20) to (27), in the case of $$\frac{2N_{ZC}}{5} < d_u \leq \frac{N_{ZC} - N_{CS}}{2},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (28) to (35).

The base station in this embodiment may be configured to execute the technical solution in the method embodiment shown in FIG. 11. An implementation principle and a technical effect thereof are similar, and details are not described herein again.

Figure 17:
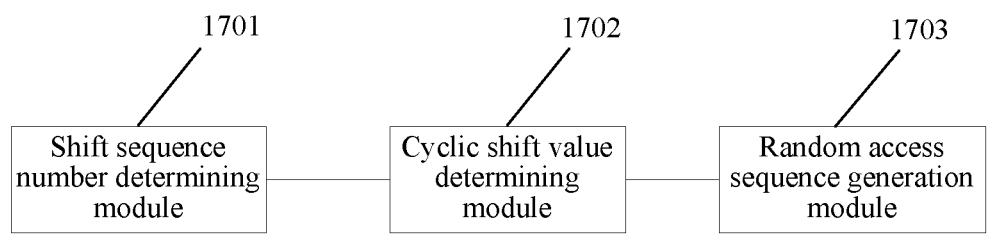
FIG. 17 is a schematic structural diagram of Embodiment 3 of user equipment according to the present application.

FIG. 17 is a schematic structural diagram of Embodiment 3 of user equipment according to the present application. As shown in FIG. 17, the base station in this embodiment may include: a shift sequence number determining module 1701, a cyclic shift value determining module 1702, and a random access sequence generation module 1703. The shift sequence number determining module 1701 is configured to select a shift sequence number v from a range of 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$, where v is an integer, $n_{shift}^{RA}$ is a quantity of UE candidate sequence shifts in a group, $n_{group}^{RA}$ is a quantity of groups, $\overline{n}_{shift}^{RA}$ is a quantity of UE candidate sequence shifts in the last length that is insufficient for a group, $\overline{\overline{n}}_{shift}^{RA}$ is a quantity of UE candidate sequence shifts in first remaining sequence shifts, and $\overline{\overline{\overline{n}}}_{shift}^{RA}$ is a quantity of UE candidate sequence shifts in second remaining sequence shifts. The cyclic shift value determining module 1702 is configured to obtain a cyclic shift value $C_v$ according to the shift sequence number v by using formula (1), formula (2), or formula (3). The random access sequence generation module 1703 is configured to generate a random access sequence $x_{u,C_v}(n)$ according to the cyclic shift value $C_v$ by using formula (36).

$n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡$_{start}$ satisfy formulas (4) to (11); or $n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (12) to (19); or $n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (20) to (27); or $n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (28) to (35).

Optionally, in the case of $v \leq (n_{shift}^{RA} n_{group}^{RA} + \overline{n}_{shift}^{RA} - 1)$, the cyclic shift value determining module 1702 obtains the cyclic shift value $C_v$ by using formula (1); in the case of $(n_{shift}^{RA} n_{group}^{RA} + \overline{n}_{shift}^{RA} - 1) < v \leq (n_{shift}^{RA} n_{group}^{RA} + \overline{n}_{shift}^{RA} + \overline{\overline{n}}_{shift}^{RA} - 1)$, the cyclic shift value determining module 1702 obtains the cyclic shift value $C_v$ by using formula (2); in the case of $(n_{shift}^{RA} n_{group}^{RA} + \overline{n}_{shift}^{RA} + \overline{\overline{n}}_{shift}^{RA} - 1) < v \leq (n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1)$, the cyclic shift value determining module 1702 obtains the cyclic shift value $C_v$ by using formula (3).

Optionally, in the case of $$\frac{N_{ZC} + N_{CS}}{4} \leq d_u < \frac{2}{7} N_{ZC},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (4) to (11), in the case of $$\frac{2}{7} N_{ZC} \leq d_u \leq \frac{N_{ZC} - N_{CS}}{3},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (12) to (19).

Alternatively, in the case of $$\frac{N_{ZC} + N_{CS}}{4} \leq d_u \leq \frac{2}{7} N_{ZC},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (4) to (11), in the case of $$\frac{2}{7} N_{ZC} < d_u \leq \frac{N_{ZC} - N_{CS}}{3},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (12) to (19).

Optionally, in the case of $$\frac{N_{ZC} + N_{CS}}{3} \leq d_u < \frac{2N_{ZC}}{5},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (20) to (27), in the case of $$\frac{2N_{ZC}}{5} \leq d_u \leq \frac{N_{ZC} - N_{CS}}{2},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (28) to (35).

Alternatively, in the case of $$\frac{N_{ZC} + N_{CS}}{3} \leq d_u \leq \frac{2N_{ZC}}{5},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (20) to (27), in the case of $$\frac{2N_{ZC}}{5} < d_u \leq \frac{N_{ZC} - N_{CS}}{2},$$

$n_{shift}^{RA}$, $d_{start}$, $n_{group}^{RA}$, $\overline{n}_{shift}^{RA}$, $\overline{\overline{n}}_{shift}^{RA}$, $\overline{\overline{\overline{n}}}$, $\overline{d}_{start}$, and ≡ satisfy formulas (28) to (35).

The user equipment in this embodiment may be configured to execute the technical solution in the method embodiment shown in FIG. 12. An implementation principle and a technical effect thereof are similar, and details are not described herein again.

The present application further provides a random access sequence generation system, including the base station in Embodiment 3 of the base station, and the user equipment in Embodiment 3 of the user equipment.

Figure 18:
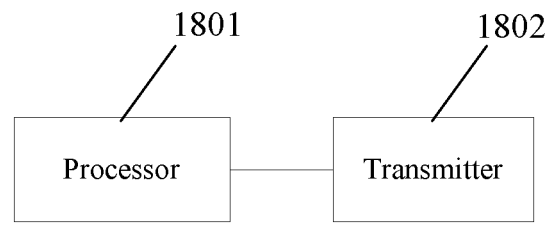
FIG. 18 is a schematic structural diagram of Embodiment 4 of a base station according to the present application.

FIG. 18 is a schematic structural diagram of Embodiment 4 of a base station according to the present application. As shown in FIG. 18, the base station in this embodiment may include: a processor 1801 and a transmitter 1802. The processor 1801 is configured to generate notification signaling, where the notification signaling includes indication information, the indication information is used to instruct user equipment UE to select a shift sequence number from a range of 0 to $(n_{shift}^{RA} n_{group}^{RA} + \overline{n}_{shift}^{RA} + \overline{\overline{n}}_{shift}^{RA} + \overline{\overline{\overline{n}}}_{shift}^{RA} -$ 1), the shift sequence number is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts. The transmitter 1802 is configured to send the notification signaling to the UE, so that the UE generates a random access sequence according to the indication information.

Optionally, the processor 1802 is further configured to:
select a shift sequence number from the range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$;
obtain a cyclic shift value according to the shift sequence number; and
generate a detection sequence according to the cyclic shift value, and detect, by using the detection sequence, a random access sequence sent by the UE, where the random access sequence is generated by the UE according to the indication information.

Optionally, the obtaining, by the processor 1802, a cyclic shift value according to the shift sequence number specifically includes:
obtaining the cyclic shift value $C_v$ according to the shift sequence number v by using formula (1), formula (2), or formula (3).

Optionally, in the case of $v \le (n_{shift}^{RA} n_{group}^{RA} + \bar{n}_{shift}^{RA} - 1)$, the processor 1802 obtains the cyclic shift value $C_v$ by using formula (1);
in the case of $(n_{shift}^{RA} n_{group}^{RA} + \bar{n}_{shift}^{RA} - 1) < v \le (n_{shift}^{RA} n_{group}^{RA} + \bar{n}_{shift}^{RA} + \bar{\bar{n}}_{shift}^{RA} - 1)$, the processor 1802 obtains the cyclic shift value $C_v$ by using formula (2);
in the case of $(n_{shift}^{RA} n_{group}^{RA} + \bar{n}_{shift}^{RA} + \bar{\bar{n}}_{shift}^{RA} - 1) < v \le (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the processor 1802 obtains the cyclic shift value $C_v$ by using formula (3).

Optionally, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (12) to (19); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (20) to (27); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (28) to (35).

Optionally, in the case of $$\frac{N_{ZC} + N_{CS}}{4} \le d_u < \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7} N_{ZC} \le d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Alternatively, in the case of $$\frac{N_{ZC} + N_{CS}}{4} \le d_u \le \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7} N_{ZC} < d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).
Optionally, in the case of $$\frac{N_{ZC} + N_{CS}}{3} \le d_u < \frac{2 N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2 N_{ZC}}{5} \le d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Alternatively, in the case of $$\frac{N_{ZC} + N_{CS}}{3} \le d_u \le \frac{2 N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2 N_{ZC}}{5} < d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

The base station in this embodiment may be configured to execute the technical solution in the method embodiment shown in FIG. 1 or FIG. 2. An implementation principle and a technical effect thereof are similar, and details are not described herein again.

Figure 19:
FIG. 19 is a schematic structural diagram of Embodiment 4 of user equipment according to the present application.

FIG. 19 is a schematic structural diagram of Embodiment 4 of user equipment according to the present application. As shown in FIG. 19, the user equipment in this embodiment may include a receiver 1901 and a processor 1902. The receiver 1901 is configured to receive notification signaling from a base station, where the notification signaling include indication information, the indication information is used to instruct the UE to select a shift sequence number from a range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the shift sequence number is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts. The processor 1902 is configured to: select a shift sequence number from the range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$ according to the notification signaling, obtain a cyclic shift value according to the shift sequence number, and generate a random access sequence according to the cyclic shift value.

Optionally, the obtaining, by the processor 1902, a cyclic shift value according to the shift sequence number specifically includes:

obtaining the cyclic shift value $C_v$ according to the shift sequence number v by using formula (1), formula (2), or formula (3).

Optionally, in the case of $v \leq (n_{shift}^{RA} n_{group}^{RA} + \bar{n}_{shift}^{RA} - 1)$, the processor 1902 obtains the cyclic shift value $C_v$ by using formula (1);

in the case of $(n_{shift}^{RA} n_{group}^{RA} + \bar{n}_{shift}^{RA} - 1) < v \leq (n_{shift}^{RA} n_{group}^{RA} + \bar{n}_{shift}^{RA} + \bar{\bar{n}}_{shift}^{RA} - 1)$, the processor 1902 obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \leq (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the processor 1902 obtains the cyclic shift value $C_v$ by using formula (3).

Optionally, $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (12) to (19); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (20) to (27); or
$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (28) to (35).

Optionally, in the case of $$\frac{N_{ZC} + N_{CS}}{4} \leq d_u < \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11), in the case of $$\frac{2}{7} N_{ZC} \leq d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Alternatively, in the case of $$\frac{N_{ZC} + N_{CS}}{4} \leq d_u \leq \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7} N_{ZC} < d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Optionally, in the case of $$\frac{N_{ZC} + N_{CS}}{3} \leq d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} \leq d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Alternatively, in the case of $$\frac{N_{ZC} + N_{CS}}{3} \leq d_u \leq \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} < d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Optionally, the generating, by the processor 1902, a random access sequence according to the cyclic shift value specifically includes:

generating the random access sequence $x_{u,C_v}(n)$ according to the cyclic shift value $C_v$ by using the following formula (36):

$$x_{u,C_v}(n) = x_u((n + C_v) \bmod N_{ZC}) \quad (36),$$ where $N_{ZC}$ is a sequence length, and a ZC sequence whose root is u is defined as:

$$x_u(n) = e^{-j \frac{\pi u n(n+1)}{N_{ZC}}},$$

$0 \leq n \leq N_{ZC} - 1$.

The UE in this embodiment may be configured to execute the technical solution in Embodiment 3 or Embodiment 4 of the random access sequence generation method. An implementation principle and a technical effect thereof are similar, and details are not described herein again.

Figure 20:
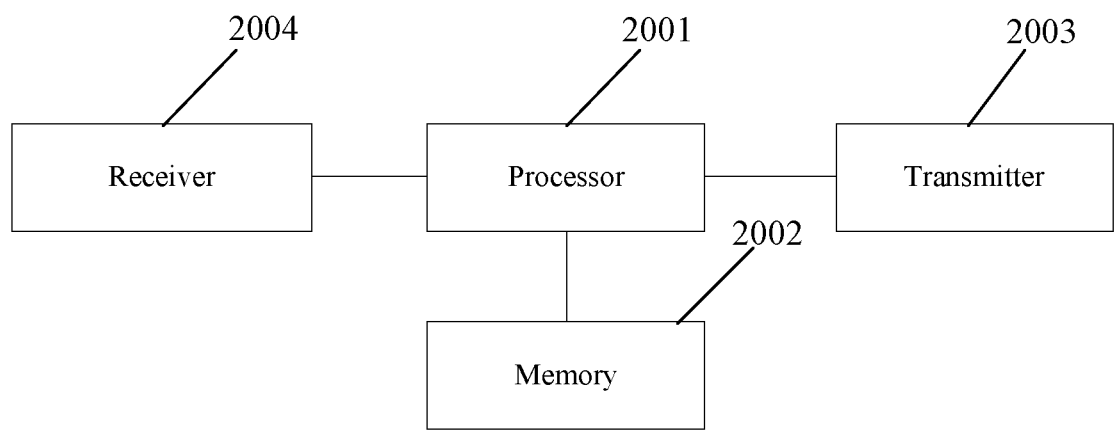
FIG. 20 is a schematic structural diagram of Embodiment 5 of a base station according to the present application.

FIG. 20 is a schematic structural diagram of Embodiment 5 of a base station according to the present application. As shown in FIG. 20, the base station in this embodiment may include a processor 2001 and a memory 2002. The apparatus may further include a transmitter 2003 and a receiver 2004. The transmitter 2003 and the receiver 2004 may be connected to the processor 2001. The transmitter 2003 is configured to send data or information. The receiver 2004 is configured to receive data or information. The memory 2002 stores an executable instruction. When the apparatus runs, the processor 2001 communicates with the memory 2002. The processor 2001 invokes the executable instruction in the memory 2002, to perform the following operations:

selecting a shift sequence number v from a range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, where v is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts; and obtaining a cyclic shift value $C_v$ according to the shift sequence number v by using formula (1), formula (2), or formula (3).

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Optionally, in the case of $v \leq (n_{shift}^{RA} n_{group}^{RA} + \bar{n}_{shift}^{RA} - 1)$, the processor 2001 obtains the cyclic shift value $C_v$ by using formula (1);

in the case of $(n_{shift}^{RA} n_{group}^{RA} + \bar{n}_{shift}^{RA} - 1) < v \leq (n_{shift}^{RA} n_{group}^{RA} + \bar{n}_{shift}^{RA} + \bar{\bar{n}}_{shift}^{RA} - 1)$, the processor 2001 obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \leq (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the processor 2001 obtains the cyclic shift value $C_v$ by using formula (3).

Optionally, in the case of $$\frac{N_{ZC} + N_{CS}}{4} \leq d_u < \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7} N_{ZC} \leq d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Alternatively, in the case of $$\frac{N_{ZC} + N_{CS}}{4} \leq d_u \leq \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (4) to (11), in the case of $$\frac{2}{7} N_{ZC} < d_u \leq \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19).

Optionally, in the case of $$\frac{N_{ZC} + N_{CS}}{3} \leq d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} \leq d_u \leq \frac{N_{ZC} - N_{CS}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Alternatively, in the case of $$\frac{N_{ZC} + N_{CS}}{3} \leq d_u \leq \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27), in the case of $$\frac{2N_{ZC}}{5} < d_u \leq \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

The base station in this embodiment may be configured to execute the technical solution in the method embodiment shown in FIG. 11. An implementation principle and a technical effect thereof are similar, and details are not described herein again.

In a schematic structural diagram of Embodiment 5 of user equipment, the user equipment in this embodiment has a same structure as that of the base station shown in FIG. 20, and may also include a processor and a memory. The apparatus may further include a transmitter and a receiver.

The transmitter and the receiver may be connected to the processor. The transmitter is configured to send data or information. The receiver is configured to receive data or information. The memory stores an executable instruction. When the apparatus runs, the processor communicates with the memory. The processor invokes the executable instruction in the memory, to perform the following operations:

selecting a shift sequence number v from a range of 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, where v is an integer, $n_{shift}^{RA}$ is a quantity of UE candidate sequence shifts in a group, $n_{group}^{RA}$ is a quantity of groups, $\bar{n}_{shift}^{RA}$ is a quantity of UE candidate sequence shifts in the last length that is insufficient for a group, $\bar{\bar{n}}_{shift}^{RA}$ is a quantity of UE candidate sequence shifts in first remaining sequence shifts, and $\bar{\bar{\bar{n}}}_{shift}^{RA}$ is a quantity of UE candidate sequence shifts in second remaining sequence shifts;

obtaining a cyclic shift value $C_v$ according to the shift sequence number v by using formula (1), formula (2), or formula (3); and generating a random access sequence $x_{u,C_v}(n)$ according to the cyclic shift value $C_v$ by using formula (36).

$n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv_{start}$ satisfy formulas (4) to (11); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (12) to (19); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (20) to (27); or $n_{shift}^{RA}$, $d_{start}$, $n_{group}^{RA}$, $\bar{n}_{shift}^{RA}$, $\bar{\bar{n}}_{shift}^{RA}$, $\bar{\bar{\bar{n}}}$, $\bar{d}_{start}$, and $\equiv$ satisfy formulas (28) to (35).

Optionally, in the case of $v \leq (n_{shift}^{RA} n_{group}^{RA} + \bar{n}_{shift}^{RA} - 1)$, the processor obtains the cyclic shift value $C_v$ by using formula (1);

in the case of $(n_{shift}^{RA} n_{group}^{RA} + \bar{n}_{shift}^{RA} - 1) < v \leq (n_{shift}^{RA} n_{group}^{RA} + \bar{n}_{shift}^{RA} + \bar{\bar{n}}_{shift}^{RA} - 1)$, the processor obtains the cyclic shift value $C_v$ by using formula (2);

in the case of $(n_{shift}^{RA} n_{group}^{RA} + \bar{n}_{shift}^{RA} + \bar{\bar{n}}_{shift}^{RA} - 1) < v \leq (n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, the processor obtains the cyclic shift value $C_v$ by using formula (3).

Optionally, in the case of $$\frac{N_{ZC} + N_{CS}}{4} \leq d_u < \frac{2}{7} N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{d}_{start}$, and $\equiv$ satisfy formulas (4) to (11), in the case of $$\frac{2}{7}N_{ZC} \le d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{d}_{start}$, and $\equiv$ satisfy formulas (12) to (19).

Alternatively, in the case of $$\frac{N_{ZC} + N_{CS}}{4} \le d_u \le \frac{2}{7}N_{ZC},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{d}_{start}$, and $\equiv$ satisfy formulas (4) to (11), in the case of $$\frac{2}{7}N_{ZC} < d_u \le \frac{N_{ZC} - N_{CS}}{3},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{d}_{start}$, and $\equiv$ satisfy formulas (12) to (19).

Optionally, in the case of $$\frac{N_{ZC} + N_{CS}}{3} \le d_u < \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{d}_{start}$, and $\equiv$ satisfy formulas (20) to (27), in the case of $$\frac{2N_{ZC}}{5} \le d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{d}_{start}$, and $\equiv$ satisfy formulas (28) to (35).

Alternatively, in the case of $$\frac{N_{ZC} + N_{CS}}{3} \le d_u \le \frac{2N_{ZC}}{5},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{d}_{start}$, and $\equiv$ satisfy formulas (20) to (27), in the case of $$\frac{2N_{ZC}}{5} < d_u \le \frac{N_{ZC} - N_{CS}}{2},$$

$n_{shift}^{RA}$, $d_{start}$, $n_{group}^{RA}$, $\bar{n}_{shift}^{RA}$, $\bar{\bar{n}}_{shift}^{RA}$, $\bar{\bar{n}}$, $\bar{d}_{start}$, and $\equiv$ satisfy formulas (28) to (35).

The user equipment in this embodiment may be configured to execute the technical solution in the method embodiment shown in FIG. 12. An implementation principle and a technical effect thereof are similar, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A method for generating a random access sequence in a communication system, comprising:

obtaining, by a communication apparatus, a cyclic shift value $C_v$ according to a shift sequence number $v$, wherein $$C_v = d_{start} \lfloor v/n_{shift}^{RA} \rfloor + (v \bmod n_{shift}^{RA}) N_{CS} \qquad (1),$$

wherein $v$ is an integer, $N_{CS}$ is a quantity of cyclic shifts, wherein for $$\frac{N_{ZC} + N_{CS}}{4} \le d_u < \frac{2}{7}N_{ZC},$$

$n_{shift}^{RA}$ and $d_{start}$ satisfy formulas (4) and (5), respectively, or for $$\frac{2}{7}N_{ZC} \le d_u \le \frac{N_{ZC} - N_{CS}}{3},$$

$n_{shift}^{RA}$ and $d_{start}$ satisfy formulas (12) and (13), respectively, or for $$\frac{N_{ZC} + N_{CS}}{3} \le d_u < \frac{2N_{ZC}}{5},$$

$n_{shift}^{RA}$ and $d_{start}$ satisfy formulas (20) and (21), respectively, or for $$\frac{2N_{ZC}}{5} \le d_u \le \frac{N_{ZC} - N_{CS}}{2},$$

$n_{shift}^{RA}$ and $d_{start}$ satisfy formulas (28) and (29), respectively, wherein $$n_{shift}^{RA} = \left\lfloor \frac{4d_c - N_{ZC}}{N_{CS}} \right\rfloor \qquad (4)$$

$$d_{start} = 4d_u - N_{ZC} + n_{shift}^{RA} \cdot N_{CS}, \qquad (5)$$

$$n_{shift}^{RA} = \left\lfloor \frac{N_{ZC} - 3d_u}{N_{CS}} \right\rfloor, \qquad (12)$$

$$d_{start} = N_{ZC} - 3d_u + n_{shift}^{RA} \cdot N_{CS}, \qquad (13)$$

$$n_{shift}^{RA} = \left\lfloor \frac{3d_u - N_{ZC}}{N_{CS}} \right\rfloor, \qquad (20)$$

-continued $$d_{start} = 3d_u - N_{ZC} + n_{shift}^{RA} \cdot N_{CS}, \quad (21)$$

$$n_{shift}^{RA} = \left\lfloor \frac{N_{ZC} - 2d_u}{N_{CS}} \right\rfloor, \quad (28)$$

$$d_{start} = 2(N_{ZC} - 2d_u) + n_{shift}^{RA} \cdot N_{CS}, \quad (29)$$

and wherein
$N_{ZC}$ is a length of the random access sequence, a root of the random access sequence is u, $$d_u = \begin{cases} p & 0 \le p < N_{ZC}/2 \\ N_{ZC} - p & \text{another value} \end{cases},$$

and p is a minimum non-negative integer that satisfies (pu)mod $N_{ZC}$=1; and generating, by the communication apparatus, the random access sequence according to the cyclic shift value $C_v$.

2. The method according to claim 1, wherein the generating the random access sequence according to the cyclic shift value $C_v$, comprises:

generating, by the communication apparatus, the random access sequence $x_{u,C_v}(n)$ according to the cyclic shift value $C_v$ meeting formula (36):

$$x_{u,C_v}(n) = x_u((n+C_v) \bmod N_{ZC}) \quad (36),$$

wherein the root of the random access sequence u satisfies $$x_u(n) = e^{-j\frac{\pi u n(n+1)}{N_{ZC}}},$$

$0 \le n \le N_{ZC}-1$.

3. The method according to claim 1, wherein a range of the shift sequence number v is from 0 to ($n_{shift}^{RA} n_{group}^{RA} + \overline{n}_{shift}^{RA} + \overline{\overline{n}}_{shift}^{RA} + \overline{\overline{\overline{n}}}_{shift}^{RA} - 1$), wherein for $n_{shift}^{RA}$ and $d_{start}$ satisfy formulas (4) and (5), $n_{group}^{RA}$, $\overline{n}_{shift}^{RA}$, $\overline{\overline{n}}_{shift}^{RA}$, and $\overline{\overline{\overline{n}}}_{shift}^{RA}$ satisfy formulas (6) to (8) and (10), or for $n_{shift}^{RA}$ and $d_{start}$ satisfy formulas (12) and (13), $n_{group}^{RA}$, $\overline{n}_{shift}^{RA}$, $\overline{\overline{n}}_{shift}^{RA}$, and $\overline{\overline{\overline{n}}}_{shift}^{RA}$ satisfy formulas (14) to (16) and (18), or for $n_{shift}^{RA}$ and $d_{start}$ satisfy formulas (20) and (21), $n_{group}^{RA}$, $\overline{n}_{shift}^{RA}$, $\overline{\overline{n}}_{shift}^{RA}$, and $\overline{\overline{\overline{n}}}_{shift}^{RA}$ satisfy formulas (22) to (24) and (26), or for $n_{shift}^{RA}$ and $d_{start}$ satisfy formulas (28) and (29), $n_{group}^{RA}$, $\overline{n}_{shift}^{RA}$, $\overline{\overline{n}}_{shift}^{RA}$, and $\overline{\overline{\overline{n}}}_{shift}^{RA}$ satisfy formulas (30) to (32) and (34), wherein $$n_{group}^{RA} = \left\lfloor \frac{d_u}{d_{start}} \right\rfloor, \quad (6)$$

$$\overline{n}_{shift}^{RA} = \max\left( \left\lfloor \frac{N_{ZC} - 3d_u - n_{group}^{RA} \cdot d_{start}}{N_{CS}} \right\rfloor, 0 \right), \quad (7)$$

$$\overline{\overline{n}}_{shift}^{RA} = \lfloor \min(d_u - n_{group}^{RA} \cdot d_{start}, 4d_u - N_{ZC} - \overline{n}_{shift}^{RA} N_{CS})/N_{CS} \rfloor, \quad (8)$$

$$\overline{\overline{\overline{n}}}_{shift}^{RA} = \lfloor ((1 - \min(1, \overline{n}_{shift}^{RA}))(d_u - n_{group}^{RA} \cdot d) + \min(1, \overline{n}_{shift}^{RA})(4d_u - N_{ZC} - \overline{n}_{shift}^{RA} N_{CS}) \rfloor - \overline{\overline{n}}_{shift}^{RA}, \quad (10)$$

-continued $$n_{shift}^{RA} = \left\lfloor \frac{d_u}{d_{start}} \right\rfloor, \quad (14)$$

$$\overline{n}_{shift}^{RA} = \max\left( \left\lfloor \frac{4d_u - N_{ZC} - n_{group}^{RA} \cdot d_{start}}{N_{CS}} \right\rfloor, 0 \right), \quad (15)$$

$$\overline{\overline{n}}_{shift}^{RA} = \lfloor \min(d_u - n_{group}^{RA} \cdot d_{start}, N_{ZC} - 3d_u - \overline{n}_{shift}^{RA} N_{CS})/N_{CS} \rfloor, \quad (16)$$

$$\overline{\overline{\overline{n}}}_{shift}^{RA} = 0, \quad (18)$$

$$n_{group}^{RA} = \left\lfloor \frac{d_u}{d_{start}} \right\rfloor, \quad (22)$$

$$\overline{n}_{shift}^{RA} = \max\left( \left\lfloor \frac{N_{ZC} - 2d_u - n_{group}^{RA} \cdot d_{start}}{N_{CS}} \right\rfloor, 0 \right), \quad (23)$$

$$\overline{\overline{n}}_{shift}^{RA} = 0, \quad (24)$$

$$\overline{\overline{\overline{n}}}_{shift}^{RA} = 0, \quad (26)$$

$$n_{group}^{RA} = \left\lfloor \frac{N_{ZC} - d_u}{d_{start}} \right\rfloor, \quad (30)$$

$$\overline{n}_{shift}^{RA} = \max\left( \left\lfloor \frac{3d_u - N_{ZC} - n_{group}^{RA} \cdot d_{start}}{N_{CS}} \right\rfloor, 0 \right), \quad (31)$$

$$\overline{\overline{n}}_{shift}^{RA} = 0, \quad (32)$$

$$\overline{\overline{\overline{n}}}_{shift}^{RA} = 0. \quad (34)$$

4. The method according to claim 3, further comprising:
before the obtaining, by the communication apparatus, the cyclic shift value $C_v$,
receiving, by the communication apparatus, indication information which indicates the range of the shift sequence number v.

5. The method according to claim 3, wherein v ≤ ($n_{shift}^{RA} n_{group}^{RA} + \overline{n}_{shift}^{RA} - 1$).

6. The method according to claim 1, further comprising:
after the generating, by the communication apparatus, the random access sequence,
transmitting, by the communication apparatus, the random access sequence.

7. The method according to claim 1, wherein $d_u$ is a cyclic shift corresponding to the random access sequence when a Doppler frequency shift is a physical random access channel (PRACH) subcarrier spacing.

8. An apparatus, comprising:
a memory; and
a processor coupled to the memory, and configured to execute the instructions stored in the memory to:
obtain a cyclic shift value $C_v$ according to a shift sequence number v, wherein $$C_v = d_{start} \lfloor v/n_{shift}^{RA} \rfloor + (v \bmod n_{shift}^{RA}) N_{CS} \quad (1),$$

wherein v is an integer, $N_{CS}$ is a quantity of cyclic shifts, wherein for $$\frac{N_{ZC} + N_{CS}}{4} \le d_u < \frac{2}{7} N_{ZC},$$

$n_{shift}^{RA}$ and $d_{start}$ satisfy formulas (4) and (5), respectively, or for $$\frac{2}{7}N_{ZC} \le d_u \le \frac{N_{ZC} - N_{CS}}{3},$$

$n_{shift}^{RA}$ and $d_{start}$ satisfy formulas (12) and (13), respectively, or for $$\frac{N_{ZC} + N_{CS}}{3} \le d_u < \frac{2N_{ZC}}{5},$$

$n_{shift}^{RA}$ and $d_{start}$ satisfy formulas (20) and (21), respectively, or for $$\frac{2N_{ZC}}{5} \le d_u \le \frac{N_{ZC} - N_{CS}}{2},$$

$n_{shift}^{RA}$ and $d_{start}$ satisfy formulas (28) and (29), respectively, wherein $$n_{shift}^{RA} = \left\lfloor \frac{4d_u - N_{ZC}}{N_{CS}} \right\rfloor, \tag{4}$$

$$d_{start} = 4d_u - N_{ZC} + n_{shift}^{RA} \cdot N_{CS}, \tag{5}$$

$$n_{shift}^{RA} = \left\lfloor \frac{N_{ZC} - 3d_u}{N_{CS}} \right\rfloor, \tag{12}$$

$$d_{start} = N_{ZC} - 3d_u + n_{shift}^{RA} \cdot N_{CS}, \tag{13}$$

$$n_{shift}^{RA} = \left\lfloor \frac{3d_u - N_{ZC}}{N_{CS}} \right\rfloor, \tag{20}$$

$$d_{start} = 3d_u - N_{ZC} + n_{shift}^{RA} \cdot N_{CS}, \tag{21}$$

$$n_{shift}^{RA} = \left\lfloor \frac{N_{ZC} - 3d_u}{N_{CS}} \right\rfloor, \tag{28}$$

$$d_{start} = 2(N_{ZC} - 2d_n) + n_{shift}^{RA} \cdot N_{CS}, \tag{29}$$

and wherein $N_{ZC}$ is a length of a random access sequence, a root of the random access sequence is u, $$d_u = \begin{cases} p & 0 \le p < N_{ZC}/2 \\ N_{ZC} - p & \text{another value} \end{cases},$$

and p is a minimum non-negative integer that satisfies $(pu) \bmod N_{ZC}=1$; and generate the random access sequence according to the cyclic shift value $C_v$.

9. The apparatus according to claim 8, wherein the processor is further configured to execute the instructions to cause the apparatus to:

generate the random access sequence $x_{u,C_v}(n)$ according to the cyclic shift value $C_v$ meeting formula (36):

$$x_{u,C_v}(n) = x_u((n+C_v) \bmod N_{ZC}) \tag{36},$$

wherein the root of the random access sequence u satisfies $$x_u(n) = e^{-j\frac{\pi u n(n+1)}{N_{ZC}}},$$

$0 \le n \le N_{ZC}-1$.

10. The apparatus according to claim 8, wherein a range of the shift sequence number v is from 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, wherein for $n_{shift}^{RA}$ and $d_{start}$ satisfy formulas (4) and (5), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (6) to (8) and (10), or for $n_{shift}^{RA}$ and $d_{start}$ satisfy formulas (12) and (13), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (14) to (16) and (18), or for $n_{shift}^{RA}$ and $d_{start}$ satisfy formulas (20) and (21), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (22) to (24) and (26), or for $n_{shift}^{RA}$ and $d_{start}$ satisfy formulas (28) and (29), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (30) to (32) and (34), wherein $$n_{group}^{RA} = \left\lfloor \frac{d_u}{d_{start}} \right\rfloor, \tag{6}$$

$$\bar{n}_{shift}^{RA} = \max\left(\left\lfloor \frac{N_{ZC} - 3d_u - n_{group}^{RA} \cdot d_{start}}{N_{CS}} \right\rfloor, 0\right), \tag{7}$$

$$\bar{\bar{n}}_{shift}^{RA} = \lfloor \min(d_u - n_{group}^{RA} \cdot d_{start}, 4d_u - N_{ZC} - \bar{n}_{shift}^{RA} N_{CS})/N_{CS} \rfloor, \tag{8}$$

$$\bar{\bar{\bar{n}}}_{shift}^{RA} = \lfloor ((1 - \min(1, \bar{n}_{shift}^{RA}))(d_u - n_{group}^{RA} \cdot d_{start}) + \min(1, \bar{n}_{shift}^{RA})(4d_u - N_{ZC} - \bar{n}_{shift}^{RA} N_{CS}))/N_{CS} \rfloor - \bar{\bar{n}}_{shift}^{RA}, \tag{10}$$

$$n_{group}^{RA} = \left\lfloor \frac{d_u}{d_{start}} \right\rfloor, \tag{14}$$

$$\bar{n}_{shift}^{RA} = \max\left(\left\lfloor \frac{4d_u - N_{ZC} - n_{group}^{RA} \cdot d_{start}}{N_{CS}} \right\rfloor, 0\right), \tag{15}$$

$$\bar{\bar{n}}_{shift}^{RA} = \lfloor \min(d_u - n_{group}^{RA} \cdot d_{start}, N_{ZC} - 3d_u - \bar{n}_{shift}^{RA} N_{CS})/N_{CS} \rfloor, \tag{16}$$

$$\bar{\bar{\bar{n}}}_{shift}^{RA} = 0, \tag{18}$$

$$n_{group}^{RA} = \left\lfloor \frac{d_u}{d_{start}} \right\rfloor, \tag{22}$$

$$\bar{n}_{shift}^{RA} = \max\left(\left\lfloor \frac{N_{ZC} - 2d_u - n_{group}^{RA} \cdot d_{start}}{N_{CS}} \right\rfloor, 0\right), \tag{23}$$

$$\bar{\bar{n}}_{shift}^{RA} = 0, \tag{24}$$

$$\bar{\bar{\bar{n}}}_{shift}^{RA} = 0, \tag{26}$$

$$n_{group}^{RA} = \left\lfloor \frac{N_{ZC} - d_u}{d_{start}} \right\rfloor, \tag{30}$$

$$\bar{n}_{shift}^{RA} = \max\left(\left\lfloor \frac{3d_u - N_{ZC} - n_{group}^{RA} \cdot d_{start}}{N_{CS}} \right\rfloor, 0\right), \tag{31}$$

$$\bar{\bar{n}}_{shift}^{RA} = 0, \tag{32}$$

$$\bar{\bar{\bar{n}}}_{shift}^{RA} = 0. \tag{34}$$

11. The apparatus according to claim 10, wherein $v \le (n_{shift}^{RA} n_{group}^{RA} + \bar{n}_{shift}^{RA} - 1)$.

12. The apparatus according to claim 8, wherein $d_u$ is a cyclic shift corresponding to the random access sequence when a Doppler frequency shift is a physical random access channel (PRACH) subcarrier spacing.

13. A non-transitory computer-readable medium storing computer instructions which, when executed by one or more processors, cause the one or more processors to perform the steps of:

obtaining a cyclic shift value $C_v$ according to a shift sequence number $v$, wherein $$C_v = d_{start} \lfloor v/n_{shift}^{RA} \rfloor + (v \bmod n_{shift}^{RA}) N_{CS} \qquad (1),$$

wherein $v$ is an integer, $N_{CS}$ is a quantity of cyclic shifts, wherein for $$\frac{N_{ZC} + N_{CS}}{4} \le d_u < \frac{2}{7} N_{ZC},$$

$n_{shift}^{RA}$ and $d_{start}$ satisfy formulas (4) and (5), respectively, or for $$\frac{2}{7} N_{ZC} \le d_u \le \frac{N_{ZC} - N_{CS}}{3},$$

$n_{shift}^{RA}$ and $d_{start}$ satisfy formulas (12) and (13), respectively, or for $$\frac{N_{ZC} + N_{CS}}{3} \le d_u < \frac{2N_{ZC}}{5},$$

$n_{shift}^{RA}$ and $d_{start}$ satisfy formulas (20) and (21), respectively, or for $$\frac{2N_{ZC}}{5} \le d_u \le \frac{N_{ZC} - N_{CS}}{2},$$

$n_{shift}^{RA}$ and $d_{start}$ satisfy formulas (28) and (29), respectively, wherein $$n_{shift}^{RA} = \left\lfloor \frac{4d_u - N_{ZC}}{N_{CS}} \right\rfloor, \qquad (4)$$

$$d_{start} = 4d_u - N_{ZC} + n_{shift}^{RA} \cdot N_{CS}, \qquad (5)$$

$$n_{shift}^{RA} = \left\lfloor \frac{N_{ZC} - 3d_u}{N_{CS}} \right\rfloor, \qquad (12)$$

$$d_{start} = N_{ZC} - 3d_u + n_{shift}^{RA} \cdot N_{CS}, \qquad (13)$$

$$n_{shift}^{RA} = \left\lfloor \frac{3d_u - N_{ZC}}{N_{CS}} \right\rfloor, \qquad (20)$$

$$d_{start} = 3d_u - N_{ZC} + n_{shift}^{RA} \cdot N_{CS}, \qquad (21)$$

$$n_{shift}^{RA} = \left\lfloor \frac{N_{ZC} - 3d_u}{N_{CS}} \right\rfloor, \qquad (28)$$

$$d_{start} = 2(N_{ZC} - 2d_n) + n_{shift}^{RA} \cdot N_{CS}, \qquad (29)$$

and wherein
$N_{ZC}$ is a length of a random access sequence, a root of the random access sequence is u, $$d_u = \begin{cases} p & 0 \le p < N_{ZC}/2 \\ N_{ZC} - p & \text{another value} \end{cases},$$

and p is a minimum non-negative integer that satisfies $(pu) \bmod N_{ZC} = 1$; and generating the random access sequence according to the cyclic shift value $C_v$.

14. The non-transitory computer-readable medium according to claim 13, wherein the generating the random access sequence according to the cyclic shift value $C_v$, comprises:

generating the random access sequence $x_{u,C_v}(n)$ according to the cyclic shift value $C_v$ meeting formula (36):

$$x_{u,C_v}(n) = x_u((n+C_v) \bmod N_{ZC}) \qquad (36),$$

wherein the root of the random access sequence u satisfies $$x_u(n) = e^{-j\frac{\pi u n(n+1)}{N_{ZC}}},$$

$0 \le n \le N_{ZC} - 1$.

15. The non-transitory computer-readable medium according to claim 13, wherein a range of the shift sequence number $v$ is from 0 to $v \le (n_{shift}^{RA} n_{group}^{RA} + \bar{n}_{shift}^{RA} - 1)$.

16. The apparatus according to claim 8, wherein the processor is further configured to execute the instructions to:
receive indication information which indicates a range of the shift sequence number $v$.

17. The apparatus according to claim 8, wherein the processor is further configured to execute the instructions to:
transmit the random access sequence.

18. A method for detecting a random access sequence in a communication system, comprising:

obtaining, by a communication apparatus, a cyclic shift value $C_v$ according to a shift sequence number $v$, wherein $$C_v = d_{start} \lfloor v/n_{shift}^{RA} \rfloor + (v \bmod n_{shift}^{RA}) N_{CS} \qquad (1),$$

wherein $v$ is an integer, $N_{CS}$ is a quantity of cyclic shifts, wherein for $$\frac{N_{ZC} + N_{CS}}{4} \le d_u < \frac{2}{7} N_{ZC},$$

$n_{shift}^{RA}$ and $d_{start}$ satisfy formulas (4) and (5), respectively, or for $$\frac{2}{7} N_{ZC} \le d_u \le \frac{N_{ZC} - N_{CS}}{3},$$

$n_{shift}^{RA}$ and $d_{start}$ satisfy formulas (12) and (13), respectively, or for $$\frac{N_{ZC} + N_{CS}}{3} \le d_u < \frac{2N_{ZC}}{5},$$

$n_{shift}^{RA}$ and $d_{start}$ satisfy formulas (20) and (21), respectively, or for $$\frac{2N_{ZC}}{5} \leq d_u \leq \frac{N_{ZC}-N_{CS}}{2},$$

$n_{shift}^{RA}$ and $d_{start}$ satisfy formulas (28) and (29), respectively, wherein $$n_{shift}^{RA} = \left\lfloor \frac{4d_u - N_{ZC}}{N_{CS}} \right\rfloor, \quad (4)$$

$$d_{start} = 4d_u - N_{ZC} + n_{shift}^{RA} \cdot N_{CS}, \quad (5)$$

$$n_{shift}^{RA} = \left\lfloor \frac{N_{ZC} - 3d_u}{N_{CS}} \right\rfloor, \quad (12)$$

$$d_{start} = N_{ZC} - 3d_u + n_{shift}^{RA} \cdot N_{CS}, \quad (13)$$

$$n_{shift}^{RA} = \left\lfloor \frac{3d_u - N_{ZC}}{N_{CS}} \right\rfloor, \quad (20)$$

$$d_{start} = 3d_u - N_{ZC} + n_{shift}^{RA} \cdot N_{CS}, \quad (21)$$

$$n_{shift}^{RA} = \left\lfloor \frac{N_{ZC} - 2d_u}{N_{CS}} \right\rfloor, \quad (28)$$

$$d_{start} = 2(N_{ZC} - 2d_u) + n_{shift}^{RA} \cdot N_{CS}, \quad (29)$$

and wherein
$N_{ZC}$ is a length of a random access sequence, a root of the random access sequence is u, $$d_u = \begin{cases} p & 0 \leq p < N_{ZC}/2 \\ N_{ZC} - p & \text{another value} \end{cases},$$

and p is a minimum non-negative integer that satisfies (pu)mod $N_{ZC}=1$; and detecting, by the communication apparatus, the random access sequence according to the cyclic shift value $C_v$.

19. The method according to claim 18, wherein a range of the shift sequence number v is from 0 to ($n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1$), wherein for $n_{shift}^{RA}$ and $d_{start}$ satisfy formulas (4) and (5), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (6) to (8) and (10), or for $n_{shift}^{RA}$ and $d_{start}$ satisfy formulas (12) and (13), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (14) to (16) and (18), or for $n_{shift}^{RA}$ and $d_{start}$ satisfy formulas (20) and (21), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (22) to (24) and (26), or for $n_{shift}^{RA}$ and $d_{start}$ satisfy formulas (28) and (29), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (30) to (32) and (34), wherein $$n_{group}^{RA} = \left\lfloor \frac{d_u}{d_{start}} \right\rfloor, \quad (6)$$

$$n_{shift}^{RA} = \max\left(\left\lfloor \frac{N_{ZC} - 3d_u - n_{group}^{RA} \cdot d_{start}}{N_{CS}} \right\rfloor, 0\right), \quad (7)$$

$$\bar{n}_{shift}^{RA} = \lfloor \min(d_u - n_{group}^{RA} \cdot d_{start},\ 4d_u - N_{ZC} - n_{shift}^{RA} N_{CS})/N_{CS} \rfloor, \quad (8)$$

-continued $$\bar{\bar{n}}_{shift}^{RA} = \lfloor ((1 - \min(1, n_{shift}^{RA}))(d_u - n_{group}^{RA} \cdot d_{start}) + \min(1, n_{shift}^{RA})(4d_u - N_{ZC} - n_{shift}^{RA} N_{CS}))/N_{CS} \rfloor - \bar{n}_{shift}^{RA}, \quad (10)$$

$$n_{group}^{RA} = \left\lfloor \frac{d_u}{d_{start}} \right\rfloor, \quad (14)$$

$$n_{shift}^{RA} = \max\left(\left\lfloor \frac{4d_u - N_{ZC} - n_{group}^{RA} \cdot d_{start}}{N_{CS}} \right\rfloor, 0\right), \quad (15)$$

$$\bar{n}_{shift}^{RA} = \lfloor \min(d_u - n_{group}^{RA} \cdot d_{start},\ N_{ZC} - 3d_u - n_{shift}^{RA} N_{CS})/N_{CS} \rfloor, \quad (16)$$

$$\bar{\bar{n}}_{shift}^{RA} = 0, \quad (18)$$

$$n_{group}^{RA} = \left\lfloor \frac{d_u}{d_{start}} \right\rfloor, \quad (22)$$

$$n_{shift}^{RA} = \max\left(\left\lfloor \frac{N_{ZC} - 2d_u - n_{group}^{RA} \cdot d_{start}}{N_{CS}} \right\rfloor, 0\right), \quad (23)$$

$$n_{shift}^{RA} = 0, \quad (24)$$

$$\bar{\bar{n}}_{shift}^{RA} = 0, \quad (26)$$

$$n_{group}^{RA} = \left\lfloor \frac{N_{ZC} - d_u}{d_{start}} \right\rfloor, \quad (30)$$

$$n_{shift}^{RA} = \max\left(\left\lfloor \frac{3d_u - N_{ZC} - n_{group}^{RA} \cdot d_{start}}{N_{CS}} \right\rfloor, 0\right), \quad (31)$$

$$\bar{n}_{shift}^{RA} = 0, \quad (32)$$

$$\bar{\bar{n}}_{shift}^{RA} = 0. \quad (34)$$

20. The method according to claim 18, wherein v ≤ ($n_{shift}^{RA} n_{group}^{RA} + \bar{n}_{shift}^{RA} - 1$).

21. The method according to claim 18, further comprising:

transmitting, by the communication apparatus, indication information which indicates the range of the shift sequence number v.

22. An apparatus, comprising:

a memory; and a processor coupled to the memory, and configured to execute the instructions stored in the memory to:

obtain a cyclic shift value $C_v$ according to a shift sequence number v, wherein $$C_v = d_{start} \lfloor v/n_{shift}^{RA} \rfloor + (v \bmod n_{shift}^{RA}) N_{CS} \quad (1),$$

wherein v is an integer, $N_{CS}$ is a quantity of cyclic shifts, wherein for $$\frac{N_{ZC} + N_{CS}}{4} \leq d_u < \frac{2}{7} N_{ZC},$$

$n_{shift}^{RA}$ and $d_{start}$ satisfy formulas (4) and (5), respectively, or for $$\frac{2}{7} N_{ZC} \leq d_u \leq \frac{N_{ZC} - N_{CS}}{3},$$

$n_{shift}^{RA}$ and $d_{start}$ satisfy formulas (12) and (13), respectively, or for $$\frac{N_{ZC} + N_{CS}}{3} \le d_u < \frac{2N_{ZC}}{5},$$

$n_{shift}^{RA}$ and $d_{start}$ satisfy formulas (20) and (21), respectively, or for $$\frac{2N_{ZC}}{5} \le d_u \le \frac{N_{ZC} - N_{CS}}{2},$$

$n_{shift}^{RA}$ and $d_{start}$ satisfy formulas (28) and (29), respectively, wherein $$n_{shift}^{RA} = \left\lfloor \frac{4d_u - N_{ZC}}{N_{CS}} \right\rfloor, \tag{4}$$

$$d_{start} = 4d_u - N_{ZC} + n_{shift}^{RA} \cdot N_{CS}, \tag{5}$$

$$n_{shift}^{RA} = \left\lfloor \frac{N_{ZC} - 3d_u}{N_{CS}} \right\rfloor, \tag{12}$$

$$d_{start} = N_{ZC} - 3d_u + n_{shift}^{RA} \cdot N_{CS}, \tag{13}$$

$$n_{shift}^{RA} = \left\lfloor \frac{3d_u - N_{ZC}}{N_{CS}} \right\rfloor, \tag{20}$$

$$d_{start} = 3d_u - N_{ZC} + n_{shift}^{RA} \cdot N_{CS}, \tag{21}$$

$$n_{shift}^{RA} = \left\lfloor \frac{N_{ZC} - 2d_u}{N_{CS}} \right\rfloor, \tag{28}$$

$$d_{start} = 2(N_{ZC} - 2d_u) + n_{shift}^{RA} \cdot N_{CS}, \tag{29}$$

and wherein
$N_{ZC}$ is a length of a random access sequence, a root of the random access sequence is u, $$d_u = \begin{cases} p & 0 \le p < N_{ZC}/2 \\ N_{ZC} - p & \text{another value} \end{cases},$$

and p is a minimum non-negative integer that satisfies (pu)mod $N_{ZC}$=1; and
detect the random access sequence according to the cyclic shift value $C_v$.

23. The apparatus according to claim 22, wherein a range of the shift sequence number v is from 0 to $(n_{shift}^{RA} n_{group}^{RA} + \bar{n}_{shift}^{RA} + \bar{\bar{n}}_{shift}^{RA} + \bar{\bar{\bar{n}}}_{shift}^{RA} - 1)$, wherein
for $n_{shift}^{RA}$ and $d_{start}$ satisfy formulas (4) and (5), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (6) to (8) and (10), or
for $n_{shift}^{RA}$ and $d_{start}$ satisfy formulas (12) and (13), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (14) to (16) and (18), or for $n_{shift}^{RA}$ and $d_{start}$ satisfy formulas (20) and (21), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (22) to (24) and (26), or
for $n_{shift}^{RA}$ and $d_{start}$ satisfy formulas (28) and (29), $n_{group}^{RA}$, $\bar{n}_{shift}^{RA}$, $\bar{\bar{n}}_{shift}^{RA}$, and $\bar{\bar{\bar{n}}}_{shift}^{RA}$ satisfy formulas (30) to (32) and (34),
wherein $$n_{group}^{RA} = \left\lfloor \frac{d_u}{d_{start}} \right\rfloor, \tag{6}$$

$$n_{shift}^{RA} = \max\left(\left\lfloor \frac{N_{ZC} - 3d_u - n_{group}^{RA} \cdot d_{start}}{N_{CS}} \right\rfloor, 0\right), \tag{7}$$

$$\bar{n}_{shift}^{RA} = \lfloor \min(d_u - n_{group}^{RA} \cdot d_{start}, \ 4d_u - N_{ZC} - n_{shift}^{RA} N_{CS})/N_{CS} \rfloor, \tag{8}$$

$$\bar{\bar{n}}_{shift}^{RA} = \lfloor ((1 - \min(1, n_{shift}^{RA}))(d_u - n_{group}^{RA} \cdot d_{start}) + \min(1, n_{shift}^{RA})(4d_u - N_{ZC} - n_{shift}^{RA} N_{CS}))/N_{CS} \rfloor - \bar{n}_{shift}^{RA}, \tag{10}$$

$$n_{group}^{RA} = \left\lfloor \frac{d_u}{d_{start}} \right\rfloor, \tag{14}$$

$$n_{shift}^{RA} = \max\left(\left\lfloor \frac{4d_u - N_{ZC} - n_{group}^{RA} \cdot d_{start}}{N_{CS}} \right\rfloor, 0\right), \tag{15}$$

$$\bar{n}_{shift}^{RA} = \lfloor \min(d_u - n_{group}^{RA} \cdot d_{start}, \ N_{ZC} - 3d_u - n_{shift}^{RA} N_{CS})/N_{CS} \rfloor, \tag{16}$$

$$\bar{\bar{n}}_{shift}^{RA} = 0, \tag{18}$$

$$n_{group}^{RA} = \left\lfloor \frac{d_u}{d_{start}} \right\rfloor, \tag{22}$$

$$n_{shift}^{RA} = \max\left(\left\lfloor \frac{N_{ZC} - 2d_u - n_{group}^{RA} \cdot d_{start}}{N_{CS}} \right\rfloor, 0\right), \tag{23}$$

$$n_{shift}^{RA} = 0, \tag{24}$$

$$\bar{n}_{shift}^{RA} = 0, \tag{26}$$

$$n_{group}^{RA} = \left\lfloor \frac{N_{ZC} - d_u}{d_{start}} \right\rfloor, \tag{30}$$

$$n_{shift}^{RA} = \max\left(\left\lfloor \frac{3d_u - N_{ZC} - n_{group}^{RA} \cdot d_{start}}{N_{CS}} \right\rfloor, 0\right), \tag{31}$$

$$\bar{n}_{shift}^{RA} = 0, \tag{32}$$

$$\bar{\bar{n}}_{shift}^{RA} = 0. \tag{34}$$

24. The apparatus according to claim 22, wherein $v \le (n_{shift}^{RA} n_{group}^{RA} + \bar{n}_{shift}^{RA} - 1)$.

25. The apparatus according to claim 22, wherein the processor is further configured to execute the instructions to:
transmit indication information which indicates the range of the shift sequence number v.

\* \* \* \* \*